United States Patent
Teichmann et al.

(10) Patent No.: US 11,480,783 B2
(45) Date of Patent: Oct. 25, 2022

(54) OPTICAL FILTER SYSTEM

(71) Applicant: HAMAMATSU PHOTONICS K.K., Hamamatsu (JP)

(72) Inventors: Helmut Teichmann, Solothurn (CH); Andreas Durandi, Solothurn (CH); Peter Seitz, Solothurn (CH); Takashi Kasahara, Hamamatsu (JP); Katsumi Shibayama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/621,919

(22) PCT Filed: Jun. 12, 2018

(86) PCT No.: PCT/JP2018/022446
§ 371 (c)(1),
(2) Date: Dec. 12, 2019

(87) PCT Pub. No.: WO2018/230567
PCT Pub. Date: Dec. 20, 2018

(65) Prior Publication Data
US 2020/0116992 A1   Apr. 16, 2020

(30) Foreign Application Priority Data

Jun. 13, 2017 (CH) .................................. 00761/17
Jun. 20, 2017 (CH) .................................. 00799/17

(51) Int. Cl.
*G02B 26/00* (2006.01)
(52) U.S. Cl.
CPC .................. *G02B 26/001* (2013.01)
(58) Field of Classification Search
CPC ...... G02B 6/29358; G02B 26/001; G01J 3/26
See application file for complete search history.

(56) References Cited

U.S. PATENT DOCUMENTS

| 5,969,513 A | 10/1999 | Clark |
| 2001/0015810 A1* | 8/2001 | Hara ........................ G01J 3/26 359/579 |

(Continued)

FOREIGN PATENT DOCUMENTS

| CN | 1624500 A | 6/2005 |
| CN | 1846116 A | 10/2006 |

(Continued)

OTHER PUBLICATIONS

Gregoire, B. Robert et al., "A Sub 1-V Constant Gm-C Swithced-Capacitor Current Source," IEEE Transactions on Circuits and Systems—II:Express Briefs, vol. 54, No. 3, Mar. 2007, pp. 222-226.

(Continued)

*Primary Examiner* — Kimberly N. Kakalec
(74) *Attorney, Agent, or Firm* — Faegre Drinker Biddle & Reath LLP

(57) ABSTRACT

An optical filter system includes a Fabry-Perot interference filter, and a controller that controls the Fabry-Perot interference filter. The Fabry-Perot interference filter includes a first mirror portion, a second mirror portion, a first driving electrode and a first monitor electrode provided with the first mirror portion, and a second driving electrode and a second monitor electrode provided with the second mirror portion. The controller includes a control unit that calculates an electrostatic capacitance between the first mirror portion and the second mirror portion based on an alternating voltage generated between the first monitor electrode and the second monitor electrode while an alternating current is applied between the first monitor electrode and the second monitor electrode.

8 Claims, 36 Drawing Sheets

(56) References Cited

U.S. PATENT DOCUMENTS

| | | | |
|---|---|---|---|
| 2005/0122191 A1 | 6/2005 | Nakamura et al. | |
| 2005/0226281 A1 | 10/2005 | Faraone et al. | |
| 2008/0039696 A1* | 2/2008 | Kamihara | A61B 1/05 600/181 |
| 2014/0218586 A1* | 8/2014 | Sano | G01J 3/51 348/335 |
| 2015/0092272 A1* | 4/2015 | Shinto | G02B 5/285 359/578 |

FOREIGN PATENT DOCUMENTS

| | | |
|---|---|---|
| CN | 105339829 A | 2/2016 |
| CN | 105992964 A | 10/2016 |
| EP | 2664947 A1 | 11/2013 |
| EP | 2853931 A1 | 4/2015 |
| JP | 2001-228326 A | 8/2001 |
| JP | 2002-277758 A | 9/2002 |
| JP | 2003-14641 A | 1/2003 |
| JP | 2012-141347 A | 7/2012 |
| JP | 2013-218194 A | 10/2013 |
| JP | 2014-153389 A | 8/2014 |
| JP | 2015-4886 A | 1/2015 |
| JP | 2015-11312 A | 1/2015 |
| JP | 2015-143741 A | 8/2015 |
| TW | 201142884 A | 12/2011 |
| WO | WO 2005/003688 A1 | 1/2005 |
| WO | WO 2017/057372 A1 | 4/2017 |

OTHER PUBLICATIONS

"MEMS-FPI spectrum sensors C13272-01/02," Hamamatsu Photonics, May 2017, pp. 1-22.

International Preliminary Report on Patentability dated Dec. 26, 2019 for PCT/JP2018/022446.

* cited by examiner

Fig.8
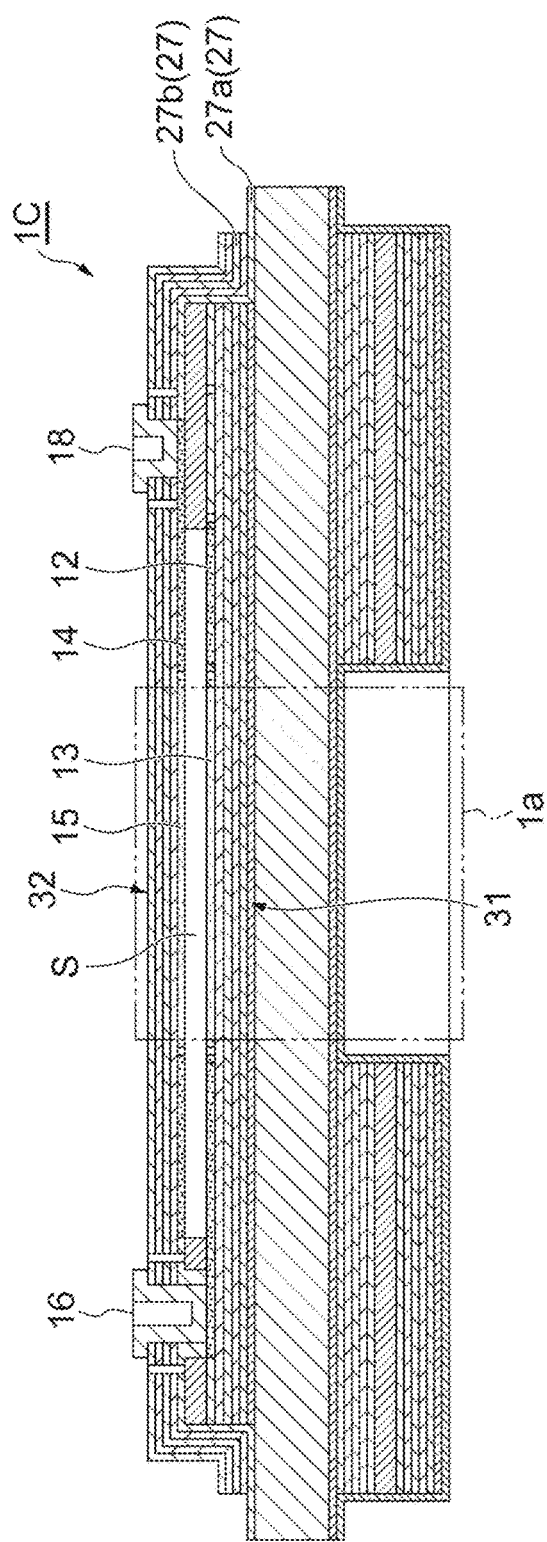
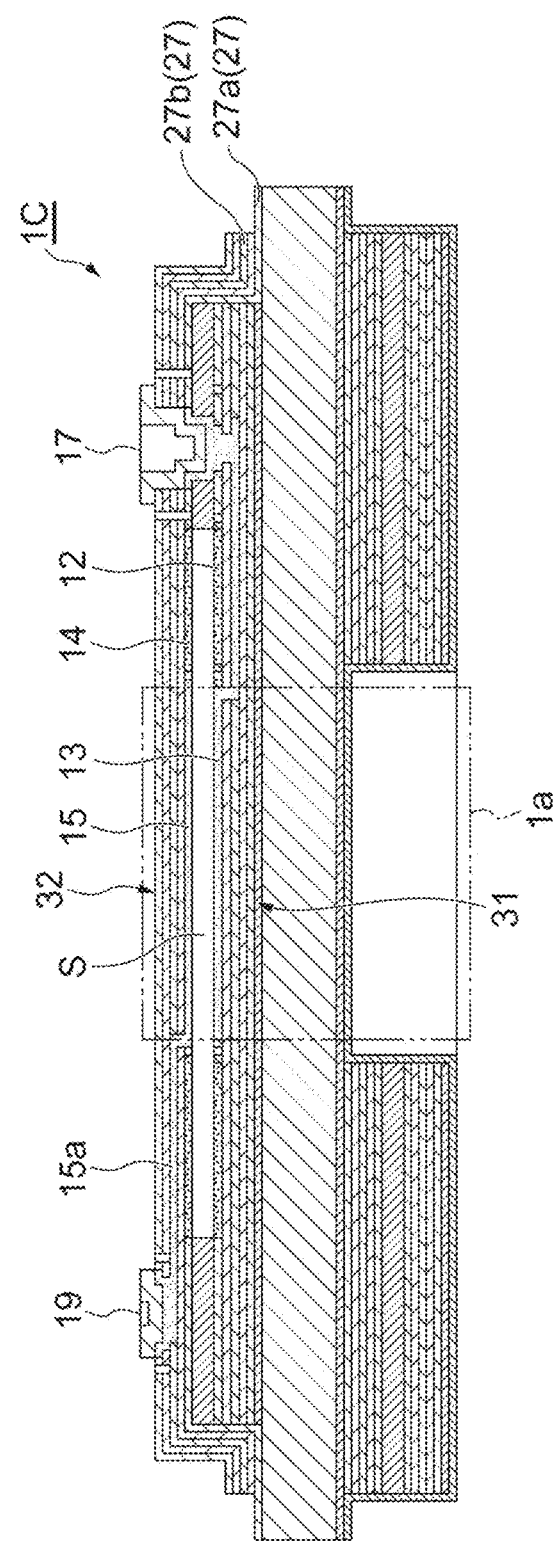

Fig.9
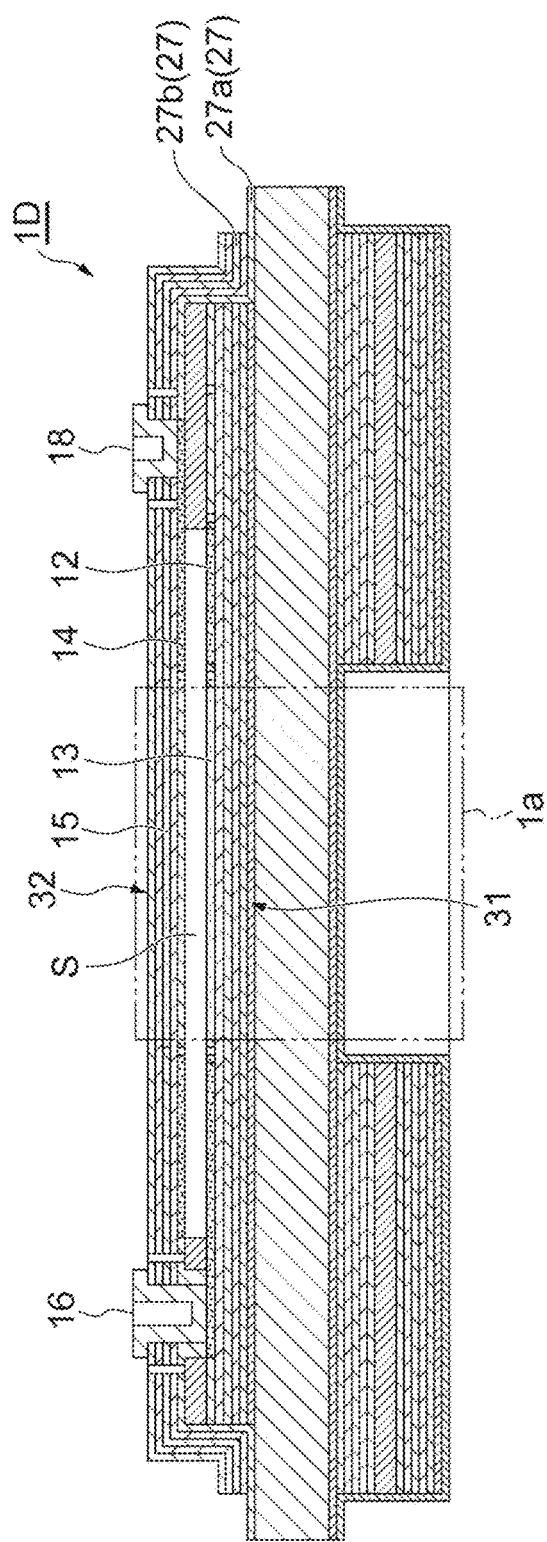
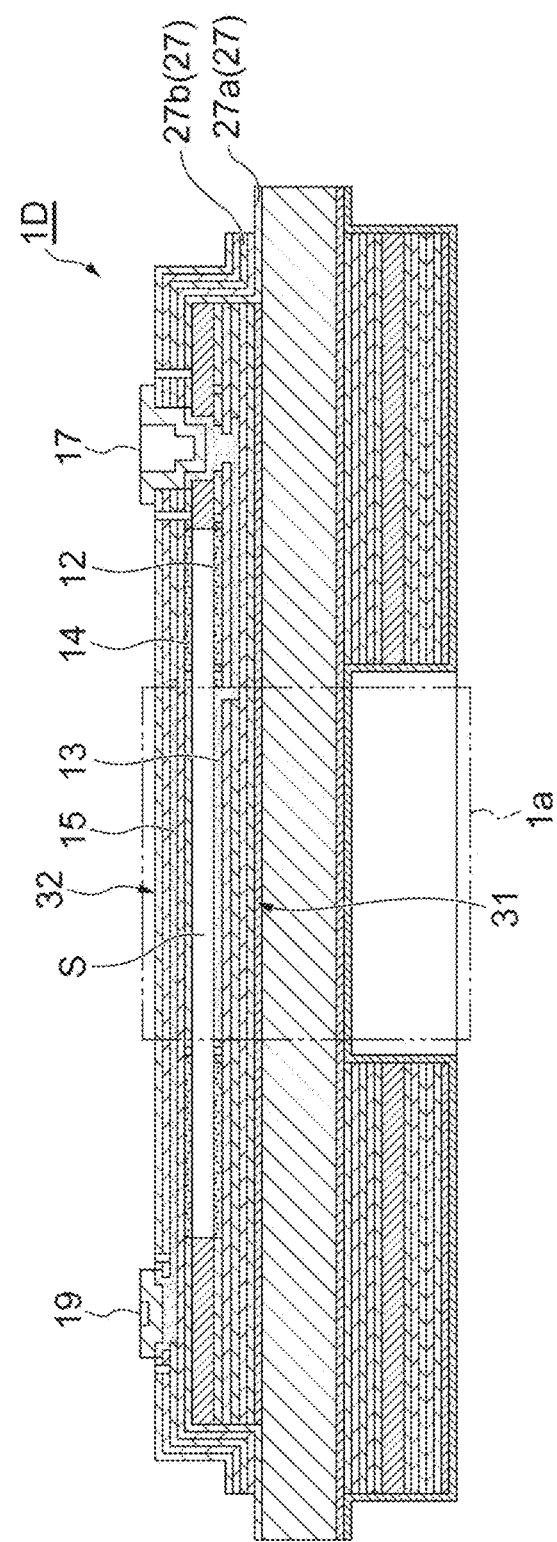

OPTICAL FILTER SYSTEM

TECHNICAL FIELD

The present disclosure relates to an optical filter system including a Fabry-Perot interference filter.

BACKGROUND ART

A Fabry-Perot interference filter including a pair of mirror portions which are disposed to face each other with an air gap interposed therebetween and between which a distance is adjusted by an electrostatic force is known (for example, refer to Patent Literature 1).

CITATION LIST

Patent Literature

Patent Literature 1: Japanese Unexamined Patent Publication No. 2015-4886

SUMMARY OF INVENTION

Technical Problem

Generally, in a Fabry-Perot interference filter as described above, a distance between a pair of mirror portions is adjusted by controlling an applied voltage. However, in such a case, there is concern that a "pull-in" phenomenon will occur, in which mirror portions exert an attractive force on each other and the ensuing mechanical contact between the mirror portions will cause a defect in the Fabry-Perot interference filter. In contrast, it can be conceived that the pull-in phenomenon is avoided by employing control based on the amount of electric charge stored between mirror portions. However, further improvement is required from the viewpoint of reliability.

An object of an aspect of the present disclosure is to provide an optical filter system having high reliability.

Solution to Problem

An optical filter system according to an aspect of the present disclosure includes a Fabry-Perot interference filter; and a controller that controls the Fabry-Perot interference filter, wherein the Fabry-Perot interference filter includes a first mirror portion, a second mirror portion disposed to face the first mirror portion with an air gap interposed therebetween and of which a distance to the first mirror portion in a light transmitting region is adjusted by an electrostatic force, a first driving electrode provided with the first mirror portion to surround the light transmitting region when seen in a direction in which the first mirror portion and the second mirror portion face each other, a second driving electrode provided with the second mirror portion to face the first driving electrode, a first monitor electrode provided with the first mirror portion such that at least a part of the first monitor electrode overlaps the light transmitting region when seen in the direction and electrically insulated from the first driving electrode, and a second monitor electrode provided with the second mirror portion to face the first monitor electrode and electrically insulated from the second driving electrode, and wherein the controller includes a first current source that generates the electrostatic force by applying a driving current between the first driving electrode and the second driving electrode, a second current source that applies an alternating current between the first monitor electrode and the second monitor electrode, the alternating current having a frequency higher than resonance frequencies of the first mirror portion and the second mirror portion, a detection unit that detects an alternating voltage generated between the first monitor electrode and the second monitor electrode while the alternating current is applied, and a control unit that controls the first current source based on an amount of electric charge stored between the first mirror portion and the second mirror portion and calculates an electrostatic capacitance between the first mirror portion and the second mirror portion based on the detection result of the detection unit.

In this optical filter system, the Fabry-Perot interference filter includes the first monitor electrode and the second monitor electrode in addition to the first driving electrode and the second driving electrode. The electrostatic capacitance between the first mirror portion and the second mirror portion is calculated based on the alternating voltage generated between the first monitor electrode and the second monitor electrode when the alternating current having the frequency higher than the resonance frequencies of the first mirror portion and the second mirror portion is applied between the first monitor electrode and the second monitor electrode. Accordingly, a distance between the mirror portions can be calculated based on the electrostatic capacitance, and an actual distance between the mirror portions can be monitored while the Fabry-Perot interference filter is in operation. Moreover, the first monitor electrode is provided with the first mirror portion such that at least a part of the first monitor electrode overlaps the light transmitting region when seen in the direction in which the first mirror portion and the second mirror portion face each other, and the first monitor electrode is electrically insulated from the first driving electrode. The second monitor electrode is provided with the second mirror portion to face the first monitor electrode and is electrically insulated from the second driving electrode. Accordingly, the first monitor electrode and the second monitor electrode can be independent from the first driving electrode and the second driving electrode. As a result, the electrostatic capacitance between the mirror portions can be more preferably calculated, and the distance between the mirror portions can be more preferably monitored. Therefore, according to the optical filter system, reliability can be enhanced.

In an optical filter system according to an aspect of the present disclosure, the first driving electrode may be exposed to the air gap. In this case, the first driving electrode can be close to the second driving electrode, and an electrostatic force can be preferably generated between the mirror portions.

In an optical filter system according to an aspect of the present disclosure, the second driving electrode may be disposed on a surface on a side opposite to the air gap of the second mirror portion. In this case, a manufacturing step for the second driving electrode can be facilitated.

In an optical filter system according to an aspect of the present disclosure, the second driving electrode may be exposed to the air gap. In this case, the second driving electrode can approach the first driving electrode, so that an electrostatic force between the mirror portions can be more preferably generated.

In an optical filter system according to an aspect of the present disclosure, the first monitor electrode may be exposed to the air gap. In this case, the first monitor electrode can be close to the second monitor electrode, and the distance between the mirror portions can be more preferably monitored.

In an optical filter system according to an aspect of the present disclosure, the second monitor electrode may be exposed to the air gap. In this case, the second monitor electrode can be close to the first monitor electrode, and the distance between the mirror portions can be more preferably monitored.

In an optical filter system according to an aspect of the present disclosure, the second monitor electrode may be disposed on a surface on a side opposite to the air gap of the second mirror portion. In this case, a manufacturing step for the second monitor electrode can be facilitated.

In an optical filter system according to an aspect of the present disclosure, the second driving electrode and the second monitor electrode can be separated from each other in the direction. In this case, electrical insulation properties between the second driving electrode and the second monitor electrode can be improved.

Advantageous Effects of Invention

According to an aspect of the present disclosure, it is possible to provide an optical filter system having high reliability.

BRIEF DESCRIPTION OF DRAWINGS

FIG. 8(a) and FIG. 8(b) are cross-sectional views of a Fabry-Perot interference filter according to a third modification example.

FIG. 9(a) and FIG. 9(b) are cross-sectional views of a Fabry-Perot interference filter according to a fourth modification example.

FIG. 11 and FIG. 12 show the situation described by Eq. 6 and Eq. 7, which will be mentioned below.

FIG. 14 shows which charge amount Q leads to which distance d in the system characterized by FIG. 11 and FIG. 12. There is no ambiguity in this relation d(Q), so this function can be inverted to provide Q(d) easily as done by Eq. 8 described below.

The total charge amount (resp. the amount of charge transferred) can be calculated from the known capacitance CB, the voltage UB and the voltage V across the capacitor before connecting capacitor B. Thus knowing the total charge Q and the resulting voltage V allows to determine the actual capacitance C of the MEMS/MOEMS actuator and (with knowledge of the effective area A) also the distance d between the plates. Thus it is possible to determine the actual distance d by a "static" capacity measurement, by controlling total Q and measuring resulting V.

Figure 22:
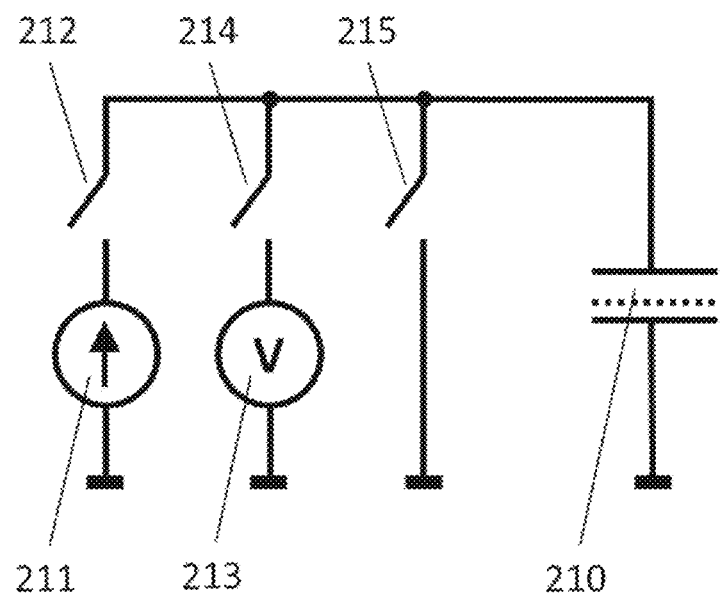

FIG. 22 shows a schematic diagram of the electrostatic actuator control system according to the second disclosure.

Figure 23:
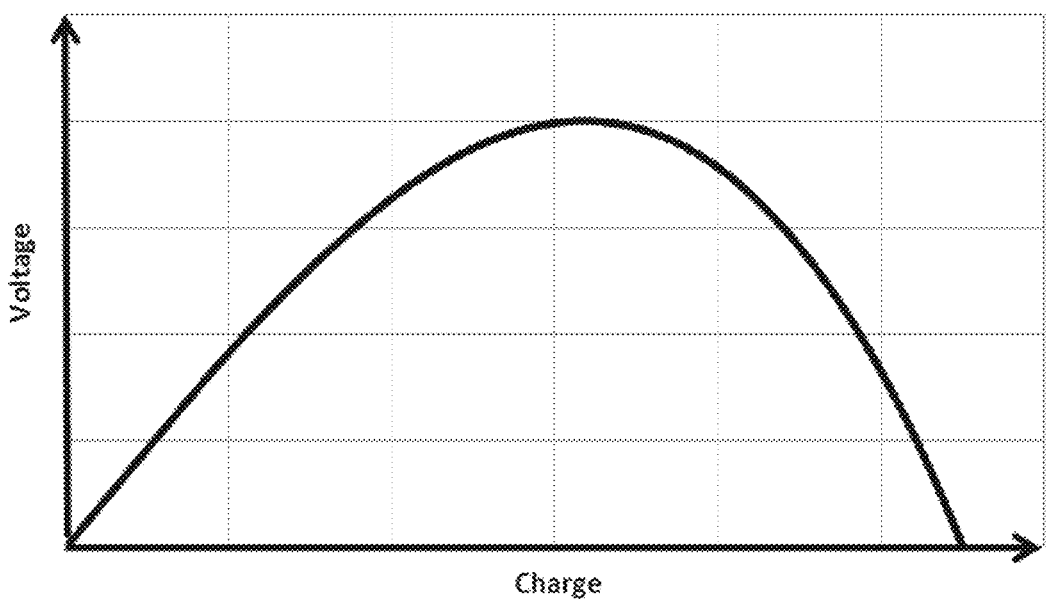

FIG. 23 shows the typical behavior of a parallel-plate electrostatic actuator, where the voltage across the actuator is illustrated as a function of the total charge deposited on the actuator electrodes.

Figure 24:
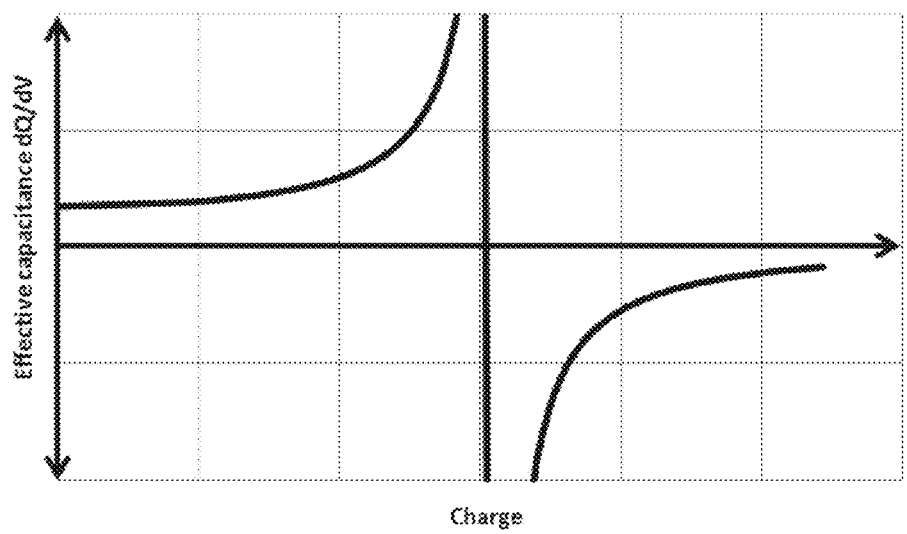

FIG. 24 shows the typical behavior of the effective capacitance of a parallel-plate electrostatic actuator, where the first derivative dQ/dV of the voltage V as a function of total charge Q is illustrated.

Figure 25:
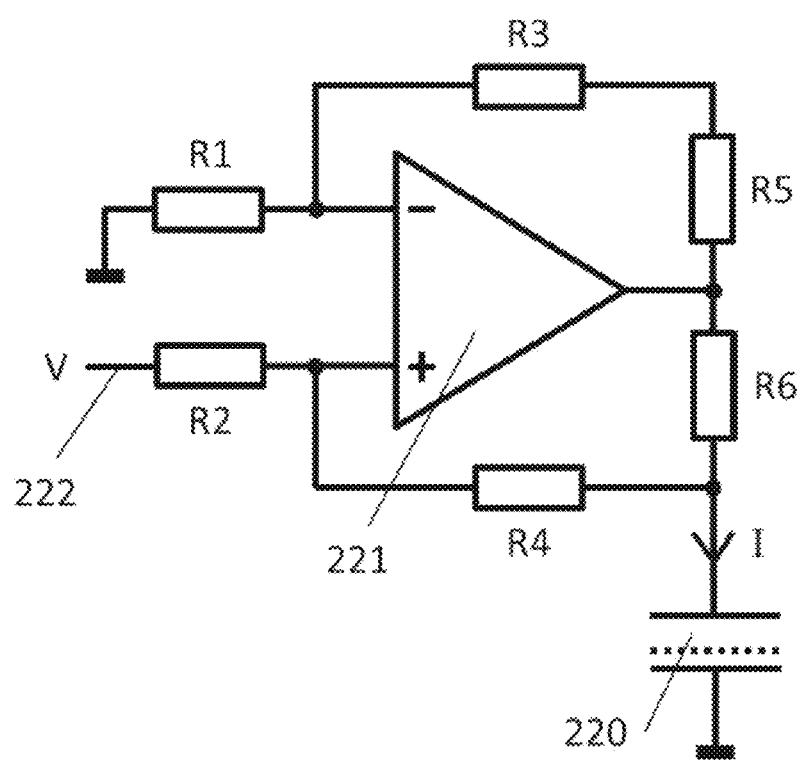

FIG. 25 shows an example of a bipolar current source with which the flow of a bidirectional current I through an electrostatic actuator can be set with a control voltage V. This circuit is known as Howland current pump.

Figure 26:
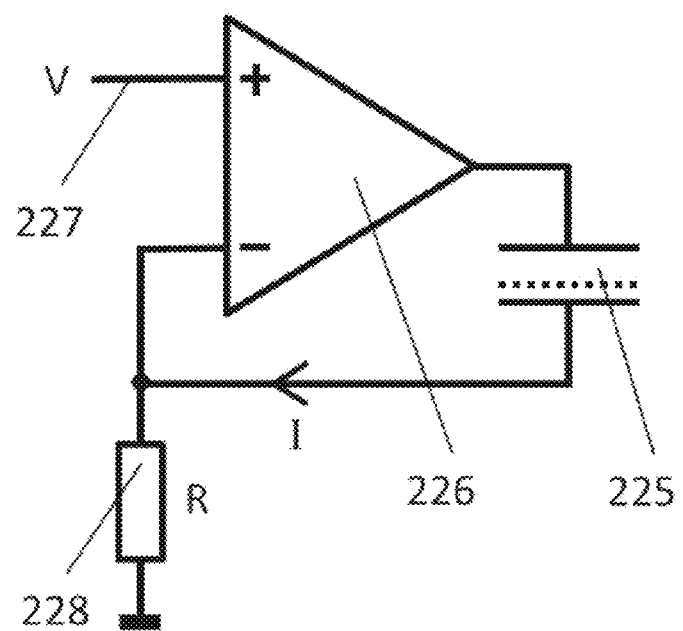

FIG. 26 shows another example of a bipolar current source with which the flow of a bidirectional current I through an electrostatic actuator can be set with a control voltage V. This circuit is known as transconductance amplifier.

Figure 27:
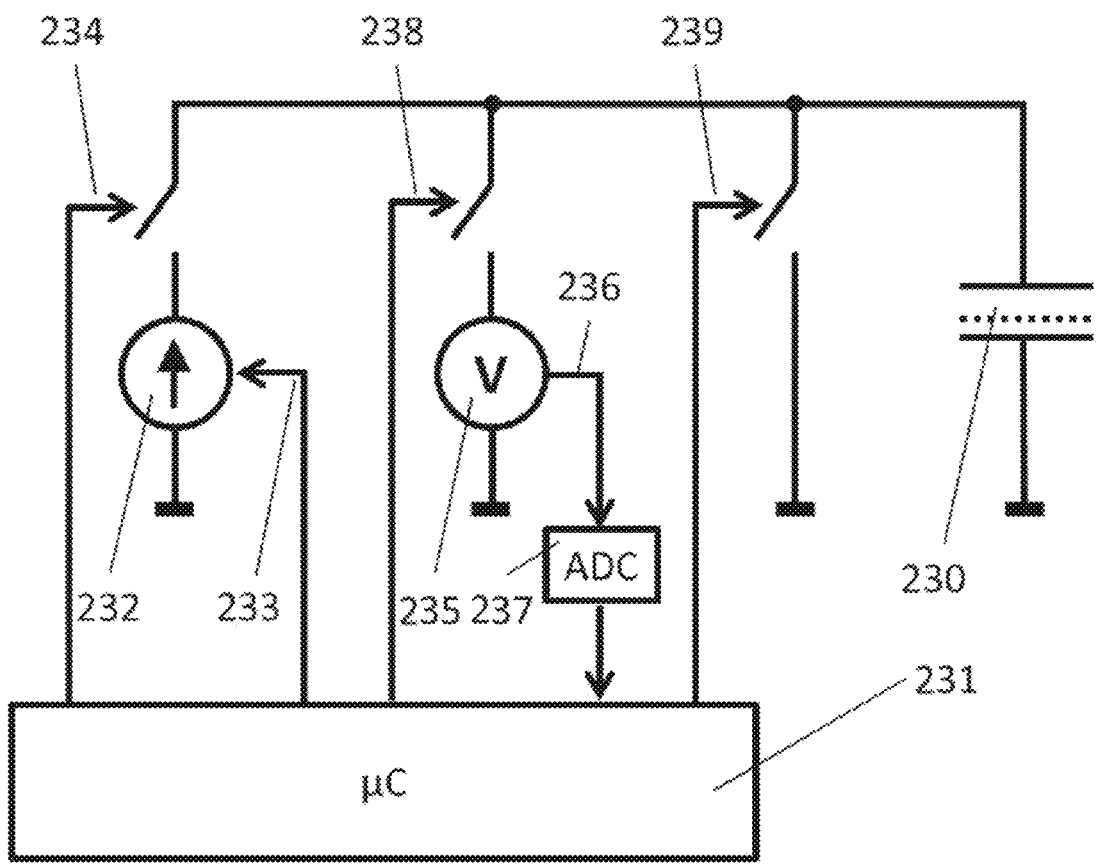

FIG. 27 shows a complete control system for an electrostatic actuator, consisting of the electrostatic actuator controller illustrated in FIG. 22, operated by a digital controller system (μC).

Figure 28:
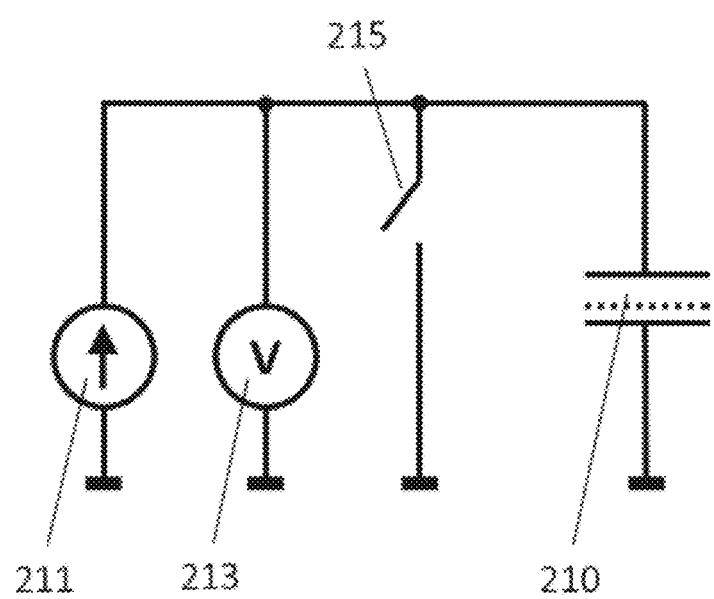

FIG. 28 shows a schematic diagram of the electrostatic actuator control system according to the second disclosure with a reduced number of switches.

Figure 29:
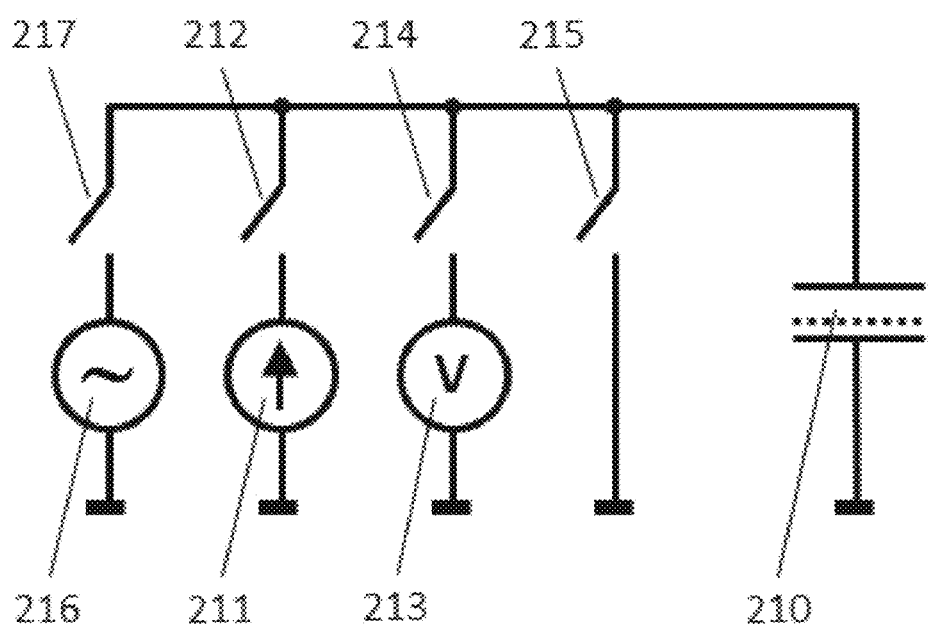

FIG. 29 shows a schematic diagram of the electrostatic actuator control system according to the second disclosure, including a small-signal AC current-injection source for a HF capacitance measurement.

Figure 30:
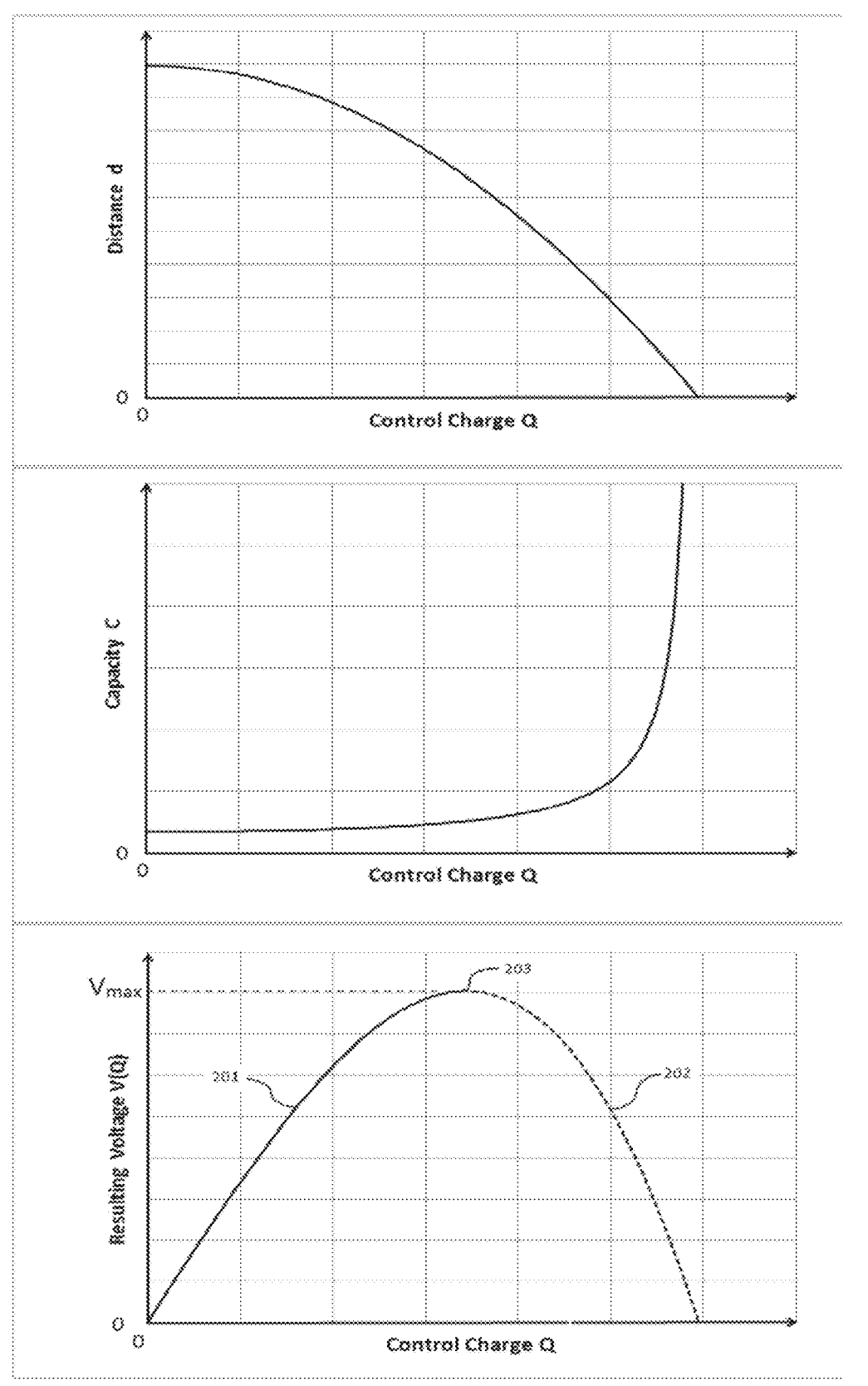

FIG. 30 shows the situation for a simplified case of a parallel plate capacitor as a simple model for MEMS/MOEMS capacitive structure with at least one movable spring-loaded electrode. The actuator is driven by controlling the charge amount according to the second disclosure. With increasing control charge amount, the resulting voltage V(Q) shows a maximum 203 due to the rapid increase of capacity of the actuator towards smaller distances d between the electrodes.

Figure 31:
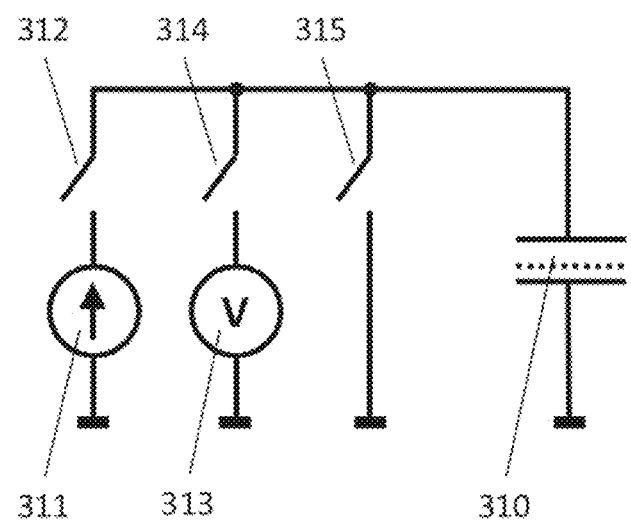

FIG. 31 shows a schematic diagram of the electrostatic actuator control system according to the second disclosure. Current source 311, switchable by switch 312, is connected to capacity 310 of the actuator with at least one movable electrode. The resulting voltage can be measured by voltage measurement system 313, which can be connected or disconnected by switch 314. Switch 315 allows resetting the charge on capacitor 310 to zero level.

Figure 32:
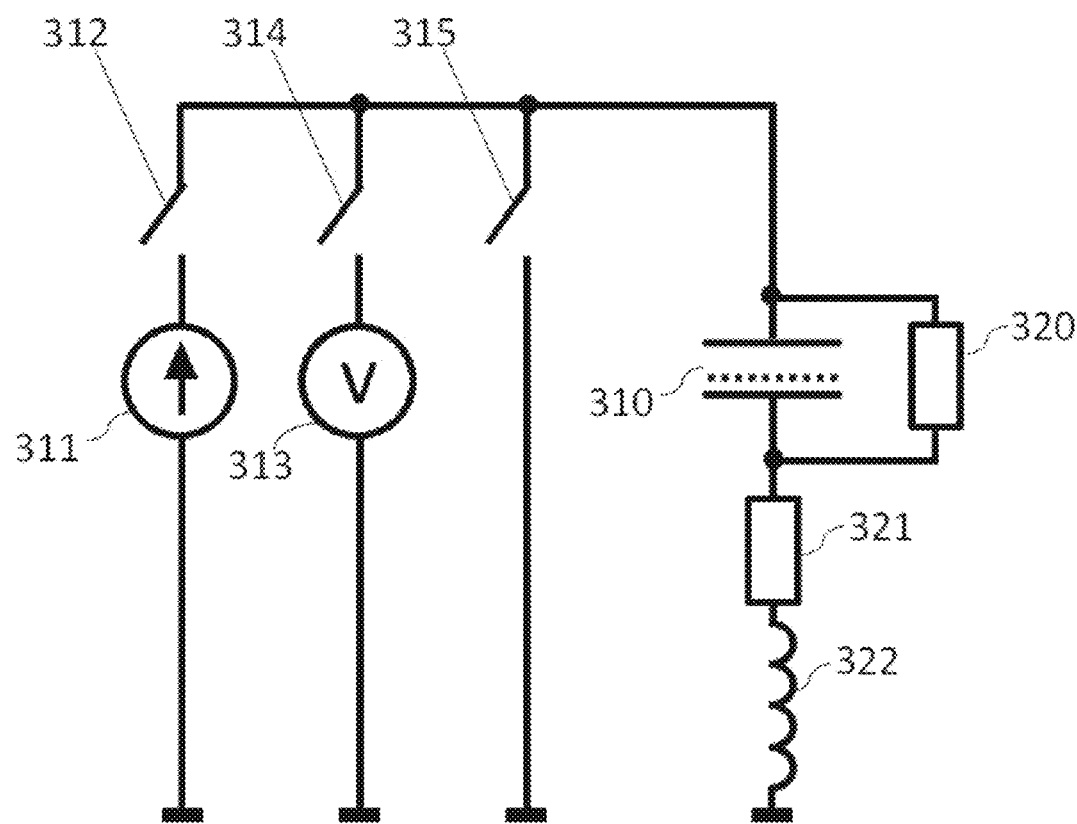

FIG. 32 shows the electrostatic actuator control system of FIG. 31 when taking into account the equivalent circuit of a real capacitor. Isolation resistance $R_{leak}$ 320, equivalent serial resistance ESR 321 and equivalent series inductance ESL 322 are shown.

Figure 3:
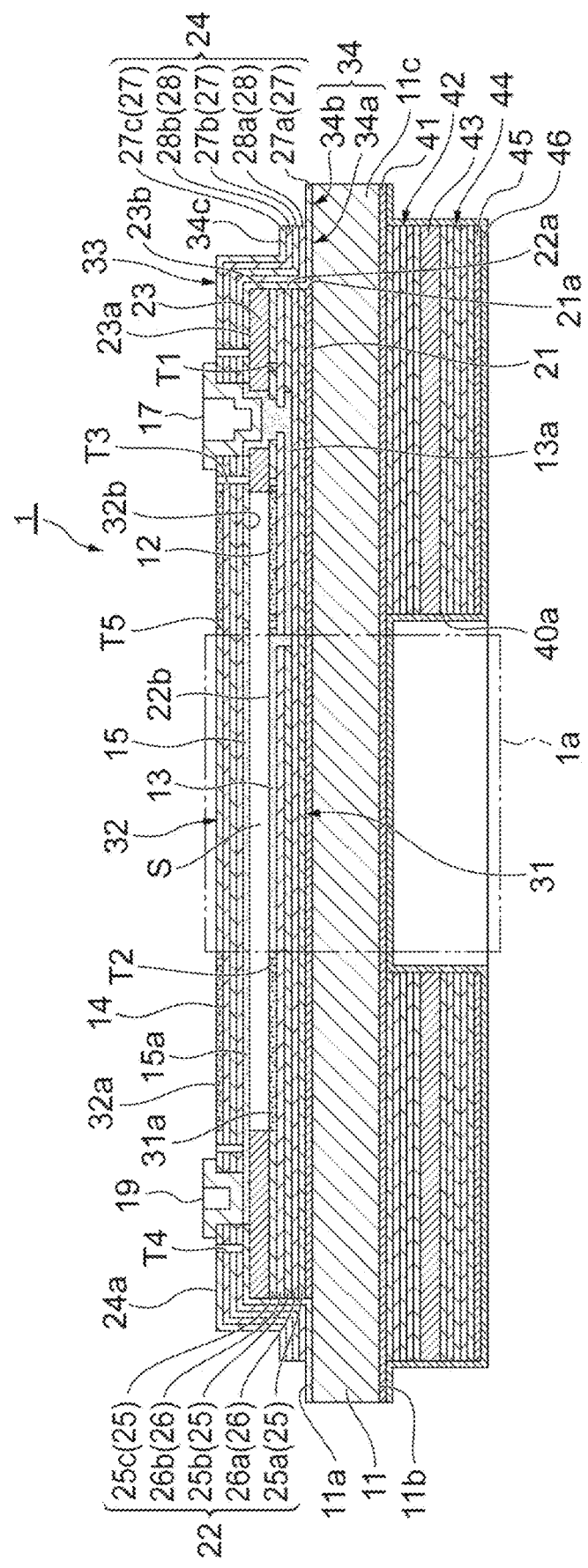
FIG. 3 is a cross-sectional view of the Fabry-Perot interference filter taken along line III-III in FIG. 1.
Figure 33:
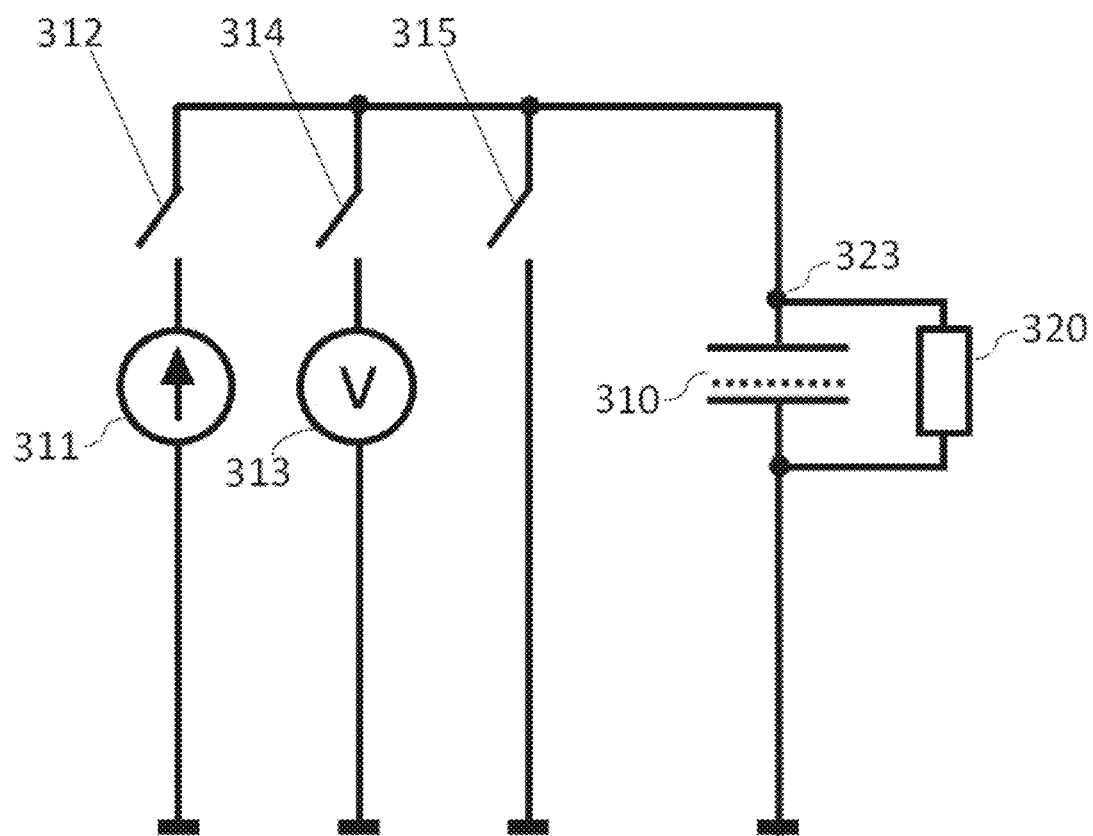

FIG. 33 shows the electrostatic actuator control system of FIG. 3 when assuming that isolation resistance $R_{leak}$ 320 is non-negligible, and equivalent serial resistance ESR 321 and equivalent series inductance ESL 322 are negligible.

Figure 34:
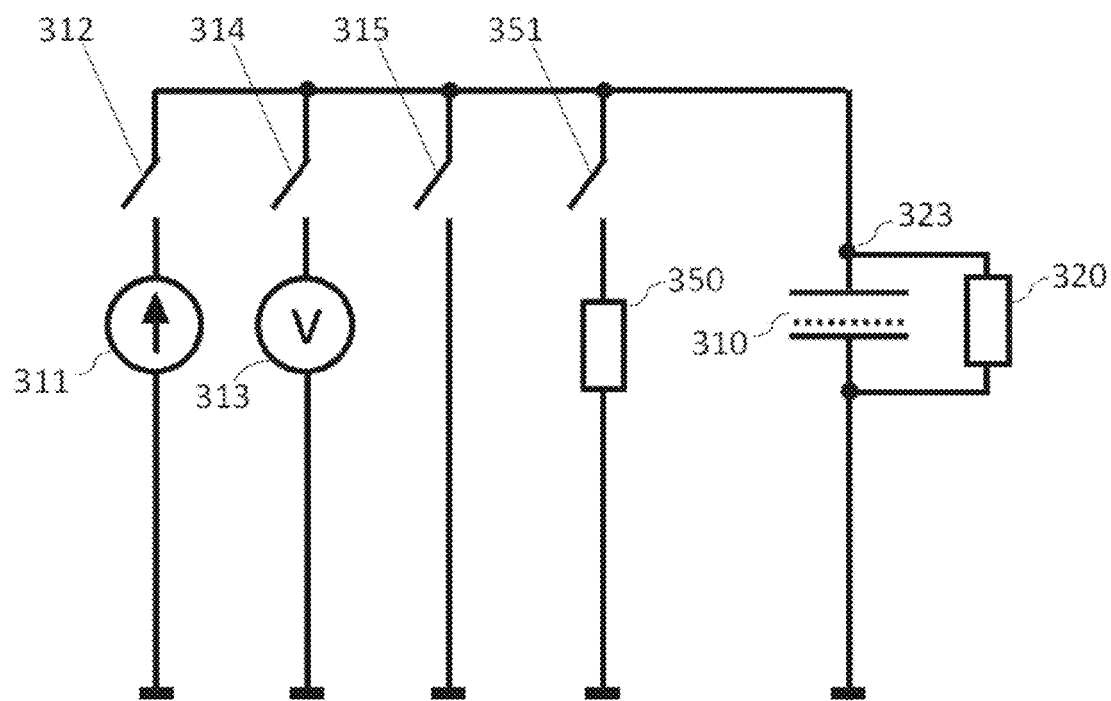

FIG. 34 shows the electrostatic actuator control system of FIG. 33 with introduction of at least one precision resistor 350 with related switch 351 belonging to that resistor. If connected by its related switch 351, resistor 350 is electrically connected in parallel to capacitor 310 and its isolation resistance $R_{leak}$ 320.

Figure 35:
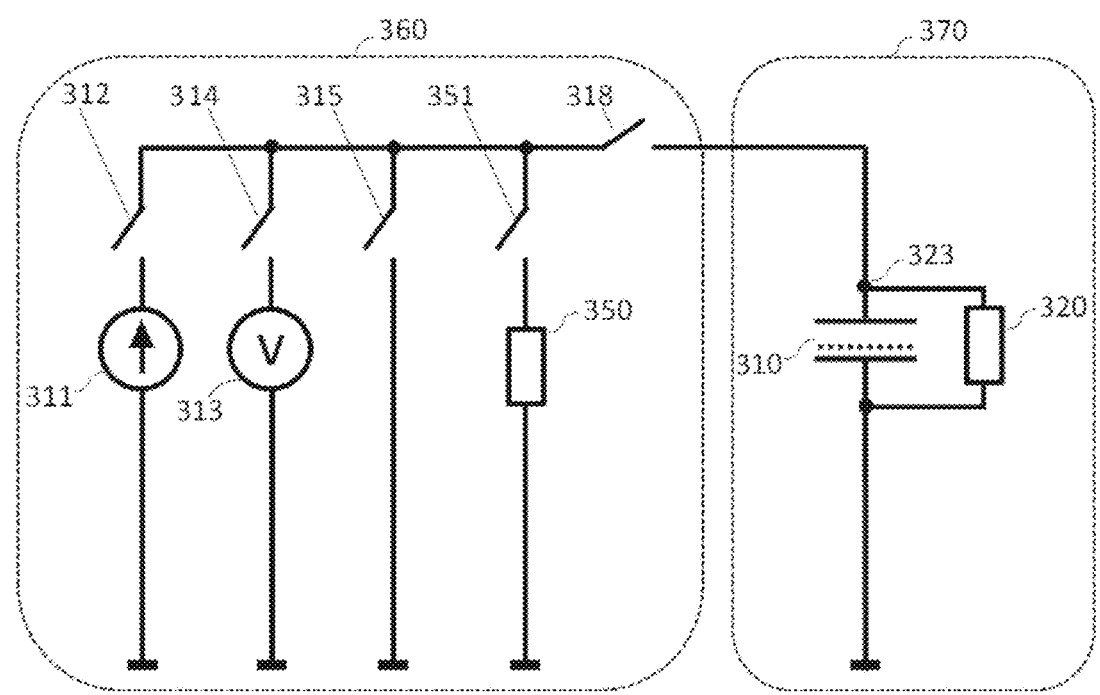

FIG. 35 shows the electrostatic actuator control system of FIG. 34 with introduction of one additional switch 318, which allows connecting or disconnecting capacitor 310 and with it its isolation resistance $R_{leak}$ 320 of actuator unit 370 from Electrostatic Actuator Controller 360. For example, opening switch 318 and closing switches 351, 312 and 314, the voltage drop of the current from current source 311 can be measured and calibrated with the help of the voltage measurement system 313.

Figure 36:
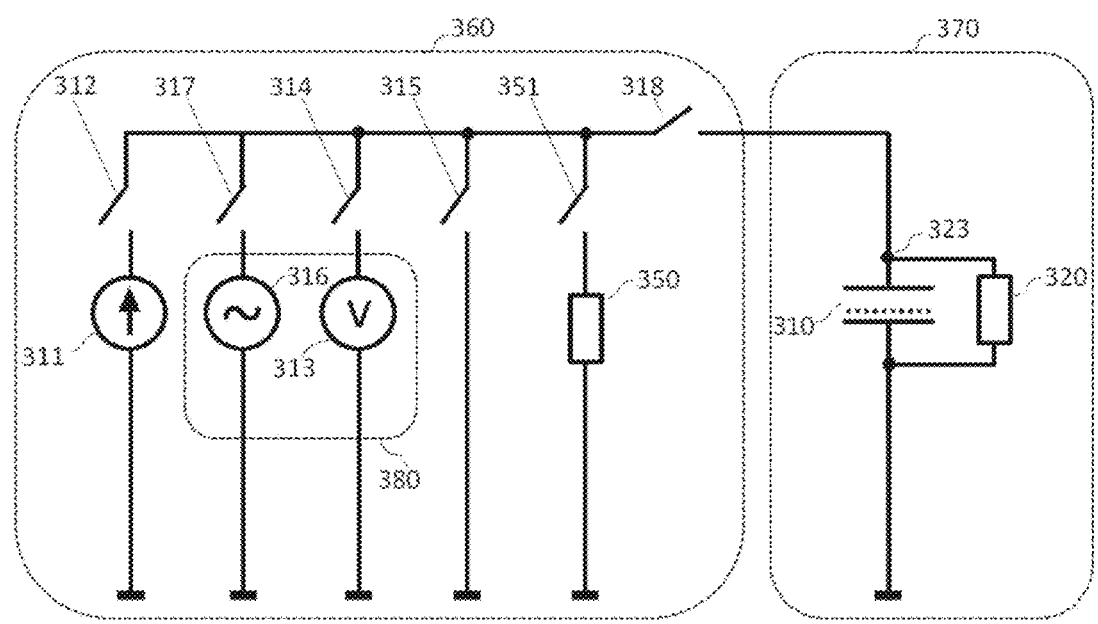

FIG. 36 shows the electrostatic actuator control system of FIG. 35 with introduction of AC modulation current source 316 which can be connected or disconnected by switch 317. Frequencies of the modulation current are much higher than the oscillatory frequencies of the actuator at the operation point defined by the control charge Q. The HF AC modulation current source and voltage measurement system 313, which can detect amplitudes and phase of the resulting AC modulation voltage form impedance measurement unit 380, which allows to determine in particular the capacitance of actuator unit 310. Unit 380 delivers a sensing value, which is the input for a closed feedback loop which keeps the operation point defined by the control charge Q constant.

DESCRIPTION OF EMBODIMENT

First Disclosure

Hereinafter, an embodiment of the present disclosure will be described in detail with reference to the drawings. In the following description, the same reference signs are applied to the same elements or corresponding elements, and duplicated description will be omitted.

Configuration of Fabry-Perot Interference Filter

Figure 1:
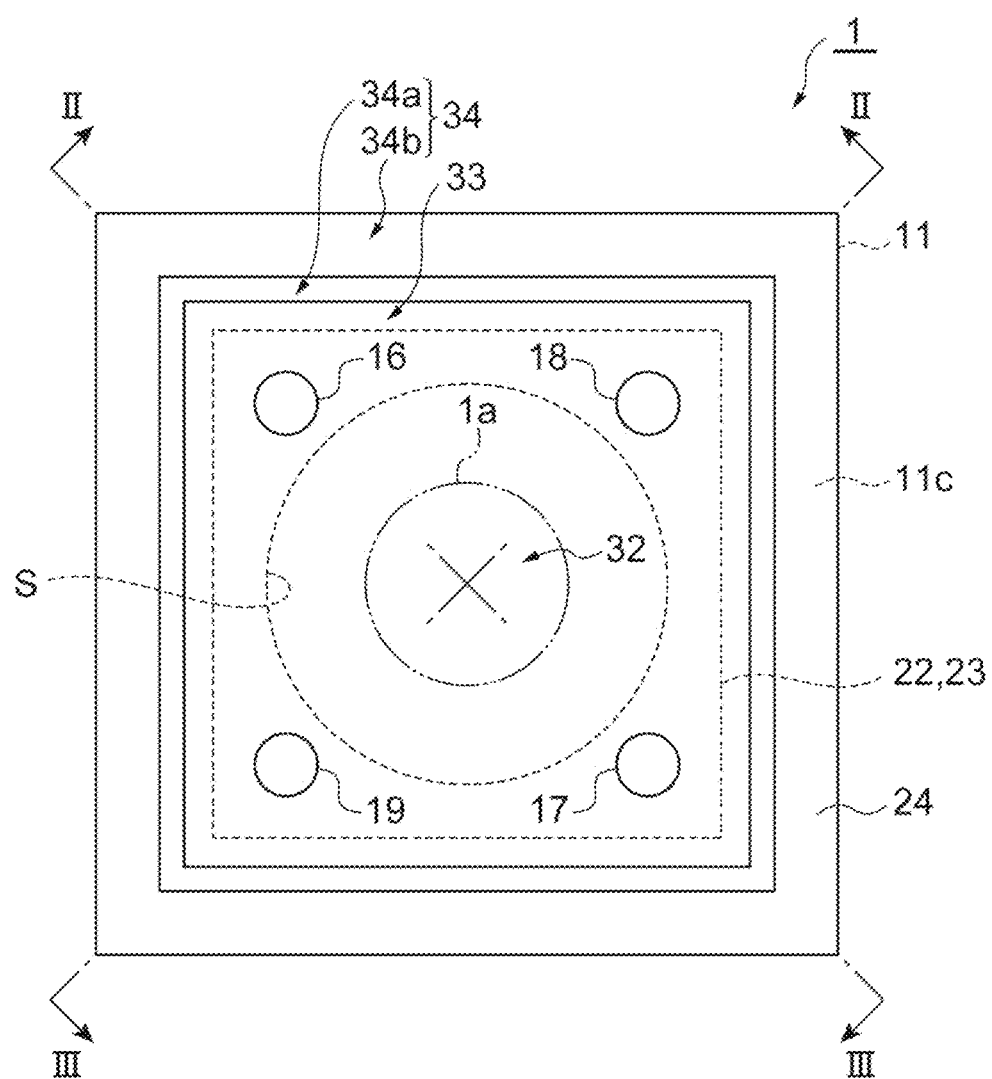
FIG. 1 is a plan view of a Fabry-Perot interference filter included in an optical filter system according to an embodiment.
Figure 2:
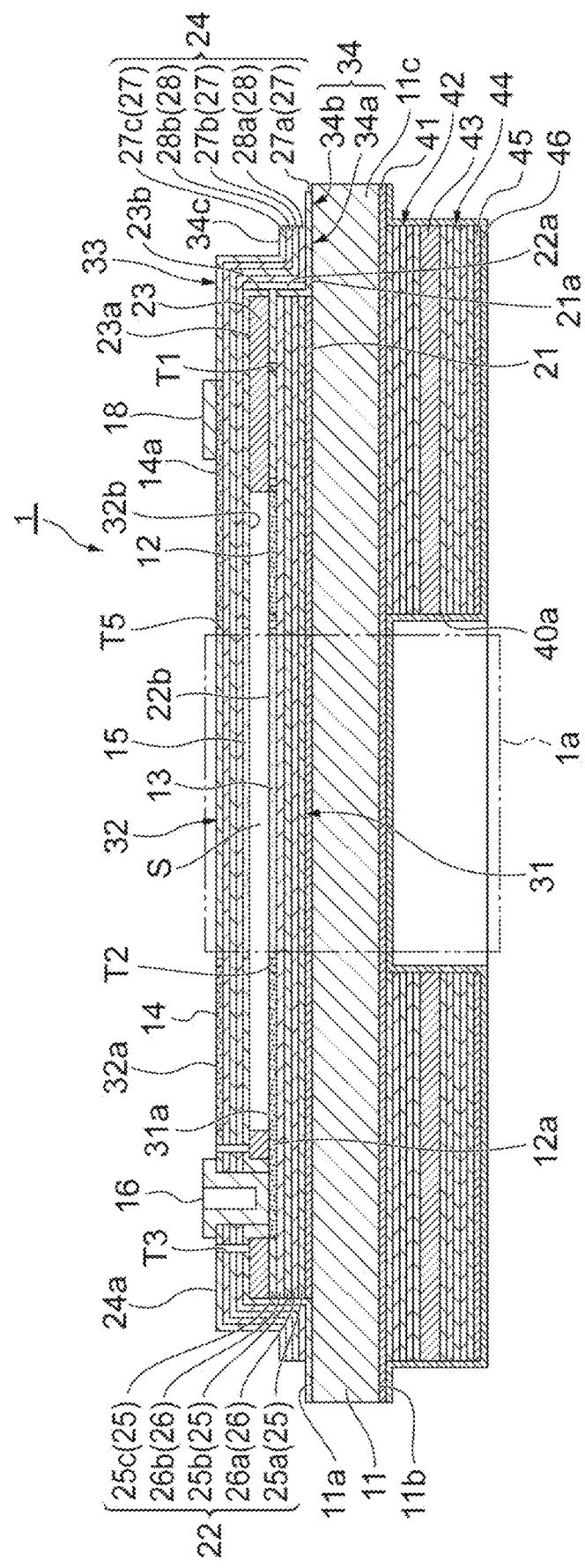
FIG. 2 is a cross-sectional view of the Fabry-Perot interference filter taken along line II-II in FIG. 1.

As illustrated in FIGS. 1 to 3, a Fabry-Perot interference filter 1 includes a substrate 11. The substrate 11 has a first surface 11a and a second surface 11b which is located on a side opposite to the first surface 11a. An antireflection layer 21, a first laminate 22, an intermediate layer 23, and a second laminate 24 are laminated on the first surface 11a in this order. An air gap S is defined between the first laminate 22 and the second laminate 24 by the frame-shaped intermediate layer 23.

The shapes and a positional relationship between portions when seen in a direction perpendicular to the first surface 11a (in a plan view) are as follows. For example, an outer edge of the substrate 11 has a rectangular shape in which the length of one side ranges from approximately hundreds of micrometers to several millimeters. The outer edge of the substrate 11 and an outer edge of the second laminate 24 coincide with each other. An outer edge of the antireflection layer 21, an outer edge of the first laminate 22, and an outer edge of the intermediate layer 23 coincide with each other. The substrate 11 has an outer edge portion 11c positioned on an outer side of the outer edge of the intermediate layer 23 with respect to the center of the air gap S. For example, the outer edge portion 11c has a frame shape surrounding the intermediate layer 23 when seen in a direction perpendicular to the first surface 11a. For example, the air gap S has a circular shape.

The Fabry-Perot interference filter 1 allows light having a predetermined wavelength to be transmitted therethrough in a light transmitting region 1a defined in a middle portion thereof. For example, the light transmitting region 1a is a columnar region. For example, the substrate 11 is formed of silicon, quartz, or glass. When the substrate 11 is formed of silicon, the antireflection layer 21 and the intermediate layer 23 are formed of silicon oxide, for example. For example, the thickness of the intermediate layer 23 ranges from tens of nanometers to tens of micrometers.

A part of the first laminate 22 corresponding to the light transmitting region 1a (part overlapping the air gap S in a plan view) functions as a first mirror portion 31. The first mirror portion 31 is a fixed mirror. The first mirror portion 31 is disposed on the first surface 11a with the antireflection layer 21 interposed therebetween. The first laminate 22 is constituted of a plurality of polysilicon layers 25 and a plurality of silicon nitride layers 26 which are alternately laminated one by one. In the Fabry-Perot interference filter 1, a polysilicon layer 25a, a silicon nitride layer 26a, a polysilicon layer 25b, a silicon nitride layer 26b, and a polysilicon layer 25c are laminated on the antireflection layer 21 in this order. It is preferable that the optical thickness of each of the polysilicon layers 25 and the silicon nitride layers 26 constituting the first mirror portion 31 be an integer multiple of ¼ of a center transmission wavelength. The first mirror portion 31 may be directly disposed on the first surface 11a without the antireflection layer 21 interposed therebetween.

A part of the second laminate 24 corresponding to the light transmitting region 1a (part overlapping the air gap S in a plan view) functions as a second mirror portion 32. The second mirror portion 32 is a movable mirror. The second mirror portion 32 faces the first mirror portion 31 with the air gap S interposed therebetween on a side opposite to the substrate 11 with respect to the first mirror portion 31. A direction in which the first mirror portion 31 and the second mirror portion 32 face each other is parallel to a direction perpendicular to the first surface 11a. The second laminate 24 is disposed on the first surface 11a with the antireflection layer 21, the first laminate 22, and the intermediate layer 23 interposed therebetween. The second laminate 24 is constituted of a plurality of polysilicon layers 27 and a plurality of silicon nitride layers 28 which are alternately laminated one by one. In the Fabry-Perot interference filter 1, a polysilicon layer 27a, a silicon nitride layer 28a, a polysilicon layer 27b, a silicon nitride layer 28b, and a polysilicon layer 27c are laminated on the intermediate layer 23 in this order. It is preferable that the optical thickness of each of the polysilicon layers 27 and the silicon nitride layers 28 constituting the second mirror portion 32 be an integer multiple of ¼ of the center transmission wavelength.

In the first laminate 22 and the second laminate 24, silicon oxide layers may be used instead of the silicon nitride layers. As a material constituting each layer of the first laminate 22 and the second laminate 24, titanium oxide, tantalum oxide, zirconium oxide, magnesium fluoride, aluminum oxide, calcium fluoride, silicon, germanium, zinc sulfide, or the like may be used.

A plurality of penetration holes (not illustrated) are formed in a part of the second laminate 24 corresponding to the air gap S (part overlapping the air gap S in a plan view). The penetration holes reach the air gap S from a surface 24a on a side opposite to the intermediate layer 23 of the second laminate 24. The penetration holes are formed to the extent that the function of the second mirror portion 32 is not substantially affected. The penetration holes may be used for forming the air gap S by removing a part of the intermediate layer 23 through etching.

The second laminate 24 further has a covering portion 33 and a circumferential edge portion 34 in addition to the second mirror portion 32. The second mirror portion 32, the covering portion 33, and the circumferential edge portion 34 are integrally formed to have a part in the same lamination structure and to be connected to each other. The covering portion 33 surrounds the second mirror portion 32 in a plan view. The covering portion 33 covers a surface 23a of the intermediate layer 23 on a side opposite to the substrate 11, a side surface 23b, a side surface 22a of the first laminate 22, and a side surface 21a of the antireflection layer 21, reaching the first surface 11a.

The circumferential edge portion 34 surrounds the covering portion 33 in a plan view. The circumferential edge portion 34 is positioned on the first surface 11a in the outer edge portion 11c. An outer edge of the circumferential edge portion 34 coincides with the outer edge of the substrate 11 in a plan view. The circumferential edge portion 34 is thinned along an outer edge of the outer edge portion 11c. That is, a part of the circumferential edge portion 34 along the outer edge of the outer edge portion 11c is thinner than other parts excluding a part of the circumferential edge portion 34 along the outer edge. In the Fabry-Perot interference filter 1, the circumferential edge portion 34 is thinned by removing a part of the polysilicon layers 27 and the silicon nitride layers 28 constituting the second laminate 24. The circumferential edge portion 34 has a non-thinned portion 34a connected to the covering portion 33, and a thinned portion 34b surrounding the non-thinned portion 34a. In the thinned portion 34b, the polysilicon layers 27 and the silicon nitride layers 28 other than the polysilicon layer 27a directly provided on the first surface 11a are removed.

Figure 4:
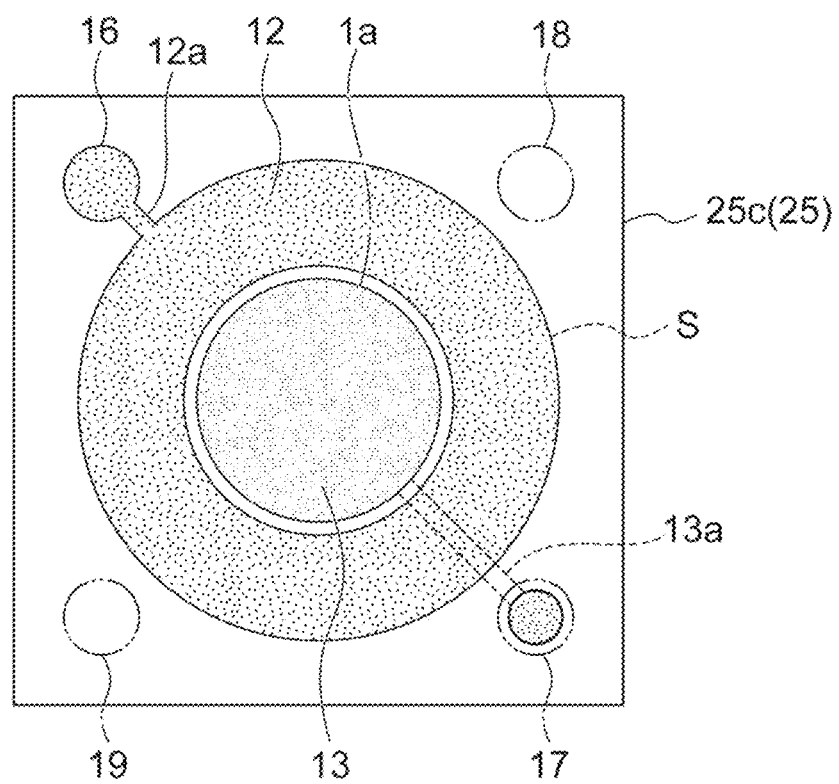
FIG. 4 is a plan view schematically illustrating a polysilicon layer in which a first driving electrode and a first monitor electrode are formed.

As illustrated in FIGS. 2 to 4, a first driving electrode 12 and a first monitor electrode 13 are provided with the first mirror portion 31. For example, the first driving electrode 12 had an annular shape and surrounds the light transmitting region 1a in a plan view. The first driving electrode 12 is disposed on a surface 31a of the first mirror portion 31 on the air gap S side and is exposed to the air gap S. For example, the first driving electrode 12 is formed by doping impurities to reduce resistance in the polysilicon layer 25c.

The first monitor electrode 13 overlaps the light transmitting region 1a in a plan view. In the present embodiment, although the first monitor electrode 13 completely overlaps the light transmitting region 1a in a plan view (in other words, the first monitor electrode 13 and the light transmitting region 1a have the same shape), at least a part of the first monitor electrode 13 may overlap the light transmitting region 1a in a plan view. For example, the first monitor electrode 13 may be forming to be larger than the light transmitting region 1a or may be formed to be smaller than the light transmitting region 1a. The first monitor electrode 13 is disposed on the surface 31a of the first mirror portion 31 and is exposed to the air gap S. For example, the first monitor electrode 13 is formed by doping impurities to reduce resistance in the polysilicon layer 25e.

A second driving electrode 14 and a second monitor electrode 15 are provided with the second mirror portion 32. The second driving electrode 14 is disposed to face the first driving electrode 12 and surrounds the light transmitting region 1a in a plan view. For example, the second driving electrode 14 has the same shape as that of the first driving electrode 12 in a plan view. The second driving electrode 14 is disposed on a surface 32a of the second mirror portion 32 on a side opposite to the air gap S. For example, the second driving electrode 14 is formed by doping impurities to reduce resistance in the polysilicon layer 27c. The second driving electrode 14 faces the first driving electrode 12 with the polysilicon layers 27a and 27b, the silicon nitride layers 28a and 28b, and the air gap S interposed therebetween.

The second monitor electrode 15 is disposed to face the first monitor electrode 13 and overlaps the light transmitting region 1a in a plan view. For example, the second monitor electrode 15 has the same shape as that of the first monitor electrode 13 in a plan view. The second monitor electrode 15 is disposed on a surface 32b of the second mirror portion 32 on the air gap S side and is exposed to the air gap S. For example, the second monitor electrode 15 is formed by doping impurities to reduce resistance in the polysilicon layer 27a. The second monitor electrode 15 faces the first monitor electrode 13 with the air gap S interposed therebetween.

In this way, the second monitor electrode 15 is fainted in the polysilicon layer 27 different from the polysilicon layer 27 in which the second driving electrode 14 is formed. As a result, the second monitor electrode 15 is separated from the second driving electrode 14 in the direction in which the first mirror portion 31 and the second mirror portion 32 face each other. More specifically, in that direction, the polysilicon layer 27b and the silicon nitride layers 28a and 28b are disposed between the second monitor electrode 15 and the second driving electrode 14. The shapes and dispositions of the first driving electrode 12, the first monitor electrode 13, the second driving electrode 14, and the second monitor electrode 15 in a plan view are not limited to the example shown in FIG. 4.

The Fabry-Perot interference filter 1 further includes terminals 16, 17, 18, and 19. Each of the terminals 16 to 19 is provided on an outer side of the light transmitting region 1a in a plan view. Each of the terminals 16 to 19 is formed of a metal film such as aluminum or an alloy thereof, for example. The terminal 16 faces the terminal 17 with the light transmitting region 1a interposed therebetween, and the terminal 18 faces the terminal 19 with the light transmitting region 1a interposed therebetween. A direction in which the terminals 16 and 17 face each other is orthogonal to a direction in which the terminals 18 and 19 face each other (refer to FIG. 1).

The terming 16 is disposed inside the penetration hole reaching the first laminate 22 from the surface 24a of the second laminate 24. The terminal 16 is electrically connected to the first driving electrode 12 via a wiring 12a. The terminal 17 is disposed inside the penetration hole reaching the intermediate layer 23 from the surface 24a of the second laminate 24. The terminal 17 is electrically connected to the first monitor electrode 13 via a wiring 13a.

The terminal 18 is disposed on the surface 24a of the second laminate 24. The terminal 18 is electrically connected to the second driving electrode 14 via a wiring 14a. The terminal 19 is disposed inside the penetration hole reaching the polysilicon layer 27a from the surface 24a of the second laminate 24. The terminal 19 is electrically connected to the second monitor electrode 15 via a wiring 15a.

A trench T1 and a trench T2 are provided with a surface 22b of the first laminate 22. The trench T1 annularly extends to surround a connection part in the wiring 13a with respect to the terminal 17. The trench T1 electrically insulates the first driving electrode 12 and the wiring 13a from each other. The trench T2 annularly extends along a boundary between the first driving electrode 12 and the first monitor electrode 13. The trench T2 electrically insulates the first driving electrode 12 and a region on an inner side of the first driving electrode 12 (that is, the first monitor electrode 13) from each other. Due to the trenches T1 and T2, the first driving electrode 12 and the first monitor electrode 13 are electrically insulated from each other. The region within each of the trenches T1 and T2 may be an insulating material or may be an air gap. In FIG. 4, the trenches T1 and T2 are not illustrated.

A pair of trenches T3, a trench T4, and a trench T5 are provided with the surface 24a of the second laminate 24. The pair of trenches T3 annularly extend to surround the terminals 16 and 17 respectively. The trenches T3 electrically insulate the terminals 16 and 17 respectively from the second driving electrode 14 and the second monitor electrode 15. The trench T4 annularly extends to surround the terminal 19. The trench T4 electrically insulates the terminal 19 from the second driving electrode 14. The trench T5 annularly extends along an inner edge of the second driving electrode 14. The trench T5 electrically insulates the second driving electrode 14 from a region on an inner side of the second driving electrode 14. The second driving electrode 14 and the second monitor electrode 15 are electrically insulated from each other by the trenches T3 to T5. The region within each of the trenches T3 to T5 may be an insulating material or an air gap.

An antireflection layer 41, a third laminate 42, an intermediate layer 43, and a fourth laminate 44 are laminated on the second surface 11b of the substrate 11 in this order. The antireflection layer 41 and the intermediate layer 43 have configurations similar to those of the antireflection layer 21 and the intermediate layer 23 respectively. The third laminate 42 and the fourth laminate 44, and the first laminate 22 and the second laminate 24 respectively have symmetry in lamination structure with respect to the substrate 11. The antireflection layer 41, the third laminate 42, the intermediate layer 43, and the fourth laminate 44 have a function of minimizing a warp in the substrate 11.

The third laminate 42, the intermediate layer 43, and the fourth laminate 44 are thinned along the outer edge of the outer edge portion 11c. That is, parts of the third laminate 42, the intermediate layer 43, and the fourth laminate 44 along the outer edge of the outer edge portion 11c are thinner than other parts excluding parts of the third laminate 42, the intermediate layer 43, and the fourth laminate 44 along the outer edges thereof. In the Fabry-Perot interference filter 1, the third laminate 42, the intermediate layer 43, and the fourth laminate 44 are thinned by removing all of the third laminate 42, the intermediate layer 43, and the fourth laminate 44 in a part overlapping the thinned portion 34b in a plan view.

An opening 40a is provided with the third laminate 42, the intermediate layer 43, and the fourth laminate 44 to overlap the light transmitting region 1a in a plan view. The opening 40a has a diameter substantially the same as the size of the light transmitting region 1a. The opening 40a is open on a light emitting side. A bottom surface of the opening 40a reaches the antireflection layer 41.

A light shielding layer 45 is formed on a surface of the fourth laminate 44 on the light emitting side. The light shielding layer 45 is formed of a metal film such as aluminum or an alloy thereof, for example. A protective layer 46 is formed on a surface of the light shielding layer 45 and an inner surface of the opening 40a. The protective layer 46 covers the outer edges of the third laminate 42, the intermediate layer 43, the fourth laminate 44, and the light shielding layer 45 and covers the antireflection layer 41 on the outer edge portion 11c. For example, the protective layer 46 is formed of aluminum oxide. An optical influence of the protective layer 46 can be disregarded by causing the thickness of the protective layer 46 to range from 1 nm to 100 nm (preferably, 30 nm approximately).

Configuration of Optical Filter System

Figure 5:
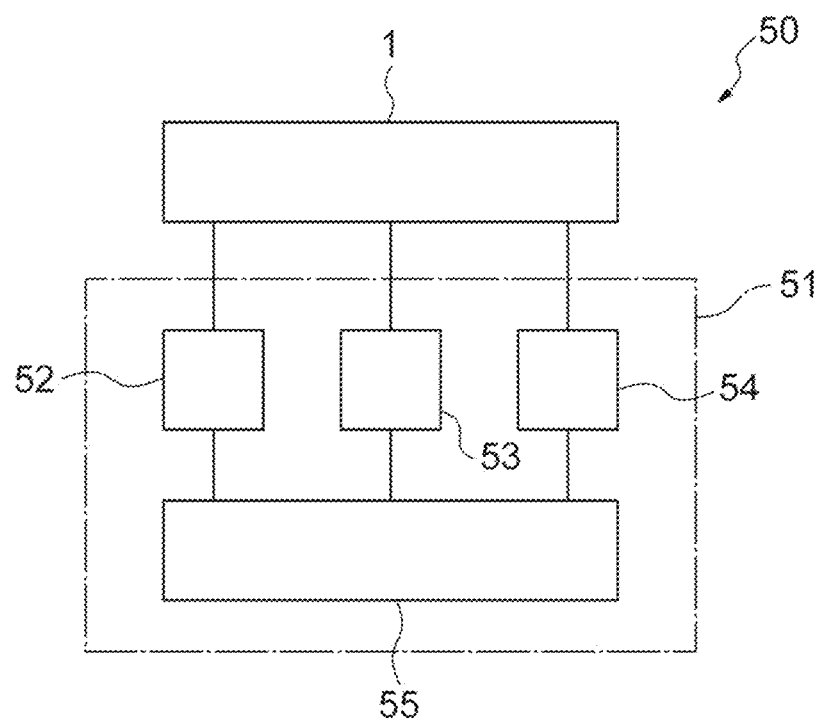
FIG. 5 is a diagram of a configuration of the optical filter system.

As illustrated in FIG. 5, an optical filter system 50 includes the Fabry-Perot interference filter 1 described above and a controller 51 controlling the Fabry-Perot interference filter 1. The controller 51 includes a first current source 52, a second current source 53, a detection unit 54, and a control unit 55.

The first current source 52 applies a driving current between the first driving electrode 12 and the second driving electrode 14 through the terminals 16 and 18 to generate an electrostatic force corresponding to the driving current between the first driving electrode 12 and the second driving electrode 14. Due to the electrostatic force, the second mirror portion 32 is attracted to the first mirror portion 31 side fixed to the substrate 11, and the distance between the first mirror portion 31 and the second mirror portion 32 is adjusted. In this way, in the Fabry-Perot interference filter 1, the distance between the first mirror portion 31 and the second mirror portion 32 changes due to an electrostatic force.

The wavelength of light transmitted through the Fabry-Perot interference filter 1 depends on the distance between the first mirror portion 31 and the second mirror portion 32 in the light transmitting region 1a. Therefore, the wavelength of light to be transmitted can be selected by adjusting a driving current applied between the first driving electrode 12 and the second driving electrode 14.

In the optical filter system 50, for example, a wavelength spectrum can be obtained by detecting light which has been transmitted through the light transmitting region 1a of the Fabry-Perot interference filter 1 by a light detector while changing a driving current applied to the Fabry-Perot interference filter 1 (that is, which changing the distance between the first mirror portion 31 and the second mirror portion 32).

The second current source 53 applies an alternating current having a frequency higher than resonance frequencies of the first mirror portion 31 and the second mirror portion 32 between the first monitor electrode 13 and the second monitor electrode 15 though the terminals 17 and 19. For example, the frequency of the alternating current is set to be higher than ten times the resonance frequency. While the alternating current is applied by the second current source 53, an alternating voltage is generated between the first monitor electrode 13 and the second monitor electrode 15. For example, the detection unit 54 is a voltmeter and detects the alternating voltage.

The control unit 55 is constituted of a computer including a processor and a memory, for example. The control unit 55 controls the first current source 52 based on the amount of electric charge stored between the first mirror portion 31 and the second mirror portion 32. For example, the control unit 55 controls the first current source 52 such that the amount of electric charge reaches a target amount. The target amount is set in accordance with a target value for the distance between the first mirror portion 31 and the second mirror portion 32. Accordingly, the distance between the first mirror portion 31 and the second mirror portion 32 is adjusted to a desired distance.

Moreover, the control unit 55 calculates the electrostatic capacitance between the first mirror portion 31 and the second mirror portion 32 based on the detection result of the detection unit 54, that is, the alternating voltage detected by the detection unit 54. The electrostatic capacitance can be calculated based on the alternating current applied between the first monitor electrode 13 and the second monitor electrode 15, the alternating voltage generated between the first monitor electrode 13 and the second monitor electrode 15, and the frequency of the alternating current and the alternating voltage. More specifically, using the alternating current and the alternating voltage, the complex impedance $Z(\omega)$ as a function of angular frequency $\omega$ is given by $Z(\omega)=V(\omega)/I(\omega)$, and the electrostatic capacitance C is given by $C=(\omega \times |Z(w)|)^{-1}$. The control unit 55 calculates the distance between the first mirror portion 31 and the second mirror portion 32 based on the obtained electrostatic capacitance. Accordingly, the actual distance between the first mirror portion 31 and the second mirror portion 32 can be accurately monitored while the Fabry-Perot interference filter 1 is in operation.

Function and Effect

As described above, in the optical filter system 50, the Fabry-Perot interference filter 1 includes the first monitor electrode 13 and the second monitor electrode 15 in addition to the first driving electrode 12 and the second driving electrode 14. The electrostatic capacitance between the first mirror portion 31 and the second mirror portion 32 is calculated based on the alternating voltage generated between the first monitor electrode 13 and the second monitor electrode 15 when an alternating current having a frequency higher than resonance frequencies of the first mirror portion 31 and the second mirror portion 32 is applied between the first monitor electrode 13 and the second monitor electrode 15. Accordingly, the distance between the mirror portions 31 and 32 can be calculated based on the electrostatic capacitance, and the actual distance between the mirror portions 31 and 32 can be monitored while the Fabry-Perot interference filter 1 is in operation. Moreover, the first monitor electrode 13 is provided with the first mirror portion 31 to overlap the light transmitting region 1a in a plan view and is electrically insulated from the first driving electrode 12. The second monitor electrode 15 is provided with the second mirror portion 32 to face the first monitor electrode 13 and is electrically insulated from the second driving electrode 14. Accordingly, the first monitor electrode 13 and the second monitor electrode 15 can be independent from the first driving electrode 12 and the second driving electrode 14. As a result, the electrostatic capacitance between the mirror portions 31 and 32 can be more preferably calculated, and the distance between the mirror portions 31 and 32 can be more preferably monitored. Therefore, according to the optical filter system 50, reliability can be enhanced.

In addition, in the optical filter system 50, the first driving electrode 12 is exposed to the air gap S. Accordingly, the first driving electrode 12 can be close to the second driving electrode 14, and an electrostatic force can be preferably generated between the mirror portions 31 and 32.

In addition, in the optical filter system 50, the second driving electrode 14 is disposed on the surface 32a on a side opposite to the air gap S of the second mirror portion 32. Accordingly, because there is no need to form a contact hole in the second mirror portion 32 when the second driving electrode 14 and the wiring 14a are formed, the forming step for the second driving electrode 14 can be facilitated.

In addition, in the optical filter system 50, the first monitor electrode 13 is exposed to the air gap S. Accordingly, the first monitor electrode 13 can be close to the second monitor electrode 15, and the distance between the mirror portions 31 and 32 can be more preferably monitored.

In addition, in the optical filter system 50, the second monitor electrode 15 may be exposed to the air gap S. Accordingly, the second monitor electrode 15 can be close to the first monitor electrode 13, and the distance between the mirror portions 31 and 32 can be more preferably monitored.

In addition, in the optical filter system 50, the second driving electrode 14 and the second monitor electrode 15 are separated from each other in a direction in which the mirror portions 31 and 32 face each other. Accordingly, electrical insulation properties between the second driving electrode 14 and the second monitor electrode 15 can be improved.

Modification Example

Figure 6:
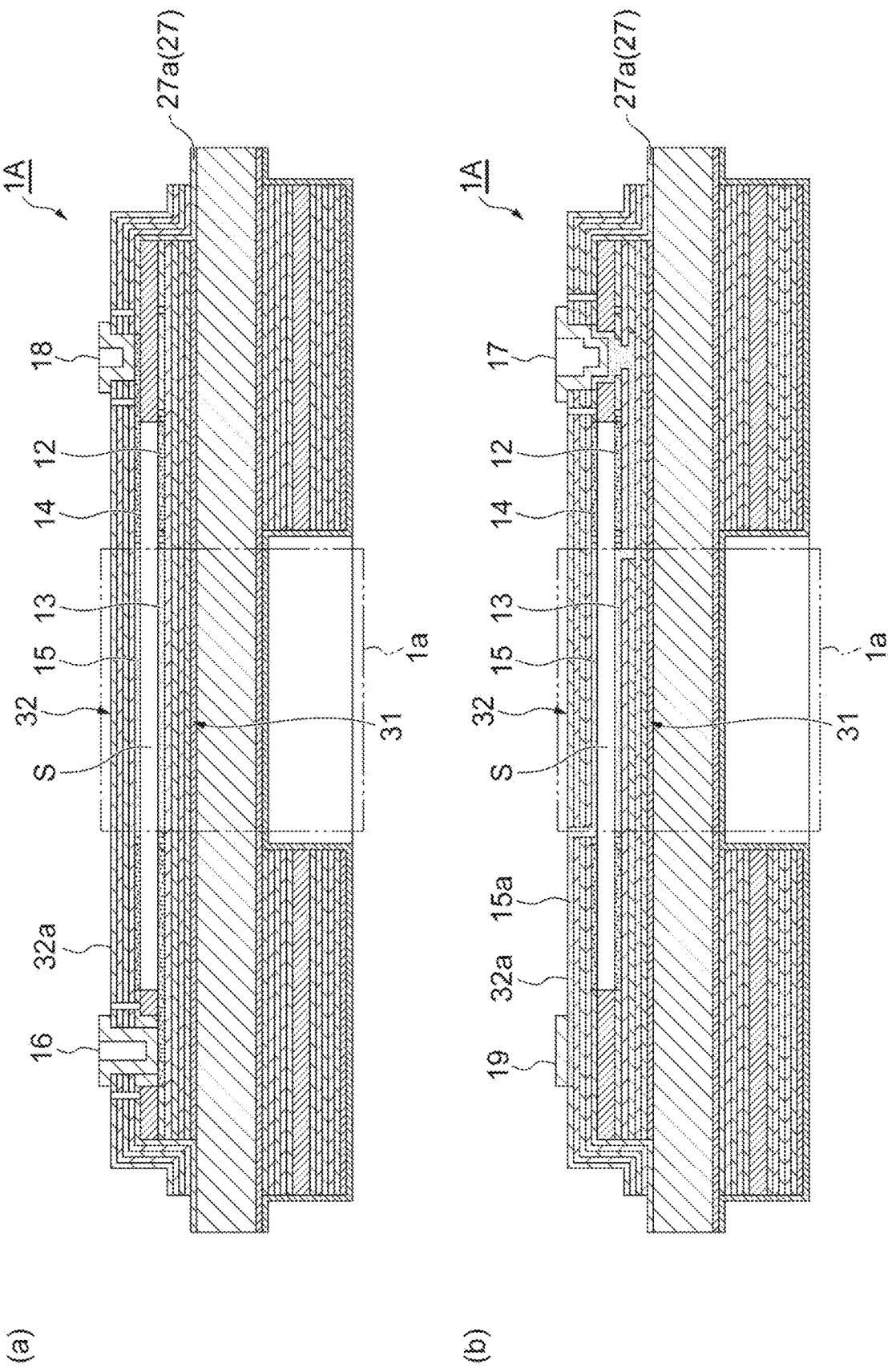
FIG. 6(a) and FIG. 6(b) are cross-sectional views of a Fabry-Perot interference filter according to a first modification example.

The present disclosure is not limited to the embodiment described above. For example, the Fabry-Perot interference filter 1 may be constituted as a Fabry-Perot interference filter 1A in a first modification example illustrated in FIG. 6(a) and FIG. 6(b). In the first modification example, the second driving electrode 14 is formed in the polysilicon layer 27a and is exposed to the air gap S. That is, the second driving electrode 14 and the second monitor electrode 15 are formed in the same polysilicon layer 27. Therefore, the wiring 15a has a part which extends along the surface 32a of the second mirror portion 32 from the terminal 19, and a part which extends along a direction in which the mirror portions 31 and 32 face each other and is connected to the edge portion of the second monitor electrode 15.

Even in such a first modification example, reliability can be enhanced similarly to the embodiment described above. In addition, since the second driving electrode 14 is exposed to the air gap S, the second driving electrode 14 can be close to the first driving electrode 12, and an electrostatic force can be more preferably generated between the mirror portions 31 and 32.

Figure 7:
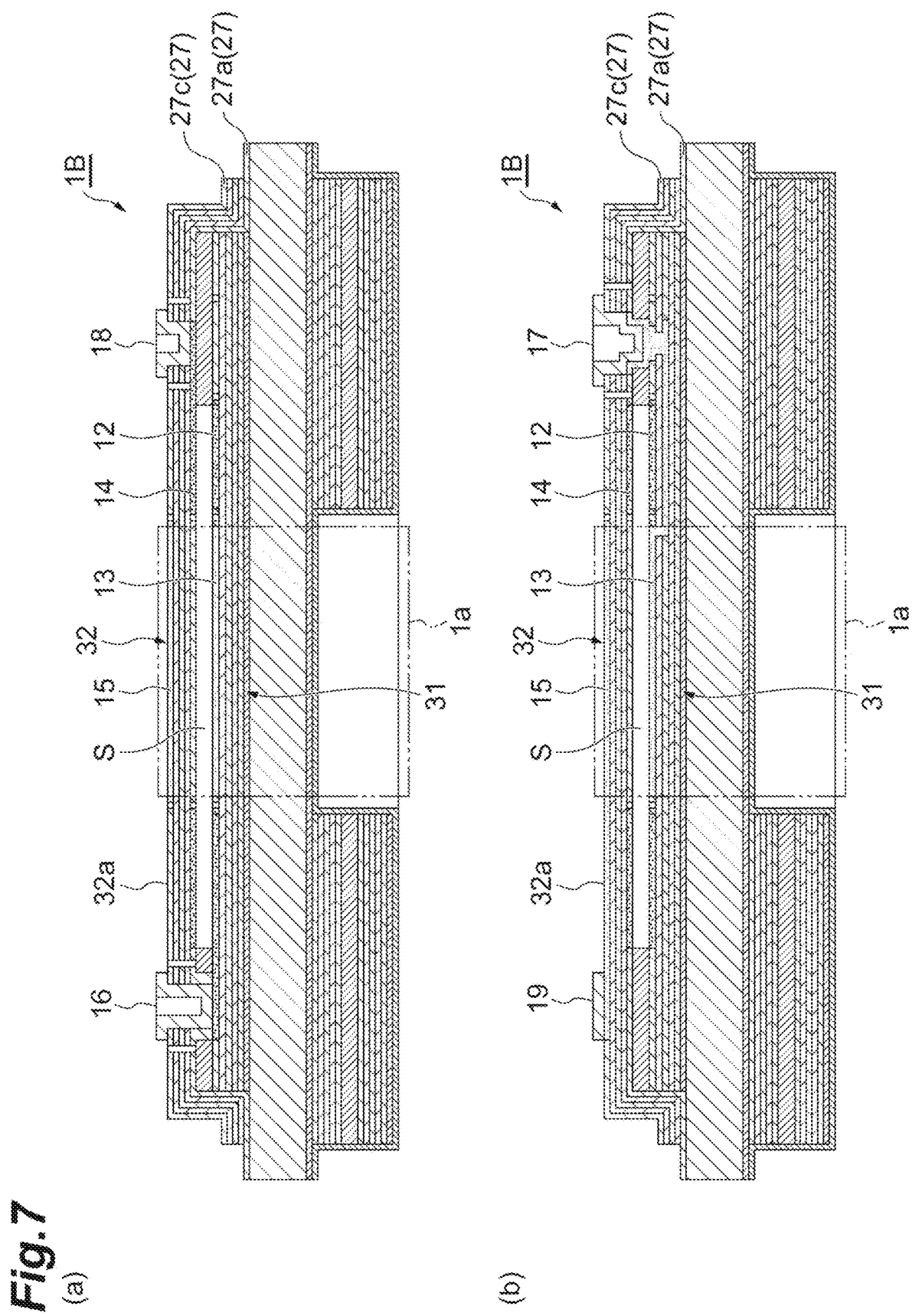
FIG. 7(a) and FIG. 7(b) are cross-sectional views of a Fabry-Perot interference filter according to a second modification example.

The Fabry-Perot interference filter 1 may be constituted as a Fabry-Perot interference filter 1B in a second modification example illustrated in FIG. 7(a) and FIG. 7(b). In the second modification example, the second driving electrode 14 is formed in the polysilicon layer 27a and is exposed to the air gap S. The second monitor electrode 15 is formed in the polysilicon layer 27c and is disposed on the surface 32a of the second mirror portion 32.

Even in such a second modification example, reliability can be enhanced similarly to the embodiment described above. In addition, since the second driving electrode 14 is exposed to the air gap S, the second driving electrode 14 can be close to the first driving electrode 12, and an electrostatic force can be more preferably generated between the mirror portions 31 and 32. In addition, since the second monitor electrode 15 is disposed on the surface 32a of the second mirror portion 32 and there is no need to form a contact hole in the second mirror portion 32 when the second driving electrode 14 and the wiring 14a are formed, the forming step for the second monitor electrode 15 can be facilitated.

The Fabry-Perot interference filter 1 may be constituted as a Fabry-Perot interference filter 1C in a third modification example illustrated in FIG. 8(a) and FIG. 8(b). In the third modification example, the second driving electrode 14 is formed in the polysilicon layer 27a and is exposed to the air gap S. That is, the second driving electrode 14 and the second monitor electrode 15 are formed in the same polysilicon layer 27. Therefore, the wiring 15a has a part which extends along the polysilicon layer 27b from the terminal 19, and a part which extends along a direction in which the mirror portions 31 and 32 face each other and is connected to the edge portion of the second monitor electrode 15.

Even in such a third modification example, reliability can be enhanced similarly to the embodiment described above. In addition, since the second driving electrode 14 is exposed to the air gap S, the second driving electrode 14 can be close to the first driving electrode 12, and an electrostatic force can be more preferably generated between the mirror portions 31 and 32.

The Fabry-Perot interference filter 1 may be constituted as a Fabry-Perot interference filter 1D in a fourth modification example illustrated in FIG. 9(a) and FIG. 9(b). In the fourth modification example, the second driving electrode 14 is formed in the polysilicon layer 27a and is exposed to the air gap S. The second monitor electrode 15 is formed in the polysilicon layer 27b and is disposed in the middle of the second mirror portion 32 in a direction in which the mirror portions 31 and 32 face each other.

Even in such a fourth modification example, reliability can be enhanced similarly to the embodiment described above. In addition, since the second driving electrode 14 is exposed to the air gap S, the second driving electrode 14 can be close to the first driving electrode 12, and an electrostatic force can be more preferably generated between the mirror portions 31 and 32.

Figure 10:
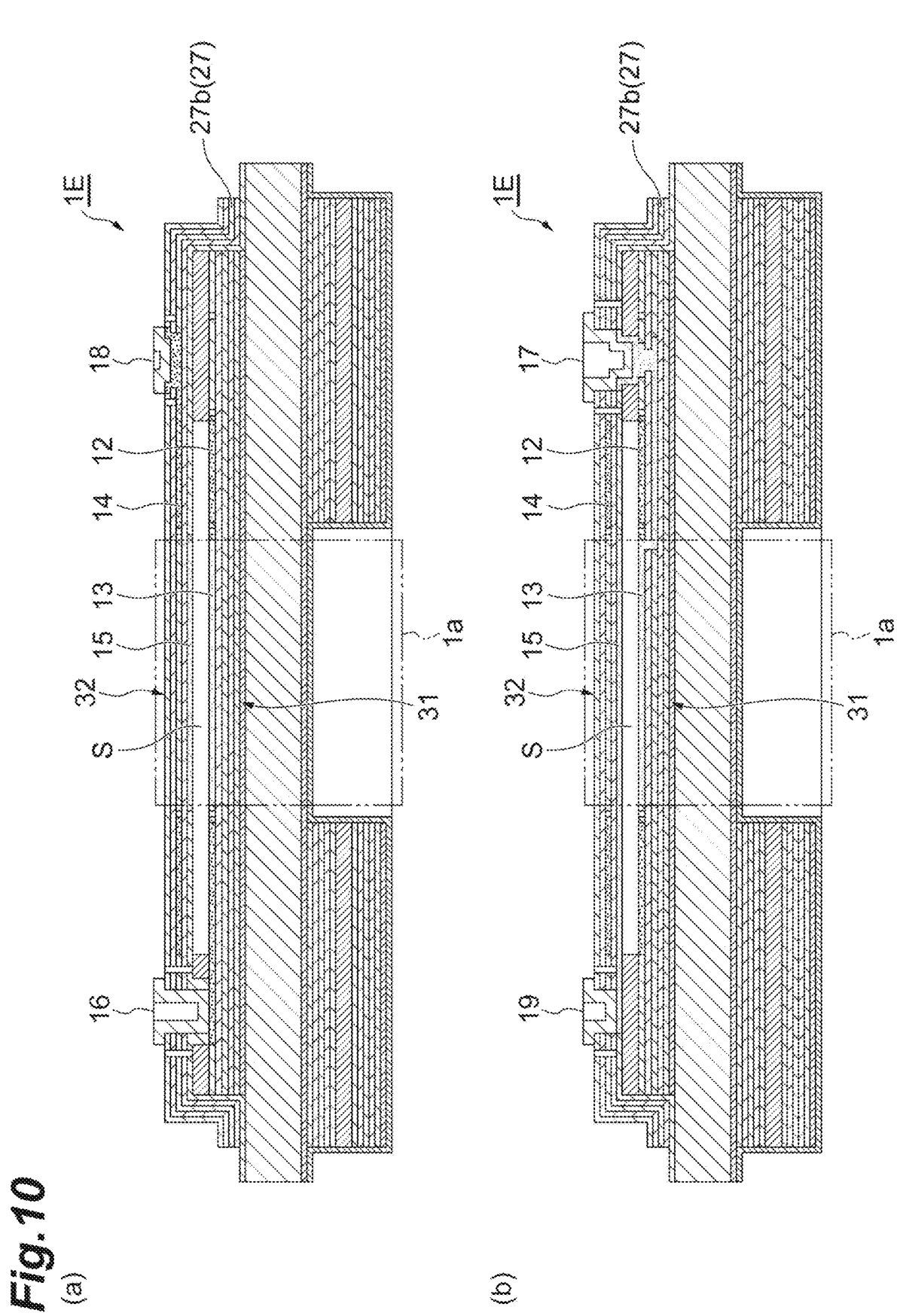
FIG. 10(a) and FIG. 10(b) are cross-sectional views of a Fabry-Perot interference filter according to a fifth modification example.

The Fabry-Perot interference filter 1 may be constituted as a Fabry-Perot interference filter 1E in a fifth modification example illustrated in FIG. 10(a) and FIG. 10(b). In the fifth modification example, the second driving electrode 14 is formed in the polysilicon layer 27b and is disposed in the middle of the second mirror portion 32 in a direction in which the mirror portions 31 and 32 face each other. Even in such a fifth modification example, reliability can be enhanced similarly to the embodiment described above.

In the embodiment described above and each of the modification examples, the material and the shape of each configuration are not limited to the materials and the shapes described above, and various materials and shapes can be employed. For example, disposition of the terminals 16, 17, 18, and 19 is not limited to the examples described above, and the terminals 16, 17, 18, and 19 may be disposed at any position.

Second Disclosure

The second disclosure relates to a dedicated method of actuation control for MEMS/MOEMS (Micro-Electro-Mechanical System/Micro-Opto-Electro-Mechanical System) or other micro-machined actuator devices, which consist of a capacitive structure, implemented with two electrodes facing each other. At least one of the electrodes is spring-loaded and movable. Usually such structures are electrostatically controlled by applying a control voltage to the capacitor plates, causing a mechanical displacement. As an application example, such an arrangement is used in MEMS-based Fabry-Perot Interferometers, where the distance between the electrodes is very small, for example a few µm or less, and where the distance between the electrodes needs to be known with very high precision, for example better than 10 nm, as it determines the transmission and reflection spectra of the device. Thus these devices need a suitable electro-mechanical calibration.

The presented new electronic circuit and method of control of an electrostatic actuator is based on supplying exact amounts of charge Q instead of applying a control voltage V. This avoids the so-called "Pull-in" effect, which can damage the device or its device specific calibration because the two electrodes come so close that it is difficult or even impossible to separate them again. Additionally, the charged-based control substantially extends the accessible tuning range of the device. Moreover, it allows implementing two independent measurement processes for the resulting distance d. A first method is a quasi-static capacitance measurement using charge control, which becomes possible by the above-mentioned charge-based control. A second method is a special implementation of a high frequency capacitance measurement, which is also based on charge control. At least one of both methods eliminates many calibration or recalibration steps and gives full control over the resulting electrode distance even under conditions of temperature changes, or effects of mechanical drift or hysteresis. In addition, the novel actuator control system can be used to characterize electrostatic actuators using electrical parameters without the risk of damaging the actuator due to the "pull-in" effect.

The method according to the second disclosure can be employed for any type of electrostatic actuator characterized by the Feature 1 described below without the need of modifying the actuator device itself.

A preferred embodiment of the electrostatic actuator controller according to the second disclosure consists of an ASIC (Application Specific Integrated Circuit), implementing all required components of the electronic circuit on a single chip.

In another preferred embodiment of the second disclosure, the operation by charge control will form an integral part of device design rules and new micro-machined MEMS/MOEMS actuators with electrostatic control will be developed, which will provide considerably extended or even new functionalities through the use of the new charge-based controller and the distance measurement system using the same.

Background

In the fields of MEMS and MOEMS structures there are resonant and non-resonant devices. Typically such structures have one or more degrees of freedom for mechanical movement and there are many different types of actuator methods, such as electromagnetic, piezoelectric, electrostatic methods. All of these methods create a force on the movable structure to induce either dynamic or resonant oscillations, or static deflections of such structures. In addition, MOEMS structures often transform the information of the mechanical degree of freedom such as distance or angle into an optical functionality such as e.g. variation of an optical resonator's cavity length into an angle of deflection or, as another example, linear movements into phase variations of an interferometer arm. Common to all these applications is that the setup should very robust, in particular for portable applications, and that the actual SET positions or SET angles of those degrees of freedom need to be precisely controlled. Most such systems suffer from detrimental effects such as substantial temperature dependence or mechanical hysteresis. Thus it is even more important to know or to affect the actual position of those degrees of freedom.

In an electrostatic resonant MEMS mirror for example, actuation is effectuated by controlling the voltages between the movable and the fixed electrodes (e.g. actuator combs), while precise determination of actual dynamic mirror positions can be ensured by piezoelectric distance encoders in silicon integrated into the same device. Separating actuation control and detecting the status of the degree of freedom by a measurement allows creating a device which only needs a "one-point, one-time" calibration per sample, which is free of drift and hysteresis and for which temperature effects are fully compensated.

The second disclosure is related to a particular type of MEMS/MOEMS structure, which is described best by the following characteristics:
- the structure consists of two electrodes in close vicinity, forming a capacitor, where at least one electrode is mounted by a spring, allowing a movement of that electrode towards the counter electrode.
- The distance d between the electrodes changes when a force F is applied. For explanation purposes the spring is assumed to follow Hooke's law, $F=D*\Delta x$. In reality, there may be non-linearities of the system, but they will not change the fundamental behavior discussed here.
- For explanation purposes the two electrodes form the plates of a capacitor, which are wired for external electrical access to that capacitor.
- The capacitor is filled with air, protection gas, or it is placed in vacuum.

Several optical devices containing actuators use such arrangements. An especially interesting device is the so-called Fabry-Perot Etalon or Fabry-Perot Interferometer (abbreviated in the following as 'FPI'. In FPIs made by micro-machining into silicon, the parallel plates can have small distances in the range of a few µm or less. Such FPI structures additionally contain high-reflection mirrors on both capacitor plates, thus forming an optical cavity. Such a cavity transmits light under normal incidence (i.e. angle of incidence AOI=0° with respect to the normal of the surface) mainly at those wavelengths λ, for which Eq. 1 is fulfilled:

$$2 \times n \times d = M \times \lambda \quad \text{(Equation 1)}$$

with
- d: distance between the plates
- M: an integer called order of the Fabry-Perot-interferometer
- n: the refractive index inside the cavity The chosen distance d thus selects the transmission wavelength λ, of the device up to the ambiguity of higher orders. Lower orders are preferable, as they allow larger tuning ranges without ambiguity of higher orders, the so called free spectral range FSR. As an example, for a low order M=2, the transmitted wavelength equals the distance d between the plates (for n=1.0 and AOI=0°). Since silicon is transparent in the wavelength range above 1.1 µm, such FPI devices are typically used as near Infrared or Infrared spectral analyzers. For an order M=2 the distance is also in a range of less than a few µm.

In order to realize a calibrated device, is it is mandatory to precisely know the actual distance d which the system assumes when applying a respective force F through a suited control parameter as a SET position.

The required distance accuracy depends on the targeted wavelength accuracy of the device. If the targeted wavelength accuracy of an FPI device should be 0.1 nm, then— for the above example of M=2, for which d and λ is equal—also the distance accuracy needs to be 0.1 nm, which is very demanding.

Today such devices are controlled by applying a voltage to the capacitor electrodes. The control voltages lead to an electrical field which results in an attractive force between the plates, thus allowing changing the distance statically between the plates by changing the applied voltage.

In real-world applications, such MEMS/MEOMS structures like the FPI device discussed above have some severe drawbacks:

(1) Each device needs its own individual wavelength calibration, which is expensive. Each device is subjected to a wavelength calibration measurement, in which the peak transmission wavelengths are measured for many different control voltage levels. This is done typically at one temperature $T_0$.

(2) Stability of calibration needs to be investigated to obtain a long-term stable solution. Depending on application, recalibration may be required from time to time.

(3) The spring constant is varying with temperature. If the device is fabricated in silicon, the elasticity of silicon microstructures is related to Young's modulus, which is known to be temperature dependent. There are two options how to use the device at different temperatures:
- to calibrate each device at different temperatures; this procedure is extremely laborious and expensive, and for large-volume applications it may even be prohibitive.
- to work with a general temperature model, which predicts the calibration at temperature $T_1$ from the measured wavelength calibration at $T_0$. The achievable precision then strongly depends on the reproducibility of the series product and the quality of the temperature variation model. Many applications such as in the automotive domain require a quite large temperature operation range of −40° C. to 105° C., in others the devices may even be subject to large temperature cycles e.g. if sterilization of the sensor containing the spectral measurement device is required.

(4) Micro-machined MEMS/MOEMS parallel plate capacitors with variable distances show a phenomenon called "Pull-In" effect: When the control voltage is increased above a certain level, suddenly the system becomes instable and the movable plate accelerates towards the standing capacitor plate; the distance between the plates is decreasing rapidly and the plates collide with each other. Depending on the device, this type of so-called "Pull-In" accidents may cause end of device life or performance degradation or at least a loss of the individual calibration characteristics of the device. It is very important to strictly avoid this runaway effect.

(5) The control voltage above which a "pull-in" effect occurs is depending on temperature—like the wavelength calibration itself. This means that the allowed operation range for the applied control voltage is temperature dependent. For a real-world application this means that a measurement of temperature has to be taken first, before deciding which range of control voltage may be applied safely.

(6) Sample to sample, the "Pull-In" voltage may vary in a production series slightly. Each individual device thus requires its own maximum values for the allowed control voltage at reference temperature $T_0$, as well as rules how to translate these maximum values to other temperatures. Thus, in addition to the wavelength calibration (the coefficients of the wavelength polynomial), there is an additional parameter for each individual FPI device which needs to be taken care of.

(7) In production, when carrying out a characterization of the individual FPI samples for the first time, the individual "Pull-In" point is not known in advance. Some percentage of devices simply will be rendered defective by the "Pull-In" effect, thus reducing the production yield. Additionally the acceptable safe control voltage operation range is a selection parameter good/no-good for each device. Thus the pull-in effect reduces fabrication yield also by the production selection process.

In summary, micro-machined MEMS/MOEMS spring loaded plate capacitor devices have great application potential, as in the case using them as Fabry-Perot Interferometers (FPI) but they show severe drawbacks in fabrication and application. This situation can be overcome with the electronic circuit and electrostatic actuator control method of the second disclosure.

SUMMARY OF THE DISCLOSURE

The second disclosure presented here consists of a different type of electrical control of micro machined MEMS/MOEMS systems with a capacitive structure and at least one spring-loaded movable electrode. As described below, the "Pull-In" effect can be avoided completely, the usable tuning range can be extended substantially, and due to the different type of electrical control, two new ways of measuring and determining the distance d become available, thus solving many of the calibration and temperature-related issues. In the best case, the device is rendered fully self-calibrating with one single point calibration. Additionally, the new electrical control can be used to excite resonance modes of the MEMS/MOEMS system at desired resonance frequencies at any distance d without any danger of invoking the "Pull-In" effect or causing ambiguity of the system state.

The electrostatic actuator controller system according to the second disclosure allows modifying the product designs of such devices in a way that the functional range can significantly be extended, in particular due to freedom from any "Pull-In" effect and due to considerably increased tuning ranges.

Today the electrical control of the considered MEMS/MOEMS system with capacitive structure and at least one spring-loaded movable electrode is realized by applying a control voltage to the capacitor electrodes and thus charging both electrodes with opposite charge polarities, leading to an attractive force between the electrodes. As we will show in the detailed description, this procedure results in unexpected ambiguity of system states in terms of distance d and potentially leading to the "Pull-In" effect.

The steps of the second disclosure consist of three essential elements:

a new way of electrically controlling electrostatic actuators, resulting in novel controller electronic circuits two new and independent distance measurement methods, one quasi-static, and the other based on high frequency measurement extending the controller for different other manners of operation e.g. introducing a reset and exploiting feedback for stable resonance excitation.

In more detail, steps of the second disclosure are
(1) to effectuate the electrical control of the actuator system by controlling the electrical charge, implying control over DC current and time, instead of voltage. Possible implementations will be explained below in a separate section. If charge control is made by using DC currents, then one key point of the second disclosure is to make the electrical control connection switchable, allowing to connect or disconnect the charge or current source from the MEMS/MOEMS capacity at precisely controllable times. This allows that the placement of precisely defined charge amounts on the MEMS/MOEMS capacitor in a well-defined manner and that the resulting charge amount at the capacitor can be kept constant ('frozen', up to leakage currents) by just disconnecting the electrical control connection by a switch. As finally there are more than one charge-providing circuit covering different application needs, these current source units can preferably be selected by electrically switching between them.

(2) to measure the resulting voltage across the electrodes of the capacitor. Since the voltage is no longer used as electrical control signal, it is available as a dependent measurand, thus giving the voltage of the capacitor under the applied charge amount defined by means of (1). (For clearness of description, this voltage is called 'resulting voltage' in the following). Effectively, this method is a static capacitance measurement by setting charge Q and measuring resulting voltage V. As the capacitance is strongly dependent on the distance d between capacitor electrodes, it is possible to determine this distance between the electrodes from knowing the defined charge Q and the resulting voltage V.

For simple capacitor geometries such as a parallel plate capacitor actuator, the distance d can be calculated by a simple formula when knowing the effective capacitor area A. For arbitrary capacitor geometries, a description of the relation between distance of electrodes and capacitance value is needed. Such a relation can be established by a general calibration made from a series of devices of same type. The calibration then is valid for this type of capacitor design. This way it is possible to determine the actual distance between the electrodes from the measured capacitance value for less simple capacitor structures.

(3) to introduce a new method of high frequency capacitance measurement: usually high frequency capacity measurement are made by modulating the voltage, then measuring the resulting current. Having understood that the system state is instable when voltage is used as control parameter, the new method to do high frequency capacitance measurement is to carry out this measurement by modulating the actual capacitor charge in a small signal regime at a frequency, which is much higher than mechanical resonance frequencies of the MEMS/MOEMS oscillatory system, while measuring the resulting AC voltage.

As mentioned under (2) it is possible to determine the distance d between the electrodes by knowing the defined charge Q and the resulting voltage V. This additional measurement method (3) is needed as there are operation points for which the static capacitance measurement fails to give a precise distance. These are the same points, at which the "Pull-In" effect occurs if the systems is driven by a control voltage.

(4) to implement a reset function by connecting the actuator with a given (reset) voltage source, for example zero volts for the actuator's mechanical equilibrium position.

(5) use the AC charge control also for resonant excitation of the micro-machined MEMS/MOEMS oscillatory systems with capacitive structure and at least one spring-loaded movable electrode at any charge amount defined before by means of (1) meaning at a predetermined distance d which is accessible with the charge-based control. Again the different functional driver units are switchable, i.e. electrically connectable and disconnectable. For this case of resonant excitation the controller contains an AC voltage measurement circuit which can detect AC modulation amplitude and phase lag with reference to the phase of the AC current used for exciting a forced oscillation.

In order to understand the meaning of these steps of the second disclosure, some detailed considerations are required, which will explain the nature of the so called "Pull-In" effect. It is essential to understand that the "pull-in" effect is not a micro-mechanical defect but rather a natural consequence of the interaction of purely mechanical with electromechanical forces.

Detailed Description of the Disclosure

Figure 11:
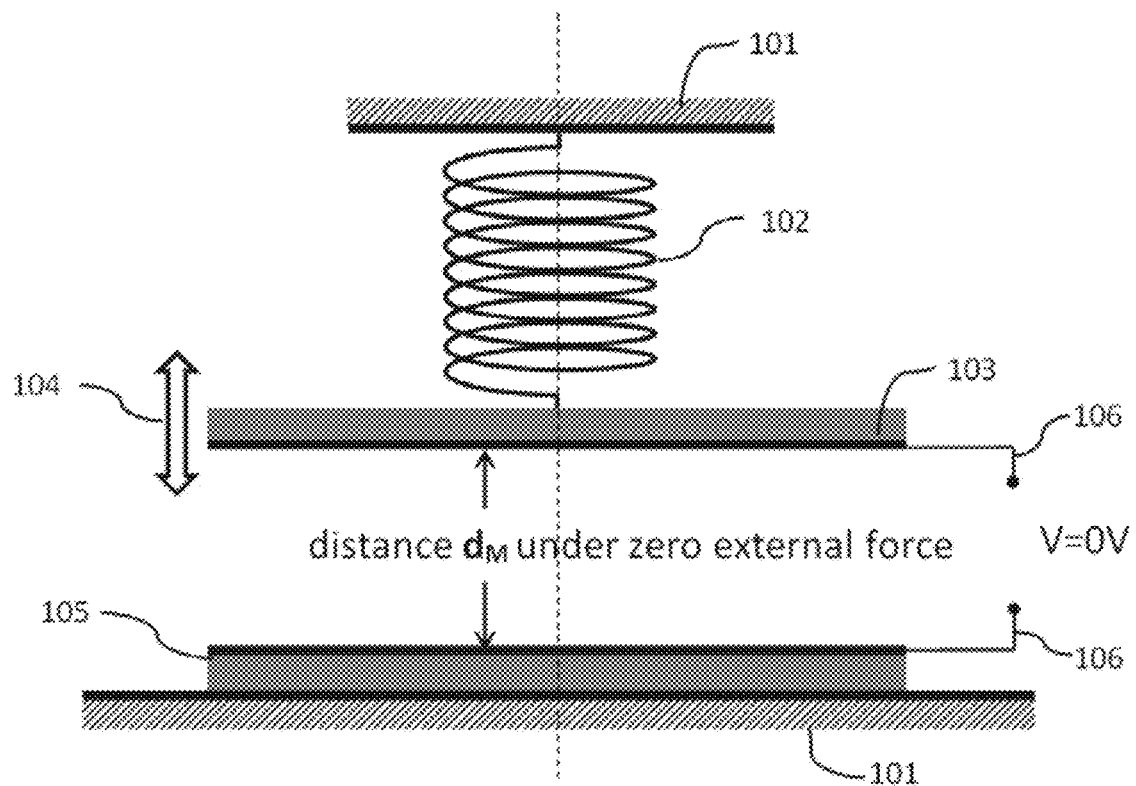
FIG. 11 is a simplified sketch of the micro-machined or MEMS/MOEMS parallel plate capacitor; for ease of description one plate 103 can move into the direction normal to the plate (degree of freedom 104), thus changing the distance d between the plates 103,105. The moving plate 103 is held in place by a spring 102 characterized by a spring constant D. The spring 102 is attached to a mechanical fixture 101 like the 2nd capacitor plate 105, too. Without applying any external force between the plates, the distance between the plates equals the mechanical zero-force distance $d_M$. (The influence of gravity is disregarded here).

<Simplified Description of the Situation>:

FIG. 11 shows the sketch of a micro-machined MEMS/MOEMS parallel plate capacitor and the electrical wiring 106. The capacitor electrodes have an effective capacitor area A. If a force F is acting on one plate, only one degree of freedom 104 is allowed, which is changing the distance d between the capacitor plates 103,105 by movement of one plate 103 normal to the plate only. The electrical wiring 106 and circuit is made in a way that capacitor plates 103,105 will charge with opposite polarity independent of the polarity of the voltage. Without any external force (assuming that the gravitation force is negligible), the distance between the plates 103,105 is in equilibrium at a distance $d_M$, where the index M stands for "mechanical". If the attractive force F is increased, the distance between the plates 103,105 will shrink further and further, until the two plates are in contact, corresponding to distance zero.

The relation between the elongation $\Delta x$ and the force is given by Hooke's law $$F = D \times \Delta x \quad \text{(Equation 2)}$$

with D being the spring constant
and $\Delta x$ the elongation of the spring 102 from
the point of zero force.

Figure 12:
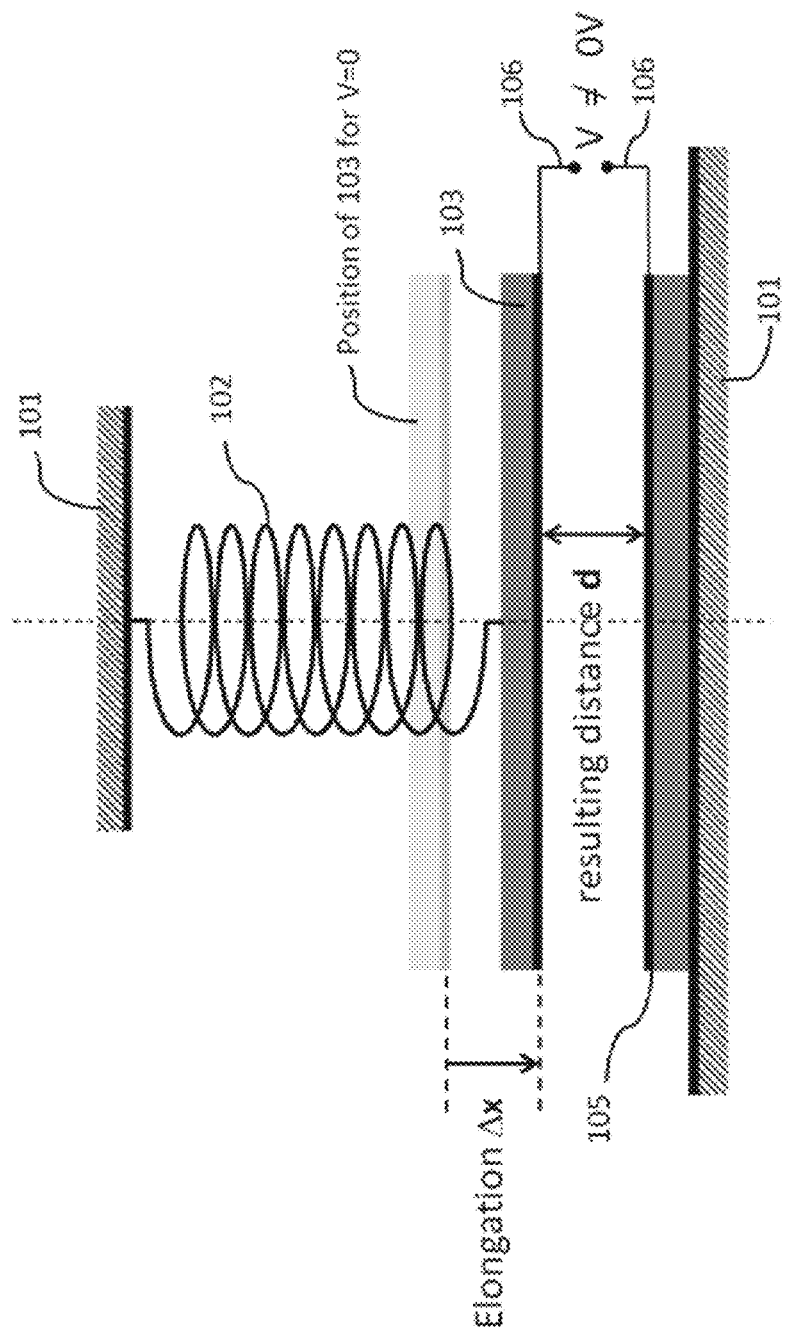
FIG. 12 is a sketch of the same system as in FIG. 11. To change the distance d the state of the art is to apply a control voltage V to the electrode wires 106 of the capacitor, which changes the distance between the plates by elongation of the spring 102.

The force between two parallel capacitor plates 103,105 can be described as a function of the Charge Q on the capacitor:

$$|F| = (2\varepsilon_0 A)^{-1} \times Q^2 \quad \text{(Equation 3)}$$

with
$\varepsilon_0$: permittivity constant
A: effective area of the capacitor
Q: charge on the capacitor.
|F|: absolute value of force F As long as both capacitor plates are charged with charges of opposite polarity, the force F is attractive, trying to reduce the distance d between the plates. The situation with an attractive force F is show in FIG. 12

The capacity of the capacitor is simply given by $$C = \varepsilon_0 A / d \quad \text{(Equation 4)}$$

It is important to note that the capacity depends on the actual distance d. With C=Q/V and Eq. 4, the force F can be rewritten as $$|F| = 0.5 \varepsilon_0 A \times V^2 / d^2 \quad \text{(Equation 5)}$$

with V being the control voltage.
Using the control voltage V makes it easy to give a description of the distance d as a function of the control voltage as follows:

$$d = d_M - D^{-1}(\varepsilon_0 A/2) \times V^2 / d^2 \quad \text{(Equation 6)}$$

with D being the spring constant

Eq. 6 is of order 3 in powers of d and it is possible to solve it with the Cardano formulas. In any case the relationship between d(V) and V will be strongly non-linear. That is the reason why usually calibration formulas are provided, which fit the distance d as a function of V using very high polynomial orders such as 7 or more.

Figure 13:
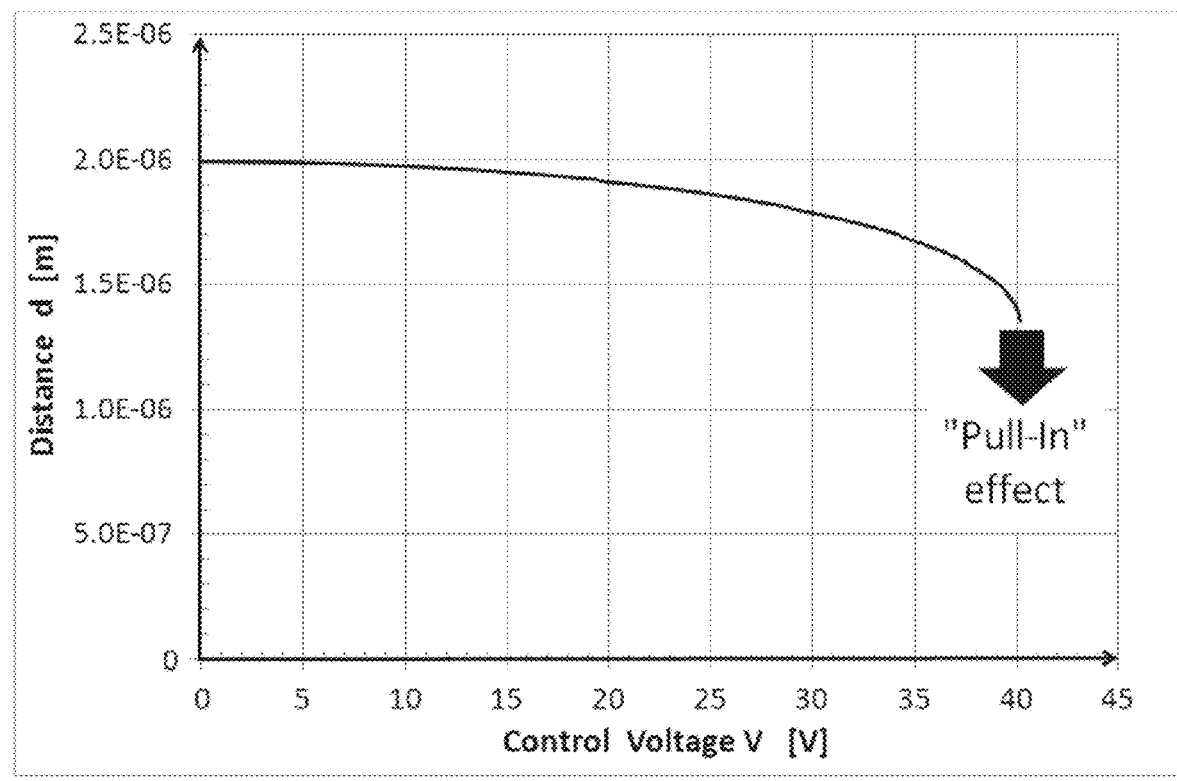
FIG. 13 is a graph of an example for a typical curve between control voltage V and the resulting distance d. The calculation was made for the following parameters: area $A=3.85*10^{-7}$ m$^2$ and spring constant $D=2.35*10^3$ N/m. For low voltages the distance is decreasing gradually. For larger voltages, the distance is changing faster and faster until the "Pull-In" phenomena occurs at a distance given by Eq. 10 described below (explanation see text or next figures).

A typical result for such a curve is shown in FIG. 13. Parameters chosen relate to real data as given in the document 'Technical note: MEMS-FPI spectrum sensors C13272-01/02' issued by Hamamatsu Photonics, May 2017.

With increasing control voltage, the distance is decreased, initially only slowly at small voltages. But with rising control voltage, the slope $\partial d / \partial V$ is increasing, in a way that small increments of the control voltage causes huge displacement of the capacitor plates towards each other, thus leading to the "pull-in" effect. Note that the useful range of controllable distances is strongly limited by this "Pull-In" phenomenon and that the onset-point of that "Pull-In" phenomenon is temperature-dependent.

In order to overcome this limitation of the state of the art, it is important to understand the physical origin of the force between the capacitor plates again: the attractive force is generated when the charges of one capacitor side experience the electrical field generated by the charges on the second capacitor side (and vice versa). This double dependence on the charge Q is the reason that the attractive force is proportional to the square of the charge Q. Additionally it is known that the force between parallel capacitor plates given as function of the charge Q (resp. its square $Q^2$) is not depending on the distance d between the capacitor plates.

Thus the equation for the resulting distance d can also be written (by avoiding the use of the control voltage V as variable) as:

$$d = d_M - D^{-1}(2\varepsilon_0 A)^{-1} \times Q^2 \quad \text{(Equation 7)}$$

Eq. 7 says that distance d is linear in $Q^2$. When increasing the charge Q, the distance d will reduce monotonously according to the simple equation Eq. 7. Eq. 7 also shows that the distance can be reduced exactly to zero, with a suitable amount of charge. This straight and linear behavior of the system as a function of $Q^2$ and the large operation range seem to be in contradiction to the "pull-in" effect observed when scanning distances by varying control voltages. The next section explains the reason for this paradox.

When the electrostatic actuator system is controlled by a control voltage, an increasing control voltage is initially decreasing the distance between the capacitor plates. However the capacitance is dependent on d itself, as capacitance is increasing with the function 1/d on every reduction of distance d. There exists a point where 1/d starts to grow faster than the control voltage can rise. In other words: the effective capacitance of the system is becoming too fast too large to enable control of the system by the control voltage. A more quantitative description of this phenomenon is given below.

Now, one part of steps of the second disclosure is to change from control voltage to a charge control of the actuation system of the movable MEMS/MOEMS capacitor arrangement. The change of system behavior and its consequences can be explained with a few additional simple formulas as follows.

Assuming that the charge Q is placed on the capacitor, three things occur:

(1) first, the distance adjusts to the new distance d as determined by the charge Q and the attractive force generated by it. So we can easily express the necessary control charge as a function of the distance d:

$$Q(d) = (2\varepsilon_0 A D)^{1/2} \times (d_M - d)^{1/2} \quad \text{(Equation 8)}$$

Figure 14:
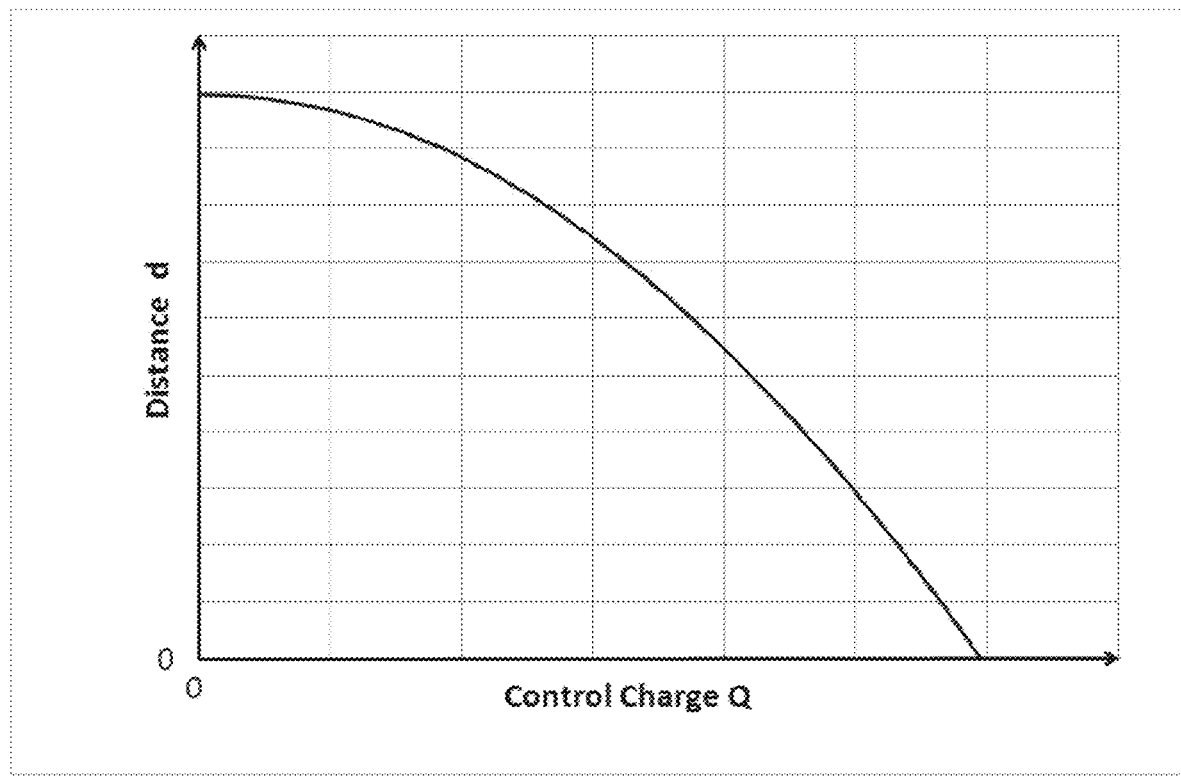
FIG. 14 is a graph of an example with the same parameters as in FIG. 13. The behavior of the systems and the influence on the system change dramatically when replacing control by voltage to control by amount of charge. If the control of the system is done by amount of charge, a much wider distance range can be addressed without any "Pull-In" effect. For such systems as schematically shown in FIG. 11 and FIG. 12, the distance d is changing linearly with the square of the deposited charge $Q^2$.

This situation is shown in FIG. 14
Q(d) in Eq. 8 is defined well for all distances d<dM.
(2) the capacitance C changes to the new value according to Eq. 4
(3) the resulting voltage V across the capacitor for this given distance then is given by $$V(d) = Q/C(d) = [2D/(\varepsilon_0 A)]^{1/2} \times (d_M - d)^{1/2} \times d \quad \text{(Equation 9)}$$

Figure 15:
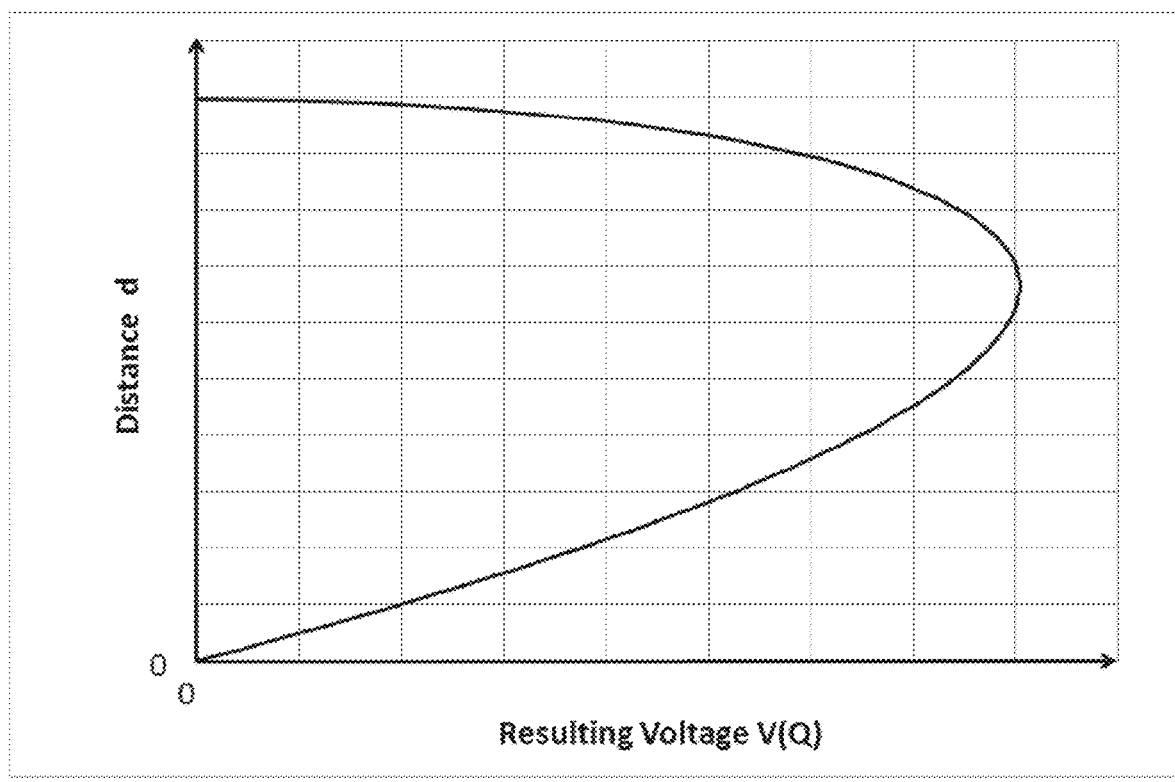
FIG. 15 shows the distance d in relation to the "resulting voltage". The graph should be understood in the following way: after the MEMS/MOEMS capacitor plates have moved to the new equilibrium distance d under the force generated by charge Q(d), this charge Q(d) generates a voltage V(d) given by Eq. 9 described below. It is interesting to see that
1. the voltage V(d) exhibits a maximum $V_{max}$ as a function of distance d, and
2. that there are more than one stable solutions for distance d for one given voltage V, as long as that voltage remains less than a maximum voltage $V_{max}$. If voltage V exceeds $V_{max}$ there is no stable solution for d anymore. This situation is due to the fact that Eq. 6 given below, describing the condition for d as function of the voltage, is an equation of 3rd order and there are either 0, 1, 2 or 3 solutions, depending on the parameter V. At least this diagram shows that—contrary to the amount of charge in FIG. 14—the voltage is not a well-suited control parameter for that system, as there are more than one stable distances d for one voltage $V<V_{max}$, towards $V_{max}$ (resp. at the distance given by Eq. 10 described below) the slope a $\partial d/\partial V$ is diverging to infinity, and above $V_{max}$ there are suddenly no stable distance values any more, which leaves the system undefined when the control voltage is exceeding $V_{max}$.

Note that V(d) contains 2 contributions in d: one term is decreasing with the square root of d and the second is increasing linearly with d. This leads to the unexpected effect that the resulting voltage V(d) expressed as function of thickness d, which is generated by charge Q(d), has a maximum versus d as shown in FIG. 15.

From Eq. 9 we can easily determine the thickness d which relates to the voltage maximum $V_{max}$. The condition for a vanishing 1st derivative of V with respect to distance d resp. the condition for an extrema in V(d) is simply given by $$d(V=V_{max})=\tfrac{2}{3} \times d_M \qquad \text{(Equation 10)}$$

This consideration clearly shows:
(1) There is not a single solution, but there are more stable solutions for the distance d at one given voltage (FIG. 15), as long as the voltage is below a certain maximum voltage value $V_{max}$. This finding corresponds to the fact that Eq. 6 is of third order in powers of d and can have zero to 3 solutions. Mathematically speaking, the resulting dependence d(V) is not a function, but a relationship. The voltage as a function of distance d has a maximum, at which the slope $\partial(d)/\partial V$ is diverging to infinity. When two solutions of Eq. 6, (meaning two possible values of d) which belong to the same value of U, are getting close to each other, the system becomes instable, and the system can oscillate arbitrarily between both states. If the control Voltage finally exceeds $V_{max}$, then there is no stable solution for this system and as a consequence the "Pull-In" effect can occur (for details see figure descriptions of FIGS. 17 to 20). For these reasons the voltage V is definitely not suited as a control parameter for the actuator system. Consequentially, voltage control is a suitable control parameter only for very limited and partial ranges 201 of distances d—corresponding to the state of the art today.

(2) Using the voltage as system control variable, the "Pull In" effect is invoked at a distance $d(V=V_{max})$ as given by Eq. 10 by the diverging slope $\partial d/\partial V$ and its change of sign. In simple words, the "Pull-In" phenomenon is a purely "electrical" effect, caused by the capacitance dependence on 1/d (Eq. 4) when reducing the distance d.

Figure 16:
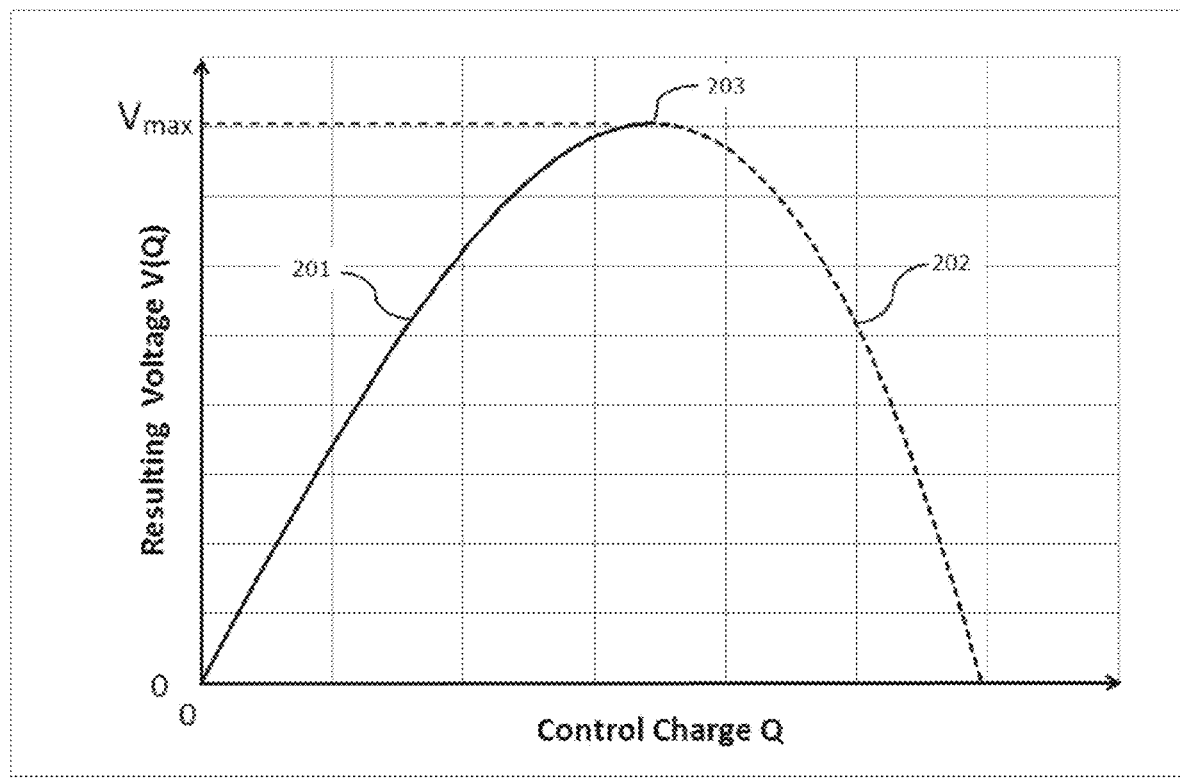
FIG. 16 shows the resulting voltage V versus the charge amount Q applied as control parameter to capacitor of the MEMS/MOEMS systems with capacitive structure and at least one spring-loaded movable electrode. Note that the resulting voltage has a maximum 203 with the value $V_{max}$. The second disclosure relates to all MEMS/MOEMS actuator capacitor systems which have at least one such a maximum in resulting V versus Q. Operation on the branch 201 of the curve can be well controlled by voltage control. Operation points on the branch 202 cannot be addressed by voltage control for reasons mentioned in the next figure descriptions. However, operation points on branch 202 can be set by using the charge amount as appropriate control.
Figure 17:
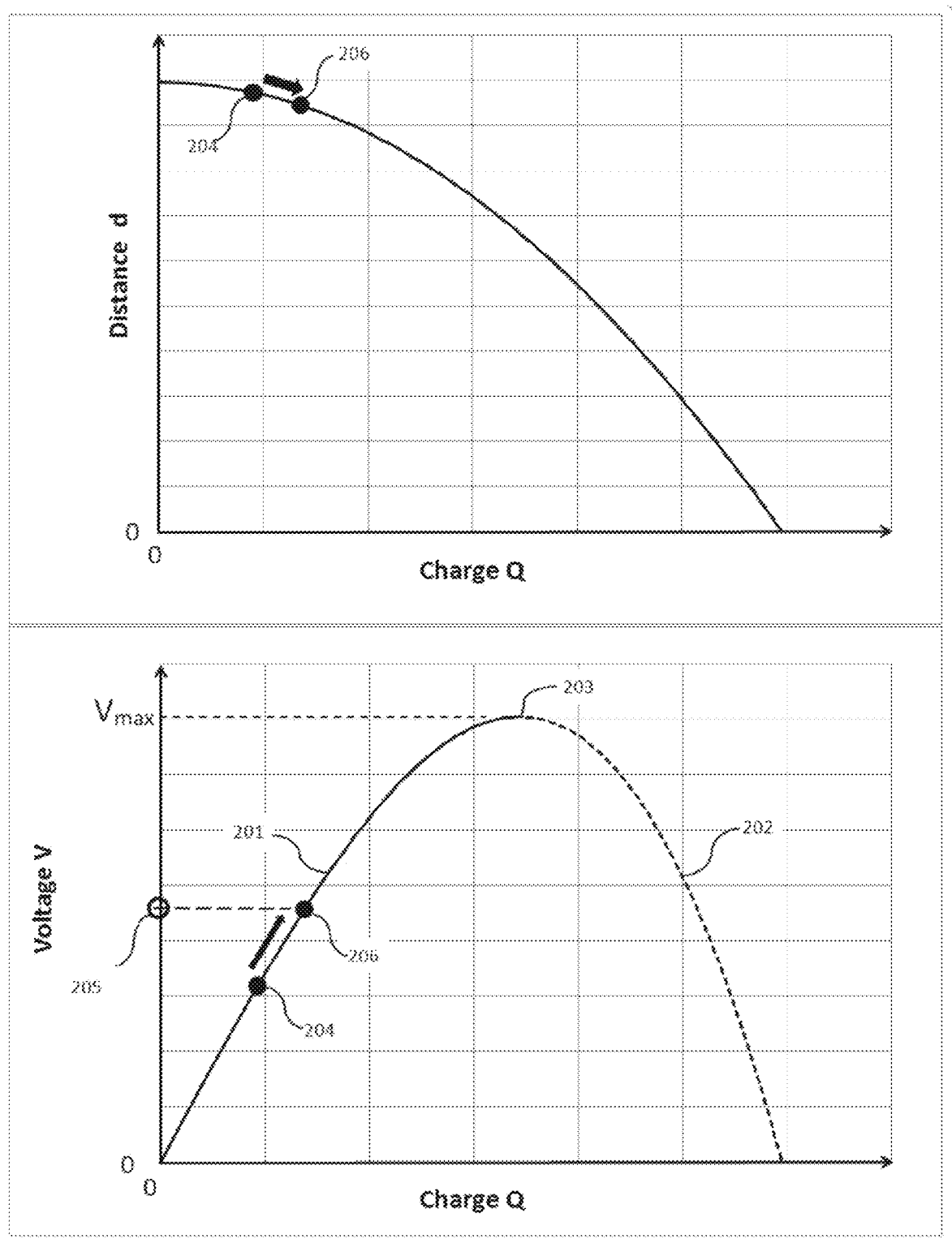
FIG. 17 is a combination of FIG. 14 and FIG. 16 and shows the standard operation using voltage control. If a control voltage 205 is applied to reach the operation point 204, which has a lower "resulting voltage V(Q)", then the voltage difference leads to a current, which increases the resulting voltage until control voltage 205 and resulting voltage 206 are equal. Only operation points of the branch 201 of the curve V versus Q are accessible in this way.
Figure 18:
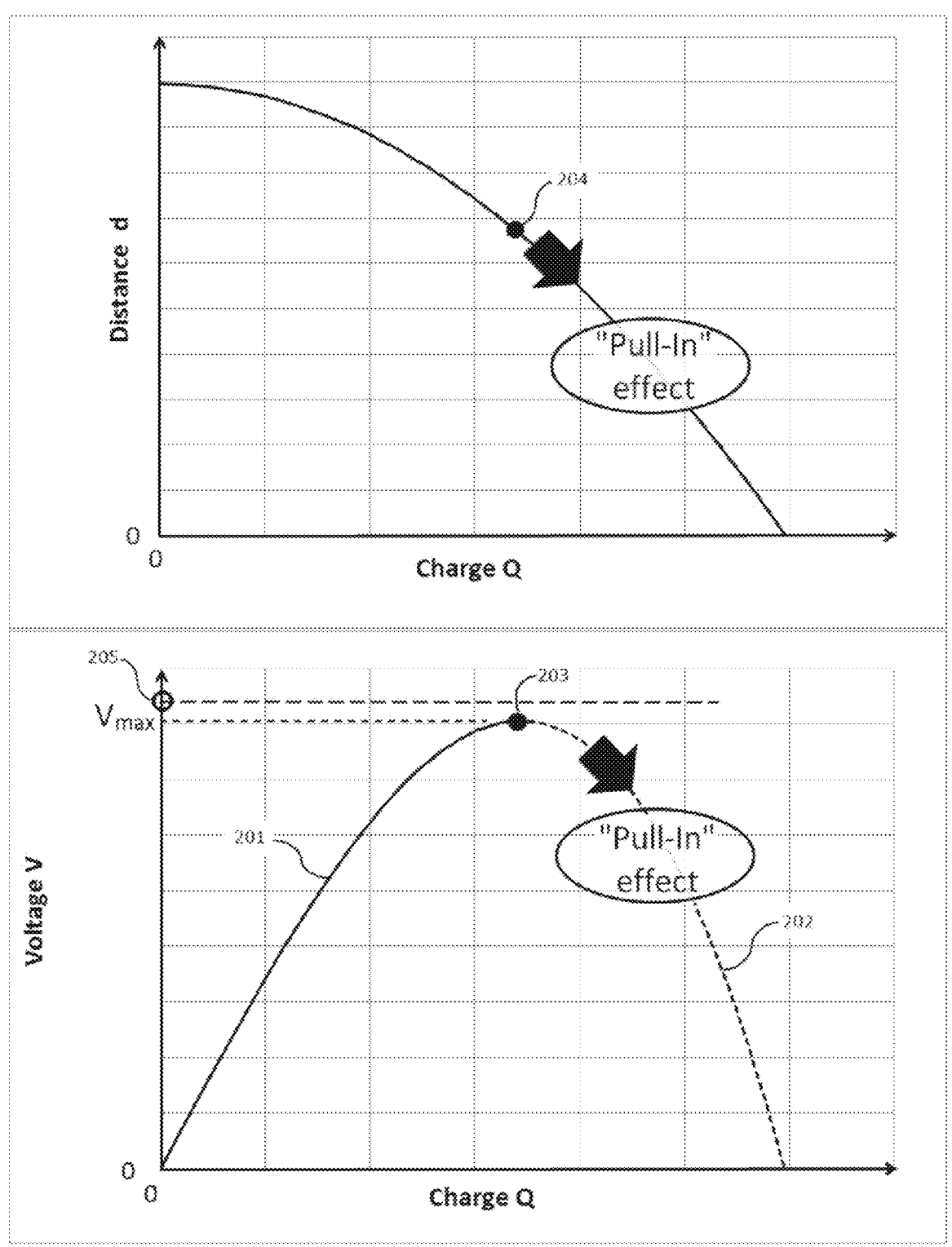
FIG. 18 is a combination of FIG. 14 and FIG. 16 and shows the situation causing the "Pull-In" effect when using voltage control of the actuator. If the control voltage level 205 exceeds the maximum resulting voltage $V_{max}$ 203, then this voltage difference causes a current, which increases the amount of charge Q. As with increasing charge Q the resulting voltage drops due to rapid increase of the actuator's capacity, also the current will increase and the resulting voltage V(Q) will drop further. This leads to a runaway effect causing the distance to run to zero.
Figure 19:
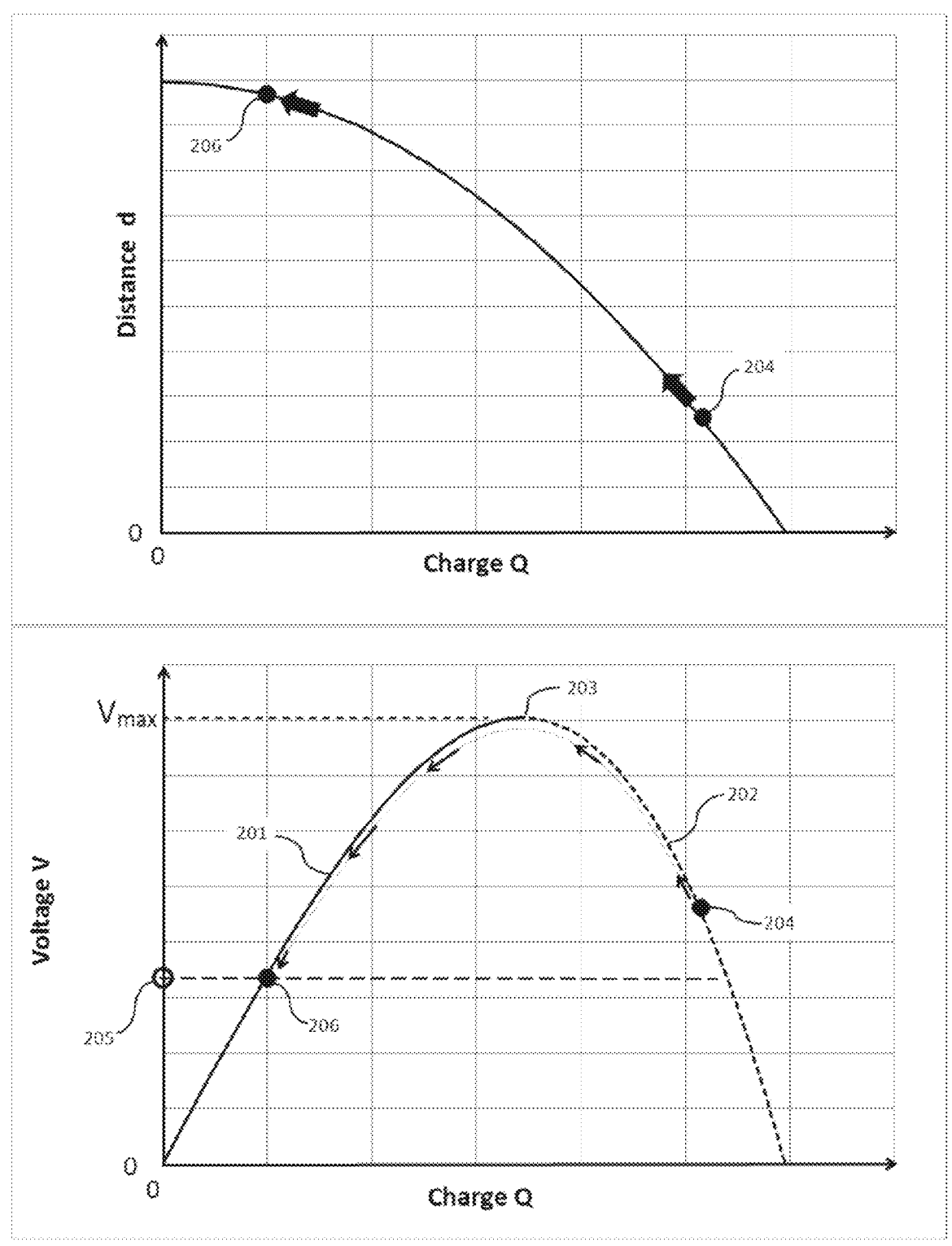
FIG. 19 is a combination of FIG. 14 and FIG. 16 and shows the situation relevant for resetting the actuator capacitor. The actuator was brought to operation point 204 on branch 202 of curve V(Q) by the method of charge control, through charging to the amount of charge Q and then disconnecting the electrodes 106 from the current source. In order to reset the actuator to a certain voltage level, a control voltage 205 is applied which is lower than the resulting voltage V(Q) at operation point 204. Due to the voltage difference, the resulting current will reduce the charge Q at the actuators capacitor. The operating point moves from 204 versus point 203 to the final point 206, where the control reset voltage Vo is equal to the resulting voltage V(Q) of the actuators capacitor. Please note that during this process the voltage difference increases, when the system is moving from operation point 204 to 203. During this reset the sign of the voltage difference remains the same. The reset point 206 must lie on the branch 201 of the curve V(Q). In conclusion resetting operation point 204 by voltage controlled reset is possible as long as the reset voltage 205 is smaller than the resulting voltage V(Q) at operation point to be reset.
Figure 20:
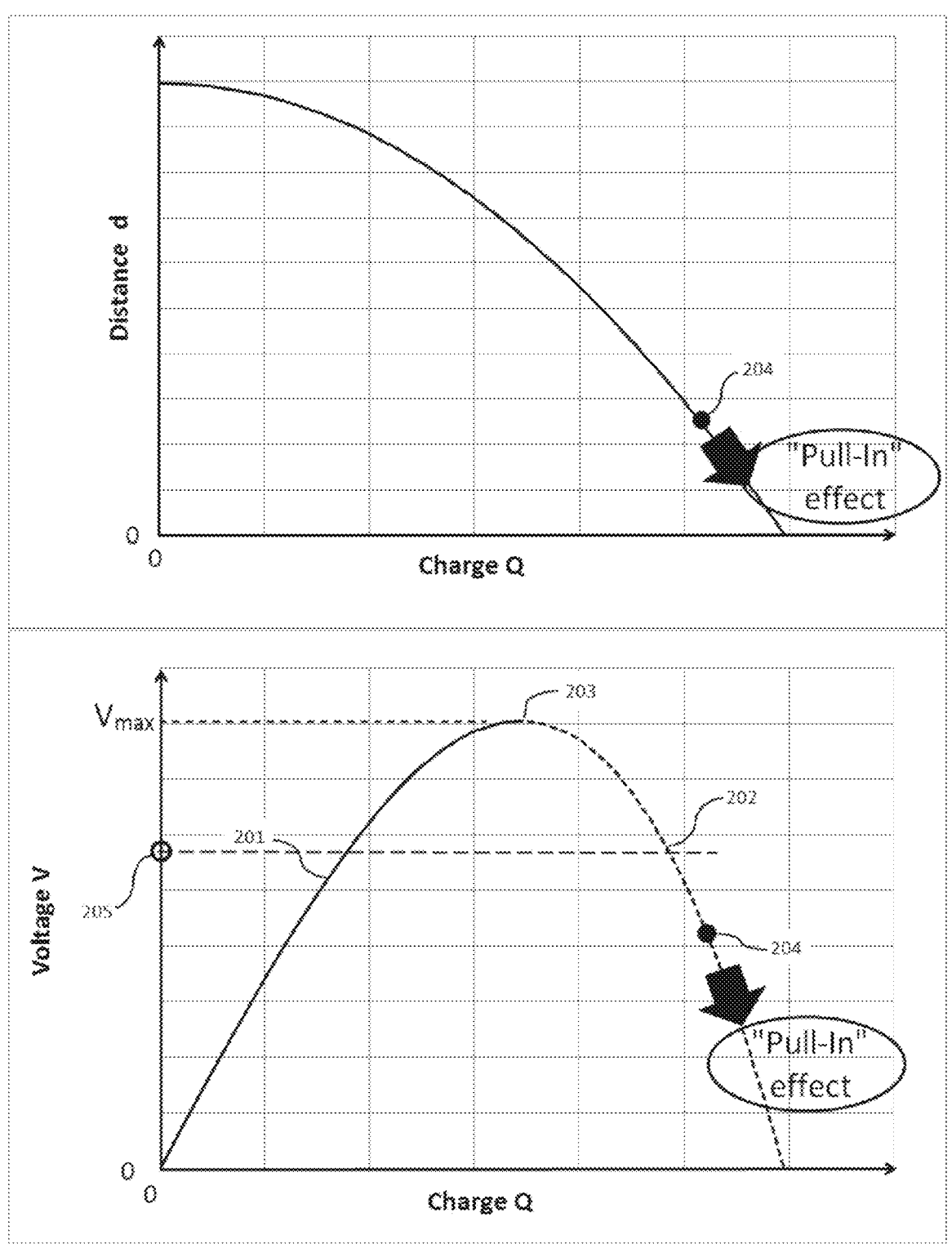
FIG. 20 is a combination of FIG. 14 and FIG. 16 and shows the situation relevant for resetting the actuator capacitor. If the reset voltage level 205 is larger than the resulting voltage V(Q) at the operation point 204 on branch 202 of the curve Q(V) to be reset, the sign of the voltage difference causes a current flow which increases the charge Q. In turn the resulting voltage decreases and the runaway "Pull-In" effect starts. In conclusion: for operation points on the branch of 202, any control voltage higher than the actual resulting voltage V(Q) of the actuator capacitor invokes the "Pull-In" effect. A reset process is allowed only under the condition $V_{reset} < V(Q)$ before reset.

(3) The useful range is very limited when scanning by control voltage because the "Pull-in" effect limits the useful range from $d_M$ to $d=\tfrac{2}{3}*d_M$ (see Eq. 10) (branch 201 of curve V(Q) in FIG. 16). The tuning range thus is limited to only 33% of the totally available displacement range $d_M$ when using voltage control.

If a large tuning range in absolute numbers should be realized with voltage control, the only design option is to go for a large value of $d_M$ due to the tuning range limitation of 33% of $d_M$ mentioned above.

The charge-based electrostatic actuator control device and method according to the second disclosure overcomes this limitation.

(4) Note that the "Pull-In" effect occurs for all such linear systems at $d=\tfrac{2}{3}*dM$ (see Eq. 10)—independent of the initial distance $d_M$. This means that also systems with large zero-force distance $d_M$ show such a "Pull-In" effect when scanning with voltage control to values exceeding $V_{max}$. It is not necessary that the distance d approaches small values of μm or sub-μm distances.

For simplicity, the considered system above was assumed to consist of ideal parallel plates electrodes and to strictly follow Hooke's law Eq. 2. Note that if the system is not following Hooke's law perfectly due to non-linearities or if electrodes have a different shape (for example a ring-segment shape) the resulting voltage V caused by the charge Q(d) still will exhibit a maximum $V_{max}$ possibly at a slightly different distance than given by Eq. 10.

In conclusion, there are electrostatic actuator systems with capacitive structure and at least one movable, spring-loaded electrode, for which the resulting voltage V(Q) cause by the charge Q has a maximum over the charge amount Q. For such electrostatic actuator systems, it is favorable to control the actuator system by the amount of charge Q, rather than by a control voltage V because such systems which are having a maximum $V_{max}$ of resulting voltage V versus the charge amount Q do not possess stable solutions for voltages $V>V_{max}$ and the "Pull-In" effect will occur as soon as the control voltage V exceeds $V_{max}$.

With this consideration in mind, point 1 of the steps of the second disclosure is to change from a control by voltage, which cannot address the whole range of distances d without ambiguity, to a control regime by the parameter "amount of charge Q". With charge control, the control parameter Q is monotonous in d as shown in FIG. 14 and thus allows to address the complete distance range from $d=d_M$ to d=zero (201 and 202 in FIG. 16) without any ambiguities and without any "Pull-In" effect. The feasible displacement range thus is limited only by mechanical limits of the elastic range of the spring 102, and not by the method of electrical control when using voltage control, which is state of the art.

Figure 21:
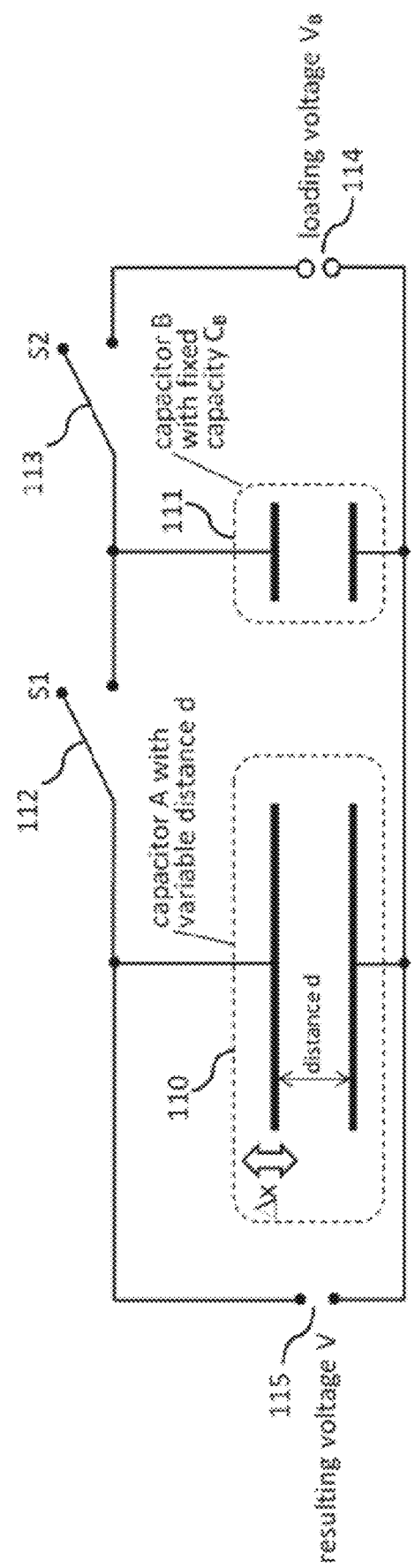
FIG. 21 shows a simple but feasible "charge control" circuit. The capacitor "A" 110 on the left is the MEMS/MOEMS actuator capacitor with the variable distance d between the plates 103,105. As long as the switch S1 112 is disconnected, a second capacitor "B" 111 with much smaller capacitance CB can be charged at a higher voltage UB 114 than the maximum voltage of FIG. 15 by closing switch S2 113. During this time ("before closing switch S1 112") the voltage 115 at the capacitor A is measured. Then capacitor B 111 is disconnected from the voltage source UB 114 by a switch S2 113 and capacitors A 110 and B 110 are connected by switch S1 112. The resulting voltage V at the capacitors A 110 and B 111 (or A only, after disconnecting switch S1 112 again) is measured ("after opening switch S1 112").

In order to point out the principles and basic feasibility of the approach and in order to illustrate possible extensions, a simple circuit is shown in FIG. 21. The idea is to charge an additional capacitor B 111 having a smaller or much smaller capacitance $C_B$ than the MEMS/MOEMS capacitor A 110, but at a loading voltage level $V_B$ 114 exceeding the maximum voltage $V_{max}$ 203 shown in FIG. 16, while the capacitor A is disconnected. During that time—before switching S1 in FIG. 21—the voltage 115 at capacitor A is measured. When charging up the capacitor B with the known capacity $C_B$ is completed, the electrical connection to the voltage source is disconnected and the capacitors A and B are connected.

There will be a charge transfer from capacitor B to the Capacitor A until both capacitor voltages are equal. The transferred charge amount can be calculated from the loading voltage $U_B$, the capacity $C_B$ and the voltage V at the capacitor A before connecting.

An amount of charge is the temporal integral of current during the integration time. Fast switches in series with the charge-supplying circuit allow connecting or disconnecting the charge source from the MEMS/MOEMS capacitor at precisely defined arbitrary times. Thus any desired charge amount can precisely be put on the MEMS/MOEMS capacitor this way. In this way the capacitor can be charged with any desired amount of charge, which defines the operation point for the distance d of the electrostatic actuator's capacitance.

In a real-world application such as the aforementioned Fabry-Perot Interferometer FPI, spectral measurements can be carried out at that operation point of defined distance d. For the example of the FPI running at $2^{nd}$ order, the peak transmission wavelength will be equal to that distance between the plates of the MEMS/MOEMS capacitor.

The consideration of FIG. 21 leads to the next point in the steps of the second disclosure:

Controlling the system by the charge Q instead of the voltage V now, the voltage has the meaning of a resulting voltage V(Q) as caused by the charge amount Q on the MEMS/MOEMS actuator's capacitive structure. Thus the resulting voltage can serve as an additional measurand giving additional information. For the MEMS/MOEMS systems with capacitive structure, controlling the amount of charge Q quantitatively while measuring the resulting voltage of the MEMS/MOEMS parallel plate capacitor is simply a new way of a static capacitance measurement based on the known formula C=Q/V which here better should be written as:

$$C=Q/V(Q) \tag{Equation 11}$$

to indicate that

Q is the control value being actively set and

V(Q) is the dependent value caused by the charge

Q(d) which is needed to set the distance of electrodes to the target value d.

For a MEMS/MOEMS parallel plate capacitor, the distance d between the plates can directly be calculated from Eq. 4 if the effective capacitor area A is known. It is worth noting that this basic formula C=Q/V remains valid irrespective of the fact that the resulting voltage V versus d shows a maximum at a certain distance $d=d(V_{max})$. The determination of the distance d by means of the static capacitance measurement as described above even works at those points where in FIG. 15 the voltage V takes a maximum $V_{max}$ and where the slope ∂d/∂V is diverging.

For other MEMS/MOEMS actuator systems with a capacitive structure and at least one spring-loaded movable electrode, a description of the relation between distance of electrodes and capacitance value is needed. Having measured and established such a relation, which is characteristic for the design of the actuator's capacitor, it is possible to determine the actual distance between the electrodes from the measured capacitance value. The advantage of this procedure is evident: the calibration of the MEMS/MOEMS actuator system parameter "distance" does not reference to SET point values, which might be temperature-dependent or have a hysteresis, but to the measured value of momentary capacitance, which reflects effects of temperature changes or mechanical hysteresis.

In some applications the requirements for the long term accuracy of the distance measurement are very demanding. As mentioned in the section background, the distance d needs to be determined very precisely for many applications, e.g. for the FPI in $2^{nd}$ order for which the peak transmission of infrared optical radiation occurs at wavelengths equal to the distance d(for AOI=0°).

Therefore a $2^{nd}$ distance measurement scheme is invented specifically for use with the micro-machined MEMS/MOEMS electrostatic actuators as described below.

A well-known way of measuring capacitance is using a high frequency (HF) capacitance measurement.

Typical HF capacitance measurements apply a small oscillation voltage signal at high frequencies and they measure the resulting AC current. Transferred to a state-of-the-art MEMS/MOEMS actuator control system, the AC voltage modulation would have to be added onto a DC control voltage. However working with a DC voltage control regime will bring back all issues discussed above in detail, caused by the multiple-valued relationship V(d). The inventive step here is to carry out the HF capacitance measurement in agreement with the charge-control approach by the following procedure:

Set the charge amount Q(d) to displace the electrostatic actuator to a desired distance d Disconnect the charge-providing circuit from the capacitor by a switch Connect to a source of small-signal AC current source 1(t)

Measure the resulting AC voltage modulation V(t) as a function of the applied AC current level The complex impedance Z(ω) as a function of angular frequency ω is given by Z(ω)=V(ω)/I(ω), and the sought capacitance C is given by $C=(\omega \times |Z(\omega)|)^{-1}$.

For ease of further description we call this method an 'current-injection HF capacitance measurement'.

Note that the MEMS/MOEMS electrostatic actuator will have mechanical resonance frequencies. Resonant oscillation is possible around any operation point d(Q) defined by the charge amount Q.

For the purposes of the second disclosure, it is very important to carry out this "high frequency" measurement at frequencies well above the resonance frequency, for example, a factor of at least 10 higher, depending on required precision. In this way, excitation of mechanical resonances by the AC current is avoided, and the distance d does not depend on the AC current signal because MEMS/MOEMS capacitor electrode movement cannot follow at these excitation frequencies. Finally, Eq. 4 allows to determine the distance d between the plates of the capacitor when knowing the effective capacitor area A.

The possibility to determine the actual distance d quantitatively either by the quasi-static capacitance measurement scheme or by the current-injection HF capacitance measurement method solves several problems of the application of such micro-machined MEMS/MOEMS electrostatic actuator devices at a time:

Knowing the general dependence of the capacity of the used MEMS/MOEMS electrostatic actuator versus distance d, all momentary distance values d can be calculated from the momentary charge control value Q and the resulting voltage V(Q).

For MEMS/MOEMS parallel plate capacitors with their known dependence on distance d (Eq. 4), best case no individual full wavelength calibration polynomial needs to be measured and calculated for each device. It is sufficient to measure one distance d at one known amount of charge at one temperature, mainly for a precise determination of the effective capacitor area A precisely. All other dependencies can be measured during operation by determining the distance with the proposed method, by making the voltage available as measurand rather than using the voltage as control parameter.

Temperature variations changing the actual distance d will be noticeable when the actual distance d is measured again.

Effects of long-term drift or hysteresis are eliminated by carrying out new measurements of the actual distance d, e.g. during scanning control of the device.

Spring-loaded micro-machined MEMS/MOEMS actuator systems will have mechanical resonance frequencies. Resonant oscillation is possible at any quasi-static operation point, which is characterized by the mean distance d as defined by the (static) charge amount Q(d). In some applications, the device is operated in or close to mechanical resonance. In order to excite resonance modes, the system usually is driven with a voltage modulation adjustable in amplitude and frequency. As discussed in the section "current-injection HE capacitance measurement", this modulation needs to be added to the DC control voltage—again a regime which is not desirable due to its disadvantages discussed above. In order to extend the operation of the controller of the second disclosure also to the driving case of resonant oscillation, it is necessary to proceed as follows:

Set the charge amount Q(d) in order to tune the actuator capacitance to a desired distance d Determine actual distance d by measuring the resulting voltage (i.e. the static capacitance measurement) and/or by the charge-injecting HF capacitance measurement.

Disconnect the charge-providing circuit from the capacitor by a switch, or, alternatively, reduce the amplitude of the current source circuit to zero.

Connect a source of small-signal AC current with adjustable amplitude and frequency.

Measure the amplitude and phase lag of the resulting AC voltage modulation as a function of the applied AC current.

The difference to the above discussion of the current-injection HF capacitance measurement is that the AC current modulation connected to the capacitor at the operation point of charge Q causes a so-called forced oscillation of the oscillatory mechanical system. There is a phase lag between the exciting force and the mechanical oscillation, which is 0 degrees at very low frequencies, it reaches 90 degrees at frequencies equaling the resonance frequency, and it approaches 180 degrees at frequencies much higher than the resonance frequency. The rise from 0 degrees to 180 degrees can be very fast around resonance if the internal damping of the oscillatory system is low, i.e. if the so-called 'quality factor' is high. As a consequence, the distance d also becomes a function of time, oscillating (after a certain transient time) periodically with the frequency of the AC current, but with a characteristic amplitude and phase lag. Due the change from voltage control to charge/current control taught by the second disclosure, the following advantages over the state of the art are obtained:

All distance values from d=0 to the zero-force state d=$d_M$ can be addressed. The excitation strength and frequency can arbitrarily be chosen.

The resulting amplitude and phase lag for the oscillatory MEMS/MOEMS electrostatic actuator system can be determined, so that a complete control of the movement status can be achieved.

A small drawback of this detection method is that this method might have low sensitivities in the vicinity of the operation point Q where the DC voltage reaches a maximum $V_{max}$ where the slope $\partial V/\partial d$ is vanishing.

The above described oscillation motion controller and its related measurement system—based on the invention of the novel actuator control system controlling the amount of charge—has several fundamental advantages compared to the state-of-the-art voltage control:

The proposed method can address and utilized all distances d, without any instabilities and without any danger of a "Pull-In" effect.

The driving force of the system is linear in $Q^2$ (Eq. 3). That implies: The driving force caused by the sinusoidal variation of charge Q is independent of the actual distance d and of the actual movement of the system, which is affected by this force.

When using voltage control instead, applying a sinusoidal control modulation voltage means that the force F is related to $V^2/d^2$ (Eq. 5). The excitation force itself is dependent on the actual distance d during oscillation, which is, in turn, affected by the force in a reproducible way. This circular dependence may create unpredictable and undesired effects.

The method according to the second disclosure offers a detection system for the oscillation frequency, for the amplitude and for the phase lag, which directly detect the mechanical movement in the parameter d. The resulting voltage V (including the AC modulation) is given by the formula C=Q/V and Eq. 4 as V=Q/C=(Q/$\varepsilon_0$A)×d (Equation 12) which enables a direct calculation of distance d from the voltage V.

The effective capacitor area A can be determined by a simple single-point calibration, e.g. by measuring the distance d for a known charge amount for each individual electrostatic actuator.

Detailed Description of the Preferred Embodiments

It is a principle object of the second disclosure to control the set point (operation point) of an electrostatic actuator with at least one movable and one spring-loaded capacitance electrode by the amount of charge placed on it, rather than by a control voltage as in the state of the art, To do so, different charge-providing circuits can be used which can be connected or disconnected from the capacitance 210 in FIG. 22 by respective switches. The fast and precise timing control of the connection as well as the properties of the preferred charge-providing circuits makes it possible to place a precisely known amount of charge onto the capacitor.

With the foregoing objects in view, the second disclosure is achieved with a system illustrated in FIG. 22. Electrostatic actuator capacitance 210 is electrically connected in parallel to current source 211, voltage meter 213 and reset switch 215. Current source 211 can be switched on or off using switch 212. Voltage meter 213 can be switched on or off using switch 214.

Current source 211 produces a constant current I. When switch 212 is closed and the current I is flowing during time t, the charge Q=I×t is placed on the electrodes of electrostatic actuator capacitance 210. Across the electrodes of actuator capacitance 210 the voltage V(Q) is measured. In the case of a parallel-plate electrostatic actuator, a typical voltage-vs-charge curve V(Q) as illustrated in FIG. 23 is observed, for the reasons described above. The curve V(Q) has a maximum, which leads to a diverging effective capacitance at this point: The effective capacitance $C_{eff}$ is given by the first derivative of Q(V), $C_{eff}=dQ/dV=(dV/dQ)^{-1}$, as illustrated in FIG. 24.

If one of the electrodes of the electrostatic actuator is connected to ground or to the case of the actuator, a preferred embodiment of a suitable precision current source is illustrated in FIG. 25. This circuit, making use of operational amplifier 21, is known as Howland current pump. For near ideal behavior, the following conditions for the resistors must be fulfilled: R1=R2, R3=R4, R5=R6. Under these circumstances, the current I is charging electrostatic actuator capacitance 220 with an amount of charge Q that is linearly increasing with time, Q=I×t. The current I is a linear function of programming voltage V at input 222: I=V/R6+(R3+R5)/R1.

If both of the electrodes of the electrostatic actuator capacitance are floating, a preferred embodiment of a suitable precision current source is illustrated in FIG. 26. This circuit, making use of operational amplifier 226, is known as transconductance amplifier. The current I charges electrostatic actuator capacitance 225. The current I is a linear function of programming voltage V at input 227: I=V/R, where R is the value of resistance 228.

If it is desirable that small increments of charge are placed on the electrodes of the electrostatic actuator capacitance, current source 211 according to the switched-capacitor principle is preferred. Such a circuit is described, for example by W. A. Clark in U.S. Pat. No. 5,969,513, "Switched Capacitor Current Source for Use in Switching Regulators". Switched capacitor current sources can be implemented very efficiently as integrated circuits, making use of standard semiconductor technology, as described for example by B. R. Gregoire and U-K. Moon, in TEE Trans. Circ. Sys. II: Express Briefs, Vol. 54, No. 3 Mar. 2007 ("A Sub 1-V Constant $G_m$-C Switched-Capacitor Current Source").

An advantage of switched capacitor current sources is their purely digital operation: Identical charge packets are supplied under the control of digital switches, and no precise analog selection of a control voltage is required.

Many switched capacitor current sources are unipolar, i.e. they can only provide a flow of current in one direction. In such cases, two switched capacitor current sources providing a flow of current in opposing directions need to be connected in parallel, in order to create the bipolar current source required by the second disclosure.

A preferred embodiment of a complete electrostatic actuator control system according to the second disclosure is illustrated in FIG. 27. It consists of digital controller system 231, controlling all elements of the electrostatic actuator controller shown in FIG. 22. Digital controller system 231 executes all steps in a sequence of commands to control the mechanical displacement of electrostatic actuator 230.

In a first step, switches 234, 238 and 239 are opened. In a second step, reset switch 239 is closed. This completely discharges electrostatic actuator capacitance 230, causing the actuator to return to its mechanical zero-force position. In a third step, reset switch 239 is opened and voltage meter switch 238 is closed. This enables the measurement of the residual voltage ("reset voltage") across the electrodes of electrostatic actuator 230. The measurement is carried out by voltage meter 235, whose analog output 236 is converted into a digital value by analog-to-digital converter 237. The resulting digital value of the reset voltage is stored in the memory of controller 231. The system is now ready for a repeated step sequence, with which the displacement of electrostatic actuator 230 is controlled.

Each repeated step sequence begins by closing current source switch 234. During a predetermined time t, current source 232 is charging electrostatic actuator 230 with the current I, placing a charge packet $\Delta Q = I \times t$ onto actuator capacitance 230. The value of I or the size of charge packets $\Delta Q$ are determined by digital controller 231 through control signal 233. All previously supplied charge packets $\Delta Q$ add up to a total charge Q that has been deposited on the electrodes of actuator 230. Voltage meter 235 is continuously measuring the voltage V(Q) across the electrodes of actuator 230.

The knowledge of V(Q) allows the determination of the effective capacitance $C_{eff}(Q)$ through the calculation of the first derivate $C_{eff}(Q) = dQ/dV = (dV(Q)/dQ)^{-1}$. As illustrated in FIG. 24, $C_{eff}(Q)$ is a biunique measure of the charge Q and therefore also for the displacement of electrostatic actuator 30. In particular, the sign of $C_{eff}(Q)$ is a telltale signature of the state of electrostatic actuator 30: If $C_{eff}(Q)$ is positive, the actuator is near its zero-force position, and a closure of reset switch 239 causes the actuator to return to its zero-force position. If $C_{eff}(Q)$ is negative, the actuator has passed the so-called "Pull-in" point, where a closure of reset switch 239 forces the actuator to move to its extreme position such that the electrodes touch and irreversible damage to the actuator may be caused. If $C_{eff}(Q)$ is negative, it is nevertheless possible to move the actuator to any distance between 0 and $2/3 * d_M$ by effectuating a reset to a positive reset voltage $V_{reset}$ with $0 < V_{reset} < V_{max}$. It is not possible, though, to return to the zero-force equilibrium position purely with voltage-control, if $C_{eff}(Q)$ is negative.

Once a complete cycle of actuator displacement steps has been finished, $C_{eff}(Q)$ needs to be calculated. In case $C_{eff}(Q)$ is positive, it is safe to open switches 234 and 238 and to close reset switch 239. This causes actuator 230 safely to move to its zero-force position. However, in case $C_{eff}(Q)$ is negative, the polarity of current source 232 must be changed through control signal 233, so that the total charge Q on actuator 230 can be reduced below the pull-in point, through the reversed flow of current. Once the total charge has been sufficiently reduced below the singularity and sign-change of $C_{eff}(Q)$, it is safe to open switches 234 and 238 and to close reset switch 239. This causes actuator 230 safely to move to its zero-force position.

In FIG. 22, current source 211 is supplied with switch 212, and voltage meter 213 is supplied with switch 214. If the electronic circuits implementing current source 211 and voltage meter 213 are of sufficient quality, it may not be necessary to supply them with switches 212 and 214:

If voltage meter 213 has such high impedance that charge Q placed on electrostatic actuator capacitance 210 is not significantly discharged through voltage meter 213, and if voltage meter 213 has a capacitance that is insignificant with respect to the capacitance of actuator 210, then switch 214 is superfluous.

If voltage meter 213 is measuring with such high time resolution that it is not necessary to switch off current source 211 through switch 212 to give voltage meter 213 sufficient time for a measurement, then switch 212 is superfluous. Alternatively, if it is possible to change the current of current source 211 rapidly, also setting it to zero, then switch 212 is also superfluous.

In these cases, the electrostatic actuator control system according to the second disclosure shown in FIG. 22 can be simplified to the system illustrated in FIG. 28. The only switch that is still required is reset switch 215.

An electrostatic actuator control system according to the second disclosure that is capable of measuring actuator capacitance 210 with the above-described charge-injection HF measurement methods is illustrated in FIG. 29. Small-signal AC current-injecting source 216 is connected in parallel with current source 211, voltage meter 213 and reset switch 215. If necessary, AC current injecting source 216 can be disconnected from the other elements of the system with switch 217. As described above, AC current-injection source 216 is rapidly charging and discharging actuator capacitance 210, while the voltage on capacitance 210 is observed with voltage meter 213, which must be capable of sufficient time resolution to follow the oscillations of AC source 216. As described above, capacitance 210 can be determined when AC current In voltage V(t) and oscillation angular frequency ω are known. Also, knowledge of I(t) and V(t) allows to determine the phase angle between I(t) and V(t), providing additional information about the state of electrostatic actuator 210.

Voltage meter 213 may be implemented as two individual circuits in parallel: One slow but precise and full-scale voltage meter to measure the absolute voltage on actuator capacitance 210, and one fast but small-signal voltage meter to measure the effect of small-signal AC current-injection source on actuator capacitance 210. The words "fast" and "slow" relate to the modulation frequency of AC current-injection source 216. "Slow" means that the measurement frequency is below the excitation frequency of AC source 216; "fast" means that the measurement frequency is above the AC excitation frequency.

The features of the second disclosure can be described as follows:

Feature 1

An electrical actuator controller for micro-machined MEMS/MOEMS electrostatic actuator systems with capacitive structure and at least one spring-loaded movable electrode, thus allowing to change the mechanical distance d between the electrodes by forces applied to the capacitor by electrical means, with the capacitor system with at least one movable electrode being characterized in that the resulting voltage V at the capacitor caused by charge Q, exhibits at least one maximum as a function of the amount of charge Q, and the electrical actuator controller characterized in that it directly drives the system by the amount of charge Q as the direct control of source of the attractive mechanical force between the capacitance electrodes, and the electrical actuator controller is realized by
(1) one or more charge-providing circuits, providing precisely known amount of charge such as in principle repetitively switchable external load capacitors, or preferably, but not exclusively by charge-providing circuits
and
(2) electronic switches allowing to connect or disconnect the aforementioned charge-providing circuits very fast and at arbitrary time, optionally repetitively, to resp. from the actuator's capacitor, thus allowing to define—together with the properties of the mentioned used charge-providing circuit or circuits—the total amount of charge on the actuator's capacitor at a quantitative level and enabling to keep certain amounts of charge constant over time for example (but not exclusively) for the purpose of carrying out measurements implemented on the basis of that movable electrode capacitor system.

Feature 2

A measurement system for the momentary capacitance of the capacitive structure formed by a distance d between the electrodes of the micro-machined MEMS/MOEMS electrostatic actuator system as mentioned in Feature 1, when using the electrical actuator controller described in claim 1 controlling directly the amount of charge Q,
with the measurement system for the momentary capacitance of this claim characterized in that
the controller system controls the amount of applied charge to the actuator's capacitance and that this amount of charge is known or can be determined by the properties of the aforementioned charge-providing circuits and the timing of the aforementioned switches,
and
the electrical actuator controller contains circuitry for measurement of the resulting voltage across the capacitor, so that by knowing the amount of charge Q and the resulting voltage V, the capacity of the capacitive structure formed by the momentary distance d between the electrodes of the electrostatic actuator system can be determined.

Feature 3

A measurement system for the momentary capacitance of the capacitive structure formed by a distance d between the electrodes of the micro-machined MEMS/MOEMS electrostatic actuator system as mentioned in Feature 1, when using the electrical actuator controller described in Feature 1 controlling directly the amount of charge Q,
with the measurement system for the momentary capacitance of this claim characterized in that firstly, the controller puts a definite amount of charge on the capacitance and in consequence the distance between the plates adjust close to the wanted distance, then aforementioned charge-providing circuits are disconnected from the movable plate capacitor
and
then via an additional switch an AC current at frequencies much higher than the resonance frequencies of the oscillatory parallel plate capacitor is injected onto that capacitor,
and
the electrical actuator controller contains a circuitry for measurement of the resulting AC voltage modulation from the capacitor, so that by knowing the amount of charge modulation $\Delta Q$ and the resulting measured modulated voltage $\Delta V$, the high frequency capacitance of the capacitive structure formed by the momentary distance d between the electrodes of the electrostatic actuator system can be determined.

Feature 4

A system for excitation of forced oscillation and measurement of the oscillatory status for the micro-machined MEMS/MOEMS electrostatic actuator systems with capacitive structure and at least one spring-loaded movable electrode as mentioned in Feature 1, when using the electrical actuator controller described in Feature 1 controlling directly the amount of charge Q
with the system for excitation of forced oscillation and measurement of the oscillatory status for electrostatic actuator of this claim characterized in that
firstly, the controller puts a definite amount of charge onto the capacitor and in consequence the distance between the capacitor's electrodes adjust closely to the wanted distance, then aforementioned charge-providing circuits are disconnected from the capacitor
and
then via an additional switch an AC current with adjustable amplitude and frequencies lower, equal, or higher than the resonance frequencies of the oscillatory actuator capacitor is connected to that capacitor,
and
the AC current drives a forced mechanical oscillation of the oscillatory actuator capacitor
and
that the electrical actuator controller contains a circuitry for measurement of the resulting AC voltage modulation from the capacitor, capable of detecting the modulation voltage amplitude and its phase lag with respect to the phase of the applied AC current, so that the oscillator status of the forced oscillation of the electrostatic actuator can fully be determined, at least after a transient oscillatory phase.

Feature 5

Electrical actuation controller according to Features 1 to 4 characterized in that the preferred embodiment of the electrical actuation controller is realized in an Application Specific Integrated Circuit (ASIC), preferably placed in the direct vicinity of the micro-machined electrostatic actuator with at least one movable, spring-loaded plate.

Feature 6

An electrostatic actuator control system for exploiting the complete mechanical displacement range of an electrostatic actuator consists of three electrical components connected in parallel: A switchable bipolar current source, a switchable high-impedance voltage meter, and a reset switch. The reset switch is used to discharge the electrostatic actuator and to bring the actuator to its mechanical zero position. The bipolar current source is used successively to deposit known charge packets on the electrodes of the electrostatic actuator, leading to a mechanical displacement that is a monotonic function of the total deposited charge Q. The voltage meter is used to determine the actual voltage V(Q) across the electrodes of the electrostatic actuator. With this information the first derivative $dQ/dV=(dV/dQ)^{-1}$ is calculated, which is the effective capacitance of the actuator; this can be used to determine the mechanical position of the actuator. Once an operational cycle is finished, the bipolar current source is used actively to discharge the electrostatic actuator. This operational sequence is carried out under the control of a digital controller system.

Third Disclosure

The third disclosure describes a dedicated method of operation and calibration of an Electrostatic Actuator Controller, which is used to control micro-machined MEMS/MOEMS systems with a capacitive structure and with at least one spring-loaded movable electrode by control of charge amount rather than by voltage, with a special focus on the fact that such capacitive structures may exhibit considerable or at least non-negligible leakage currents.

Related art is the second disclosure, which covers the use of the Electrostatic Actuator Controller for capacitive structures with negligible leakage currents.

Background

MEMS and MOEMS structures with moving parts need actuation. Different manners of actuation are known. One possible option is an electrostatic actuation of suited actuator structures. There are special micro-machined MEMS/MOEMS systems with a capacitive structure and with at least one spring-loaded movable electrode, which can be actuated by a control voltage. As an example, there is a MEMS based Fabry Perot interferometer, which allows spectral analysis in the near infrared spectral range, making use of such an actuator structure.

Key feature in such systems is that the capacity of the capacitive structure is dependent on the distance d between the electrodes: with decreasing d, the capacity increases monotonously.

As an example for such a structure, the capacity of a parallel plate capacitor is given by $$C=\varepsilon_0 A/d \quad \text{(Equation 1)}$$

With
$\varepsilon_0$: permittivity constant
A: effective area of the capacitor
d: distance between the electrodes The second disclosure teaches that for such micro-machined MEMS/MOEMS systems with such a capacitive structure with at least one spring-loaded movable electrode, the voltage V can exhibit a maximum as a function of the amount of charge Q placed on the electrodes. The voltage maximum can be explained as follows (compare FIG. 30):

At zero charge the voltage at capacitor is also zero.

Increasing the amount of charge on the electrodes effectuates an attractive force between the electrodes. As a consequence, the distance d between the electrodes is shrinking, and the capacity of the capacitive structure is increasing. Initially, when d is large, the change of capacity with d is gradual. Thus the voltage at the capacitor is increasing, too.

Increasing the deposited charge amount further, the distance between the electrodes is decreasing, but the increase of capacity becomes faster and faster, the closer the electrodes come to each other (as seen in Eq. 13 for example). Consequentially, the voltage V(Q) has a maximum value $V_{max}$. For larger charge amounts, the voltage at the capacitor decreases again, despite increasing charge amount Q.

When trying to control such a system by voltage control, a control voltage $V_{control}$ slightly larger than $V_{max}$ leads to a fast runaway effect, the so-called "Pull-in" effect, which ends with both electrodes colliding with each other, and this usually damages the actuator device.

The second disclosure, teaches that
replacing voltage control by a control regime by amount of charge, safe and "Pull-In"-free operation is possible.
with charge control, tuning ranges for the distance between the electrodes become accessible, while they are inaccessible by voltage control due to the existence of the maximum in V(Q) and the resulting "Pull-in" effect.
combining one or more current sources and switches, any arbitrary charge amounts $Q_c$ can be placed on the electrodes of the actuator's capacitive structure.
additionally carrying out a measurement of the resulting voltage V(Q) at the capacitor with precisely controlled charge amount Q is a quasi-static method to determine the actual capacitance of the actuator's capacitive system. The actual distance d between the electrodes can be determined from such an actual capacitance value, if the relationship between the capacitance and the distance between the electrodes is known, e.g. by a calibration measurement.
injecting an AC current with a frequency above the resonance frequency of the oscillatory MEMS/MOEMS systems with a capacitive structure and at least one spring-loaded movable electrode, and additionally measuring the AC amplitude of the voltage at the capacitor is an I-IF capacitance measurement, which is compatible with the charge/current control of the Electrostatic Actuator Controller.

All considerations in the second disclosure were elaborated for negligible leakage currents. However, real MEMS/MOEMS structure may have substantial leakage currents. Leakage currents limit the applicability of the above important advantages of the "Electrostatic Actuator Controller". The third disclosure overcomes this shortcoming by providing a controller system and a mode of operation for the reliable control of an electrostatic actuator system with non-negligible leakage current.

SUMMARY OF THE DISCLOSURE

The third disclosure presented below overcomes the applicability limits of the second disclosure caused by the presence of non-negligible leakage currents in the capacitive structure of the actuator.

The steps of the third disclosure consist of five essential elements: All concepts of the second disclosure are applicable if the voltage at the capacitor at any time, the source of the leakage current, and the isolation resistance $R_{leak}$ are known with sufficient precision.

The first steps of the third disclosure is an introduction of a configuration with at least one additional switchable reference resistor and a dedicated measurement method using this additional reference resistor, which allows a precise determination of the isolation resistance $R_{leak}$. This calibration measurement can be repeated any time under any actual operation conditions. The method even allows measuring the dependence of the isolation resistance $R_{leak}$ on the voltage V or the control charge Q at the capacitor, if there is any.

In the charge-control regime, first a defined amount of charge is put onto the capacitor. In a next step all current sources are disconnected from the capacitor. The presence of non-negligible leakage currents is changing the selected set points by a reduction of the charge amount Q at the capacitor over time.

The second step of the third disclosure therefore is to introduce a feedback loop for the control current, which allows keeping the operation point defined by the control charge amount $Q_c$. Due to the fact that the relationship V(Q) has a maximum, its derivative dV/dQ is changing signs and therefore the resulting voltage, caused by the charge amount Q on the capacitor, is not suited as a sensing value for a closed control loop. Instead, the closed control loop is made to work with the capacitance as sensing value. The capacitance value is measured with a "current injection" HF capacitance measurement system.

The 3$^{rd}$ step of the third disclosure is using the configuration of the second step of the third disclosure as an additional measurement method for the isolation resistance $R_{leak}$ at different operation points defined by the control charge amount Q at the capacitor.

The 4$^{th}$ step of the third disclosure is an introduction of an additional switch which allows re-calibration of all current sources in the system using the present precision resistor or resistors and the internal voltage measurement system of the Electrostatic Actuator Controller. This is essentially needed, as the currents to be controlled may be very small.

The 5$^{th}$ step of the third disclosure it to introduce a strongly simplified operation scheme without active feedback control, which however works only for a partial operation range of the Electrostatic Actuator Controller without danger of occurrence of any runaway effects such as the pull-in effect.

Detailed Description of the Disclosure

The second disclosure teaches that charge control of micro-machined MEMS/MOEMS systems with a capacitive structure and at least one spring-loaded movable electrode has several advantages compared with control by voltage.

To exploit these advantages, the second disclosure proposes a circuit as shown in FIG. 31. The current source 311 provides a current I to the actuator's capacitive structure 310 via switch 312. Via switch 314 a voltage measurement circuit 313 can be connected to the capacitor 310, measuring the resulting voltage V, caused by the amount of charge Q on the capacitor 310. The reset switch 315 allows resetting the voltage of the capacitor to zero.

The targeted control charge amount $Q_c$ is put on the capacitor by a combination of a precise current source 311, providing a known current I, and a precise timing of connecting/disconnecting switching 312.

FIG. 32 shows the electrostatic actuator control system of FIG. 31 when taking into account the equivalent circuit of a real capacitor. Isolation resistance $R_{leak}$ 320, equivalent serial resistance $R_{ESR}$ 321 and equivalent series inductance L 322 are shown.

Serial resistance $R_{ESR}$ usually is much lower than the isolation resistance $R_{leak}$, so it is assumed that $R_{ESR}$ is negligible. Also it is assumed that inductance L 322 is negligible. Only the effect of $R_{leak}$ is considered in the following (FIG. 33).

The Electrostatic Actuator Controller controls the actuator by putting a defined charge amount on capacity 310. However, the current provided by current source 311 will split at node 323. The leakage current $I_{leak}$ depends on the voltage V at the capacitor C and on the isolation resistance $R_{leak}$. The charge $Q_c(t)$ at an arbitrary time $t_1$ on the capacitor is given by the following equation 14:

$$Qc(t_1) = \int_{t_0}^{t_1}(I(t) - V(Qc(t))/R_{max}(V))dt$$

where
I is the current of current source 311 as a function of the time during which switch 312 is closed.
V(Qc(t)) is the measured 'resulting voltage' over time at the capacitor caused by the charge Qc as measured with voltmeter 313, when switch 314 is closed
$t_0$ is the start time
$t_1$ is the actual time at which the actual charge amount Qc(t) is taken into account or should be controlled.

If the control current provided by current source 311 is known and the resulting voltage V(Qc(t)) is measured by voltage measurement system 313, Eq. 14 shows that the charge amount at the capacitor, Qc(t), can be precisely controlled at any time t, if $R_{leak}$ is known. So the approach of the Electrostatic Actuator Controller as described by the second disclosure can be used in the presence of non-negligible leakage currents, provided that the isolation resistance $R_{leak}$ is known with sufficient precision.

Usually the isolation resistance $R_{leak}$ of a capacitor C with fixed capacity is determined by putting a charge Q onto the capacitor; then any current sources or control voltages are disconnected; next the resulting voltage at the capacitor is measured as a function of time, while the capacitor is discharging via the leakage current. This method fails for the aforementioned actuator, as its capacitor does not have a fixed capacity—due to the at least one spring-loaded movable electrode. As shown by the example in FIG. 30, the distance between the electrodes will increase by reduction of the charge amount $Q_c$. Accordingly, the capacity will decrease. The voltage V(Q) is not decaying exponentially as it does for a fixed-capacity capacitor. For the above actuator—depending on the operation point—the voltage V even can rise when the charge amount on the capacitor is decreased by the leakage current. This is a consequence of the maximum in the relation V(Q) shown in FIG. 30. In conclusion, the existing methods to determine the isolation resistance $R_{leak}$ of a capacitor C with non-fixed capacity are not applicable.

The first steps of the third disclosure therefore is to extend the Electrostatic Actuator Controller with at least one combination of reference resistor 350 with known resistance $R_{ref}$ and switch 351 as shown in FIG. 34 and to introduce the following method for a precise determination of the isolation resistance $R_{leak}$.

The capacitor is charged two times with the same constant current I applied by current source 311 starting from zero charge (i.e. after reset of the capacitor by reset switch 315), with the condition that the constant current $I > V_{max} \times (R_{leak}^{-1} + R_{ref}^{-1})$.

During the charging cycles the voltage V is measured as a function of time.

One charging cycle (characterized by time $t_1$) is carried out, while any of the reference resistors 350 are disconnected by related switches 351.

The other charging cycle (characterized by time $t_2$) is carried out, while at least one reference resistor 350 is connected by closing at least one switch 351.

From the difference in the functions of the resulting voltages over time during the two charging cycles the isolation resistance $R_{leak}$ can be determined relatively to the known resistance $R_{ref}$ of reference resistor 350.

One possible method to extract the desired information from this measurement method is given below. A short analysis of the charging cycles shows that the system states defined by charge amount $Q_c$, through which the system runs are equal. This means that having reached the same control charge $Q_c$ on the capacitor, also the same resulting voltage V(Qc) is observed, at least with respect to the voltage levels on branch 201 before occurrence and 202 after occurrence of voltage maximum $V_{max}$ 203 in FIG. 30 separately.

In the charging cycle, in which reference resistor 350 is connected, it takes a longer time to reach the same charge state Q, due to the fact that the total resistance for the discharge has decreased by additional resistor 350, which is electrically connected in parallel to capacitance C 310 and its isolation resistance $R_{leak}$. At the same voltage level $V(t_1)=V(t_2)=V(Q)$, the respective slopes in time $s_1(t_1)=dV/dt$ at time $t_1$ with switch 351 open and $s_2(t_2)=dV/dt$ at time $t_2$ with switch 351 closed thus are different. The inverse of the isolation resistance $R_{leak}^{-1}$ can then be determined by a simple formula:

$$R_{leak}^{-1} = I/V(Q) - s_1/(s_1-s_2) \times R_{ref}^{-1} \quad \text{(Equation 3)}$$

with

I is the constant loading current

V(Q) is the measured equal voltage level for both charge-up sequences, i.e. $V(t_1)=V(t_2)=V(Q)$ $R_{ref}$ is reference precision resistor 350

Please note that with this method it is even feasible to quantitatively detect any dependence of $R_{leak}$ on the voltage V(Q) resp. on the control charge Q if there is any.

The $2^{nd}$ step of the third disclosure addresses the problem that the operation points defined by the amount of charge Q will show a drift due to the presence of non-negligible leakage currents of the actuator's capacitor.

If leakage currents are negligible it is possible to put a defined amount of charge on the capacitor and then disconnect current source 311 by switch 312. In the presence of a leakage current, the operation point defined by charge amount Q will not be constant, but the capacitor will discharge due to the leakage current. In order to stabilize the operation point, it is necessary to introduce a feedback loop to the system which controls the current in a way to keep the charge amount Q constant. Due to the fact that function V(Q) has a maximum 203 as shown in FIG. 30 such a feedback loop cannot be made with a standard PID controller. A PID control work-s well if the controlled system has monotonous characteristics between the sensing value and the control value, i.e. its first derivative does not change the sign. Thus it will be feasible to use a PID controller either in branch 201 of FIG. 30 or in branch 202 of FIG. 30, but not in both branches with the same controller, as the slope of dV/dQ has different signs due to the existence of maximum 203 of V(Q).

Capacitance is a good indicator for the distance between the electrodes. FIG. 30 shows this situation for a special configuration of a parallel plate capacitor with at least one spring-loaded electrode. As pointed out in the second disclosure, it is not possible to carry out an HF capacitance measurement, which applies an AC modulation voltage and detects the resulting current, as this method needs a DC voltage control of the system, in order to be able to add the AC modulation voltage. However a voltage control regime of an Electrostatic Actuator, which has a maximum in V(Q) as shown in FIG. 30, can only access operation points on branch 201; it cannot access any operation point on branch 202. Additionally, voltage control is known to lead to the "Pull-In" effect if any control voltage exceeds the voltage $V_{max}$ in the maximum 203. Thus this method is incompatible with the charge control regime of the Electrostatic Actuator Controller. The second disclosure solves this issue with the invention of the "current-injection based HF capacitance measurement", in which an AC modulation current is injected and the resulting AC modulation voltage is measured for amplitude and phase lag with respect to the AC current signal. The additional AC current is provided by dedicated source 316 which can be connected or disconnected by switch 317, while time-resolved voltage measurement system 313 is capable of measuring amplitude and phase.

It is important to carry out this "high frequency" measurement at frequencies well above the resonance frequency of the actuator system at each operation point, for example, a factor of at least 10 higher, depending on required precision. Thus the movement of the actuator is not following the modulation of the injected AC current from AC current source 316. Under this condition, the actuator capacitive structure acts like a fixed-capacity capacitor for the HF modulation signals of current and voltage, for which the capacity is defined by the operation point, determined by the charge amount Q on the capacitor.

The "current-injection based HF capacitance measurement" is also possible in the presence of a non-negligible leakage current. As described by the second disclosure, the complex impedance is measured. From the real part of the impedance the isolation resistance $R_{leak}$ can be calculated, from the imaginary part is it possible to calculate the actual capacitance.

In summary, the $2^{nd}$ step of the third disclosure solves the issue of drift of operation point due to non-negligible leakage currents, by using a capacitance measurement method, which is compatible with the charge control regime of the Electrostatic Actuator Controller and by using the capacitance value as input for a closed feedback loop to control the current I, thus allowing to keep the operation point defined by the charge amount $Q_c$ at the capacitor unchanged.

An additional $3^{rd}$ step of the third disclosure is to use the closed feedback loop described above as a precise measurement system for the isolation resistance $R_{leak}$. The task of the closed feedback loop is to keep the condition Q constant. Looking at Eq. 14, the condition $Q_c$=constant in time t is achieved when the integrand in Eq. 14 is zero. This means that under closed loop feedback control, the control current I is equal to the leakage current $I_{leak}=V(Q)/R_{leak}$ at least for time-averaged values. Thus the value of the leakage current at a given operation point defined by charge amount Q can easily be determined by the average of the control value "current I" over time while the closed feedback loop is active and (after some transitory time) is in a steady stage.

In the above method for determination of the isolation resistance $R_{leak}$ the current I needs to be known very precisely.

The 4$^{th}$ step of the third disclosure therefore is to use resistor R$_{ref}$ 350 (or in case several combinations of reference resistors and related switches are implemented, to use several resistors separately with different resistance values) in order to measure the current generated by any current source, such as DC current source 311 or AC modulation current source 316 with the help of voltage meter 313 in a self-consistent way, thus allowing re-calibration of the current levels at any time. In order to do so, an additional switch 318 is introduced (see FIG. 36), which can disconnect capacity C 310 of actuator 370 from the circuit of Electrostatic Actuator Controller 360 for this recalibration measurement.

If needed, the resistance of reference resistor 350 (or the resistances in case that several reference resistors are implemented) can preferably be fabricated in an ASIC structure, e.g. by laser trimming of the resistance values. It is also worth noting that reference resistor R$_{ref}$ 350 (resp. the individual reference resistor values R$_{ref,N}$) are accessible from outside. If Electrostatic Actuator Controller 360 is disconnected from the MEMS/MOEMS capacitive structure with spring-loaded, movable electrode 370, the resistance value(s) of the reference resistor(s) can be measured by an external resistance measurement system, if needed.

In fact, external access is possible for any active or passive components on Electrostatic Actuator Controller 360 individually, due to switches 312, 314, 317 and 351. DC current source 311, AC modulation current source 316, voltage meter 313 and precision resistors 350 etc. can be calibrated by external access from outside, if needed.

The 5$^{th}$ step of the third disclosure is to introduce a strongly simplified operation scheme without active feedback control. Voltage control is simple but leads to an instant runaway effect called "pull-in" effect, as soon as the control voltage exceeds the voltage V$_{max}$ 203. The "pull-in effect" damages the actuator device or at least its calibration properties. There is quite some risk to let such a runaway effect commence, as an example because the safe range of control voltages is temperature-dependent. The step of the third disclosure here—in consideration of actuators with a non-negligible leakage current—is to use a simple constant current-source to stabilize the operation point defined by the amount of charge Q. This method works as follows:

First the targeted operation point is set by putting the amount of charge on the capacitor with the help of current source 311 and switch 312.
The resulting voltage V(Q) is measured with voltage meter 313 while switch 314 remains closed.
A control current of the value V(Q$_c$)/R$_{leak}$ is set.

If the charge Q should exceed the set point Q$_c$, the resulting voltage will increase and the leakage current will increase, thus stabilizing the operation point defined by the charge amount Q$_c$. In the same way, a lower charge will lead to a lower leakage current, thus also thus stabilizing the operation point.

Unfortunately, this method only works for a partial operation range, namely branch 201, of the Electrostatic Actuator Controller. Actually, this method has the same restriction concerning accessible operation range as in the conventional voltage control mode. Still, the present method will be of practical importance due to fact that most of today's MEMS/MOEMS actuators are designed for that tuning range of the distances d between the electrodes, which actually can be controlled with voltage control.

The simplified method of current control, described above, for actuators with non-negligible leakage current has a large advantage: there is no danger of destruction of the device by the "pull-in" effect for several reasons:

Once the device is into an instable range of operation by voltage control, the runaway is accelerating extremely fast. The process is not controllable. Additionally, there is no monitor value to detect the onset of the runaway effect.
In contrast, the current control method described above is charging up the capacitor slowly and there is a monitor value, namely the resulting voltage V/(Q$_c$) as continuously measured by voltage meter 313.
Thus the onset of the pull-in effect can be detected by the criterion that the resulting voltage V/(Q$_c$) drops monotonously while the control current is constant. When detecting this condition, the charging process can be stopped and no "pull-in" effect will occur.

With the steps of the third disclosure, it is feasible to apply the concept of charge- or current-control, taught in the second disclosure for micro-machined MEMS/MOEMS systems with a capacitive structure and with at least one spring-loaded movable electrode also to such structures which exhibit a non-negligible leakage current.

The features of the third disclosure can be described as follows:

[Feature 1]

An extension of the Electrostatic Actuator Controller (according to Feature 1 of the second disclosure) and a method for determination of the isolation resistance of the capacitor of an electrical actuator controller for micromachined MEMS/MOEMS electrostatic actuator systems with capacitive structure with non-negligible leakage current and with at least one spring-loaded movable electrode, thus allowing to change the mechanical distance d between the electrodes by forces applied to the capacitor by electrical means, with the capacitor system with non-negligible leakage current and with at least one movable electrode being characterized in that the resulting voltage V at the capacitor caused by charge Q exhibits at least one maximum as a function of the amount of charge Q, and the electrical actuator controller is characterized in that it directly drives the system by the amount of charge Q as the direct control of source of the attractive mechanical force between the capacitance electrodes, and the extension of the Electrostatic Actuator Controller is characterized in that at least one additional precision resistor and at least one related switch for each resistor is introduced in a manner that any of the introduced precision resistors are electrically connected in parallel to the capacitor and with it its isolation resistance R$_{leak}$ of the aforementioned actuator system and that each resistor can be connected to or disconnected from that capacitor by its own switch, and the method for determination of the absolute value of the isolation resistance R$_{leak}$ of the capacitor of the aforementioned actuator system characterized in that the method is implemented by charging the capacitor from charge zero with a known constant current without and additionally with closing at least one of the switches related to their respective precision resistors, and measuring and recording the time developments of the resulting voltage during these charging processes, and that from the comparison of these time developments, in particular but not exclusively from the different slopes dV/dt at same levels of the voltage V, the absolute value of the isolation resistance can be determined, thus allowing to determine the absolute amount of charge at the actuator's capacitor Qc in the presence of non-negligible leakage current of this capacitor.

Feature 2

An extension of the Electrostatic Actuator Controller with an integrated compatible HF capacitance measurement system (according to Feature 1 of the second disclosure) by a closed feedback loop for micro-machined MEMS/MOEMS electrostatic actuator systems with capacitive structure with non-negligible leakage current and with at least one spring-loaded movable electrode, thus allowing to change the mechanical distance d between the electrodes by forces applied to the capacitor by electrical means, with the capacitor system with non-negligible leakage current and with at least one movable electrode being characterized in that the resulting voltage V at the capacitor caused by charge Q, exhibits at least one maximum as a function of the amount of charge Q, and the electrical actuator controller is characterized in that it directly drives the system by the amount of charge Q as the direct control of source of the attractive mechanical force between the capacitance electrodes, and that the integrated compatible HF capacitance measurement system characterized in that firstly, the controller puts a definite amount of charge on the capacitance and in consequence the distance between the plates adjust closely to the wanted distance, then aforementioned charge-providing circuits are disconnected from the movable plate capacitor and then via an additional switch an AC current at frequencies much higher than the resonance frequencies of the oscillatory parallel plate capacitor is injected onto that capacitor, and the electrical actuator controller contains a circuitry for measurement of the resulting AC voltage modulation from the capacitor, so that by knowing the amount of charge modulation $\Delta Q$ and the resulting measured modulated voltage $\Delta V$, the high frequency capacitance of the capacitive structure formed by the momentary distance d between the electrodes of the electrostatic actuator system can be determined.

and the extension is characterized in that a closed loop control is introduced in which the actuator is the controlled system, the current by the source is the control value and the capacitance measured by the above mentioned 'current-injection based HF capacitance measurement' is the sensing value to be kept constant, thus allowing to keep the actuator stable at any defined operation point controlled by the amount of charge on the capacitor, Qc, despite the presence of non-negligible leak currents in this capacitor.

Feature 3

An additional method for the determination of the isolation resistance of the capacitor when using the Electrostatic Actuator Controller Extension according to Feature 2 with the additional method characterized in that after a transient time after the closed feedback loop has been activated in order to keep the amount of control charge Qc on the capacitance of the actuator constant, the average of the control value, here in particular the control current I provided by the current source under closed loop operation, over time is determined, and the average of the measured resulting voltage V generated by the charge amount Qc on the capacitor over the same time is determined, too, and the isolation resistance $R_{leak}$ of the capacitor can be calculated by the ratio of both values, i.e. average of resulting voltage divided by the average of the current under closed loop control, because the averages of the current under closed loop operation equals the leakage current at this operation point characterized by control charge $Q_c$ and the resulting voltage $V(Q_c)$.

Feature 4

An extension of the Electrostatic Actuator Controller according to Features 1 and 2 and a related method for self-calibration the extension characterized in that an additional switch is introduced which can connect or disconnect the actuator's capacitance from the Electrostatic Actuator Controller circuit And the method characterized in that that the actuator's capacitance is disconnected and at least, by means of the switches related to their precision resistors, one of the precision resistors is connected instead of the capacitor to the various current sources and to the voltage measuring system by closing the related switch for that resistor, so that voltage drop at the resistor caused by the currents, DC or AC, of any current sources mounted on that Electrostatic Actuator Controller, can be measured and current output can be re-calibrated based on the internal voltage measurement system.

Feature 5

A simplified operation mode for the Electrostatic Actuator Controller (according to Feature 1 of the second disclosure) for micro-machined MEMS/MOEMS electrostatic actuator systems with capacitive structure with non-negligible leakage current and with at least one spring-loaded movable electrode, thus allowing to change the mechanical distance d between the electrodes by forces applied to the capacitor by electrical means, with the capacitor system with non-negligible leakage current and with at least one movable electrode being characterized in that the resulting voltage V at the capacitor caused by charge Q, exhibits at least one maximum as a function of the amount of charge Q, and the electrical actuator controller is characterized in that it directly drives the system by the amount of charge Q as the direct control of source of the attractive mechanical force between the capacitance electrodes, and method for the simplified operation mode is characterized in that it is applicable only to amount of control charge between zero and Qc, with Q being lower than the amount of charge $Q_{Vmax}$, for which the voltage $V(Q_{Vmax})$ at the capacitor exhibits a first maximum value $V_{max}$, and that the desired operation points are set by charging the capacitor to the corresponding value of charge amount Qc, which in presence of non-negligible leakage current of the capacitor can be calculated from the actual measured voltage at the capacitor and its isolation resistance $R_{Leak}$ determined e.g. but not exclusively according to Feature 1 or 2 before and then reducing the control current to a value which equals the leakage current $V/R_{leak}$ at this operation point, so that the actuator is kept at that operation point, and the measured voltage is continuously monitored, and the control current is switched off instantly as soon as the charge Q exceeds for any reason the value $Q_{Vmax}$ for which the voltage at the capacitor exhibits the a first maximum value $V_{max}$, to avoid destruction of the capacitor by bringing the electrodes into contact with each other, with the condition for switching off the control current being detected preferably, but not exclusively, by a monotonous decrease of voltage while the control current is constant.

Feature 6

An enhancement of an electrostatic actuator control system for actuators with capacitive structure with at least one movable spring-loaded electrode based on charge control according to the second disclosure is disclosed for the case that the actuator's capacitor exhibits non-negligible leakage current. The enhancement consists of
(1) a precision resistor and a related method quantifying the isolation resistance $R_{leak}$ of the capacitor, which in turn allows to calculate the charge amount $Q_c$ on the capacitor from the injected current over time and from the measured values of the resulting voltage over time,
(2) a closed feedback loop using a current-injection version of an HF capacitance measurement system as sensing value and the current as control value
(3) an additional measurement system for the quantification of the leakage currents using the closed feedback loop of point (2)
(4) a self-calibration system and method, which allows to calibrate all AC and DC current sources with the integrated voltage measurement system
(5) a simplified control by current without feedback, which is easy to implement, but which can only address the operation range accessible also with voltage control, but with means to monitor and stop the "pull-in" effect before the electrodes accelerate towards distance zero and the electrodes collide with each other.

INDUSTRIAL APPLICABILITY

According to an aspect of the present disclosure, it is possible to provide an optical filter system having high reliability.

REFERENCE SIGNS LIST

1: Fabry-Perot interference filter, 1a: Light transmitting region, 12: First driving electrode, 13: First monitor electrode, 14: Second driving electrode, 15: Second monitor electrode, 31: First mirror portion, 32: Second mirror portion, 32a: Surface, 50: Optical filter system, 51: Controller, 52: First current source, 53: Second current source, 54: Detection unit, 55: Control unit

The invention claimed is:
1. An optical filter system comprising:
a Fabry-Perot interference filter; and
a controller that controls the Fabry-Perot interference filter,
wherein the Fabry-Perot interference filter includes
a first mirror portion,
a second mirror portion disposed to face the first mirror portion with an air gap interposed therebetween and of which a distance to the first mirror portion in a light transmitting region is adjusted by an electrostatic force,
a first driving electrode provided with the first mirror portion to surround the light transmitting region when seen in a direction in which the first mirror portion and the second mirror portion face each other,
a second driving electrode provided with the second mirror portion to face the first driving electrode,
a first monitor electrode provided with the first mirror portion such that at least a part of the first monitor electrode overlaps the light transmitting region when seen in the direction and electrically insulated from the first driving electrode,
a second monitor electrode provided with the second mirror portion to face the first monitor electrode and electrically insulated from the second driving electrode,
a substrate, a first laminate including the first mirror portion disposed on the substrate, a second laminate including the second mirror portion that faces the first mirror portion with the air gap interposed therebetween on a side opposite to the substrate, and an intermediate layer disposed between the first laminate and the second laminate and defining the air gap, and
the first driving electrode is formed in a layer included in the first laminate, and the second driving electrode is formed in a layer included in the second laminate,
wherein the controller includes
a first current source that generates the electrostatic force by applying a driving current between the first driving electrode and the second driving electrode,
a second current source that applies an alternating current between the first monitor electrode and the second monitor electrode, the alternating current having a frequency higher than resonance frequencies of the first mirror portion and the second mirror portion,
a detection unit that detects an alternating voltage generated between the first monitor electrode and the second monitor electrode while the alternating current is applied, and
a control unit that controls the first current source based on an amount of electric charge stored between the first mirror portion and the second mirror portion and calculates an electrostatic capacitance between the first mirror portion and the second mirror portion based on the detection result of the detection unit,
wherein the control unit controls the second current source so as to apply the alternating current between the first monitor electrode and the second monitor electrode, the alternating current having a frequency set to be more than ten times higher than resonance frequencies of the first mirror portion and the second mirror portion.
2. The optical filter system according to claim 1, wherein the first driving electrode is exposed to the air gap.
3. The optical filter system according to claim 1, wherein the second driving electrode is disposed on a surface on a side opposite to the air gap of the second mirror portion.

4. The optical filter system according to claim 1, wherein the second driving electrode is exposed to the air gap.

5. The optical filter system according to claim 1, wherein the first monitor electrode is exposed to the air gap.

6. The optical filter system according to claim 1, wherein the second monitor electrode is exposed to the air gap.

7. The optical filter system according to claim 1, wherein the second monitor electrode is disposed on a surface on a side opposite to the air gap of the second mirror portion.

8. The optical filter system according claim 1, wherein the second driving electrode and the second monitor electrode are separated from each other in the direction.

* * * * *